United States Patent
Yamagishi et al.

(10) Patent No.: US 11,997,017 B2
(45) Date of Patent: May 28, 2024

(54) NETWORK CONTROL METHOD AND DATA PROCESSING SYSTEM

(71) Applicant: Sony Group Corporation, Tokyo (JP)

(72) Inventors: Yasuaki Yamagishi, Tokyo (JP); Hiroshi Kuno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/001,871

(22) PCT Filed: Dec. 7, 2020

(86) PCT No.: PCT/JP2020/045487
§ 371 (c)(1),
(2) Date: Dec. 15, 2022

(87) PCT Pub. No.: WO2021/260970
PCT Pub. Date: Dec. 30, 2021

(65) Prior Publication Data
US 2023/0239245 A1    Jul. 27, 2023

Related U.S. Application Data

(60) Provisional application No. 63/044,623, filed on Jun. 26, 2020.

(30) Foreign Application Priority Data

Jun. 29, 2020 (JP) .................. 2020-111563

(51) Int. Cl.
*H04L 47/12*    (2022.01)
*H04L 67/10*    (2022.01)
(Continued)

(52) U.S. Cl.
CPC .............. *H04L 47/12* (2013.01); *H04L 67/10* (2013.01); *H04L 67/12* (2013.01); *H04N 21/4728* (2013.01)

(58) Field of Classification Search
CPC ......... H04L 47/12; H04L 67/10; H04L 67/12; H04N 21/4728; H04N 21/2343; H04N 21/238
See application file for complete search history.

(56) References Cited

U.S. PATENT DOCUMENTS

2018/0095854 A1*   4/2018   Apte .................. G06F 11/2094
2018/0157915 A1*   6/2018   Sherry .................. G06V 20/52
(Continued)

FOREIGN PATENT DOCUMENTS

JP    2013-20430 A    1/2013
JP    2015-505404 A    2/2015
(Continued)

OTHER PUBLICATIONS

Yamada et al., "Distributed processing node system, management node, and control method", Jan. 31, 2013, ip.com, English, 13 pages. (Year: 2013).*

(Continued)

*Primary Examiner* — Austin J Moreau
*Assistant Examiner* — Chhian (Amy) Ling
(74) *Attorney, Agent, or Firm* — XSENSUS LLP

(57) ABSTRACT

The present disclosure relates to a network control method and a data processing system for reducing traffic in a network and reducing a processing load of an application that performs data processing.

A network connection device determines, on the basis of a manifest, an optimal location for execution of an application that processes sensor data generated by a sensor device, from among the sensor device and a device on a path in a (Continued)

network connected to the sensor device. The present technology can be applied to, for example, a network control method of cloud computing.

20 Claims, 48 Drawing Sheets

(51) Int. Cl.
*H04L 67/12* (2022.01)
*H04N 21/4728* (2011.01)

(56) References Cited

U.S. PATENT DOCUMENTS

2018/0167634 A1* 6/2018 Salmimaa ............ H04N 19/167
2020/0310394 A1* 10/2020 Wouhaybi ............ H04L 67/125

FOREIGN PATENT DOCUMENTS

| JP | 2018-84854 A | 5/2018 | |
|---|---|---|---|
| WO | WO-2018155258 A1 * | 8/2018 | ........... G06T 3/4038 |
| WO | 2020/195769 A1 | 10/2020 | |
| WO | WO-2021039011 A1 * | 3/2021 | ......... H04N 1/00209 |

OTHER PUBLICATIONS

Suzuki et al., "Image capture device, processing device, data transport system, and data transport method (English)", WO 2021/039011 A1, published Mar. 4, 2021, PCT/JP2020/022299 filed Jun. 5, 2020. (Year: 2021).*

International Search Report and Written Opinion dated Mar. 2, 2021, received for PCT Application PCT/JP2020/045487, filed on Dec. 7, 2020, 11 pages including English Translation.

Yamada et al., "Cost Minimization by Task Allocation in Application-Router Networks", IEICE Technical Report, vol. 114, No. 404, Jan. 22, 2015, pp. 119-124 (6 pages including English Abstract).

* cited by examiner

FIG. 12

| EVALUATION AXIS | | PRIORITY ORDER |
|---|---|---|
| TO REDUCE PROCESSING DELAY DUE TO NETWORK TRANSFER DELAY AS MUCH AS POSSIBLE | | (1) (2) (3) |
| TO REDUCE NETWORK TRAFFIC AS MUCH AS POSSIBLE | | (1) (2) (3) |
| TO INCREASE PROCESSING SPEED OF Application AS MUCH AS POSSIBLE | | (3) (2) (1) |
| TO REDUCE EXECUTION COST AS MUCH AS POSSIBLE | | (3) (2) (1) |
| TO REDUCE STORAGE COST AS MUCH AS POSSIBLE | | (3) (2) (1) |
| CASE OF INTRODUCING Compressor | TO REDUCE PROCESSING DELAY DUE TO NETWORK TRANSFER DELAY AND TRAFFIC | (11) (12) (13) |
| | TO INCREASE APPLICATION PROCESSING SPEED, REDUCE EXECUTION COST, AND REDUCE STORAGE COST | (13) (12) (11) |
| CASE OF INTRODUCING Post Processor | TO REDUCE PROCESSING DELAY DUE TO NETWORK TRANSFER DELAY AND TRAFFIC | (21) (22) (23) |
| | TO INCREASE APPLICATION PROCESSING SPEED, REDUCE EXECUTION COST, AND REDUCE STORAGE COST | (23) (22) (21) |
| CASE OF INCREASING LEVEL OF INDIVIDUALIZATION | TO REDUCE TRAFFIC | (311) (312 AND OTHERS) (313) |
| | TO INCREASE APPLICATION PROCESSING SPEED, REDUCE EXECUTION COST, AND REDUCE STORAGE COST | (313) (312 AND OTHERS) (311) |
| TO INCREASE REUSABILITY OF DATA | | (42) (41) |
| TO INCREASE REUSABILITY OF DATA AND MINIMIZE TRAFFIC IN SUBSEQUENT STAGE OF Broker | | (52) (51) |

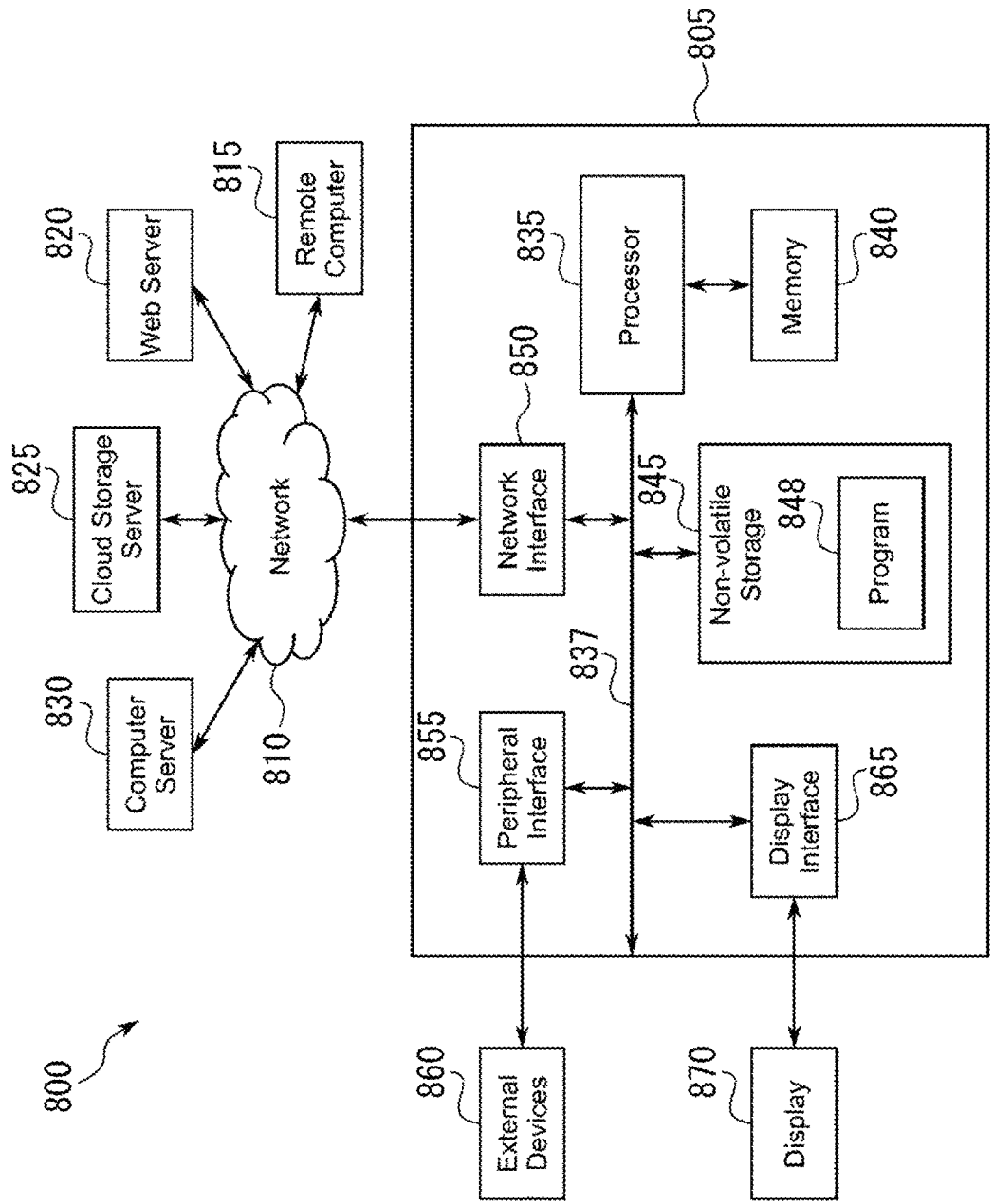

NETWORK CONTROL METHOD AND DATA PROCESSING SYSTEM

CROSS-REFERENCE TO RELATED APPLICATIONS

The present application is based on PCT filing PCT/JP2020/045487, filed Dec. 7, 2020, U.S. Provisional Application No. 63/044,623, filed Jun. 26, 2020, and Japanese Patent Application No. 2020-111563, filed Jun. 29, 2020, the entire contents of each are incorporated herein by reference.

TECHNICAL FIELD

The present disclosure relates to a network control method and a data processing system, and more particularly, to a network control method and a data processing system for reducing traffic in a network and reducing a processing load of an application that performs data processing.

BACKGROUND ART

The present applicant has previously proposed an object detecting system using a combination of a synchronous image sensor and an asynchronous DVS, in Patent Document 1. The synchronous image sensor is a sensor that captures an image in synchronization with a vertical synchronization signal, and outputs frame data that is image data of one frame (screen) at a period of the vertical synchronization signal. The DVS is an abbreviation of a dynamic vision sensor, and is a sensor that outputs event data indicating an occurrence of an event in a case where the event occurs, with a luminance change in a pixel as the event. Since the DVS outputs the event data at a timing when the event occurs regardless of a vertical synchronization signal, the DVS can be referred to as an asynchronous (or address control) image sensor.

From the DVS, the event data emerges unpredictably and abruptly. Since the event data needs to be used without a delay, time granularity is extremely fine in the data. When a large amount of data generated from the DVS is indiscriminately injected into a network, the network may fail in a case where a capacity of the network is limited, and data that is really necessary may not be processed correctly. Even if the capacity of the network is not limited, calculation resources for performing data processing on the network fail. That is, calculation resources are wasted in unnecessary processing. Therefore, in order not to cause a load on the network or the calculation resources on the network, it is necessary to perform some filtering on the event data and then inject the event data into the network.

CITATION LIST

Patent Document

Patent Document 1: International Publication No. 2020/195769

SUMMARY OF THE INVENTION

Problems to be Solved by the Invention

When this filtering is performed only by a sensor device that generates sensor data, a load on the network itself is not caused, but accuracy of the filtering is limited due to poor calculation resources. When the sensor data is passed to a cloud (a network) and filtering is performed only in the cloud, abundant calculation resources on the cloud can be used, and accuracy of filtering can be improved. However, since the sensor data that is not subjected to the filtering processing is sent onto the network, a total amount of data flowing in the network does not change while the calculation resources are only dispersed to devices on the cloud, and a load on the network and the calculation resources on the network cannot be reduced.

The present disclosure has been made in view of such a situation, and an object thereof is to reduce traffic in a network and reduce a processing load of an application that performs data processing.

Solutions to Problems

A network control method according to a first aspect of the present disclosure includes: determining, by a network connection device on the basis of a manifest, an optimal location for execution of an application that processes sensor data generated by a sensor device, from among the sensor device and a device on a path in a network connected to the sensor device.

A data processing system according to a second aspect of the present disclosure includes an orchestrator configured to determine, on the basis of a manifest, an optimal location for execution of an application that processes sensor data generated by a sensor device, from among the sensor device and a device on a path in a network connected to the sensor device.

In the first and second aspects of the present disclosure, an optimal location for execution of an application that processes sensor data generated by the sensor device is determined on the basis of a manifest from among the sensor device and a device on a path in the network connected to the sensor device.

The network refers to a mechanism in which at least two devices are connected and information can be transmitted from a certain device to another device. The devices communicating via the network may be independent devices or internal blocks constituting one device.

Note that the network control method according to the first aspect and the data processing system according to the second aspect of the present disclosure can be implemented by causing a computer to execute a program. The program to be executed by the computer can be provided by being transmitted via a transmission medium or by being recorded on a recording medium.

The data processing system may be an independent device, or may be an internal block that forms one device.

BRIEF DESCRIPTION OF DRAWINGS

FIG. 12 is a table that summarizes evaluation axes at a time of application deployment and priority orders of the application deployment in that case.

FIG. 13 is a diagram illustrating a configuration example of cloud computing.

MODE FOR CARRYING OUT THE INVENTION

Figure 1:
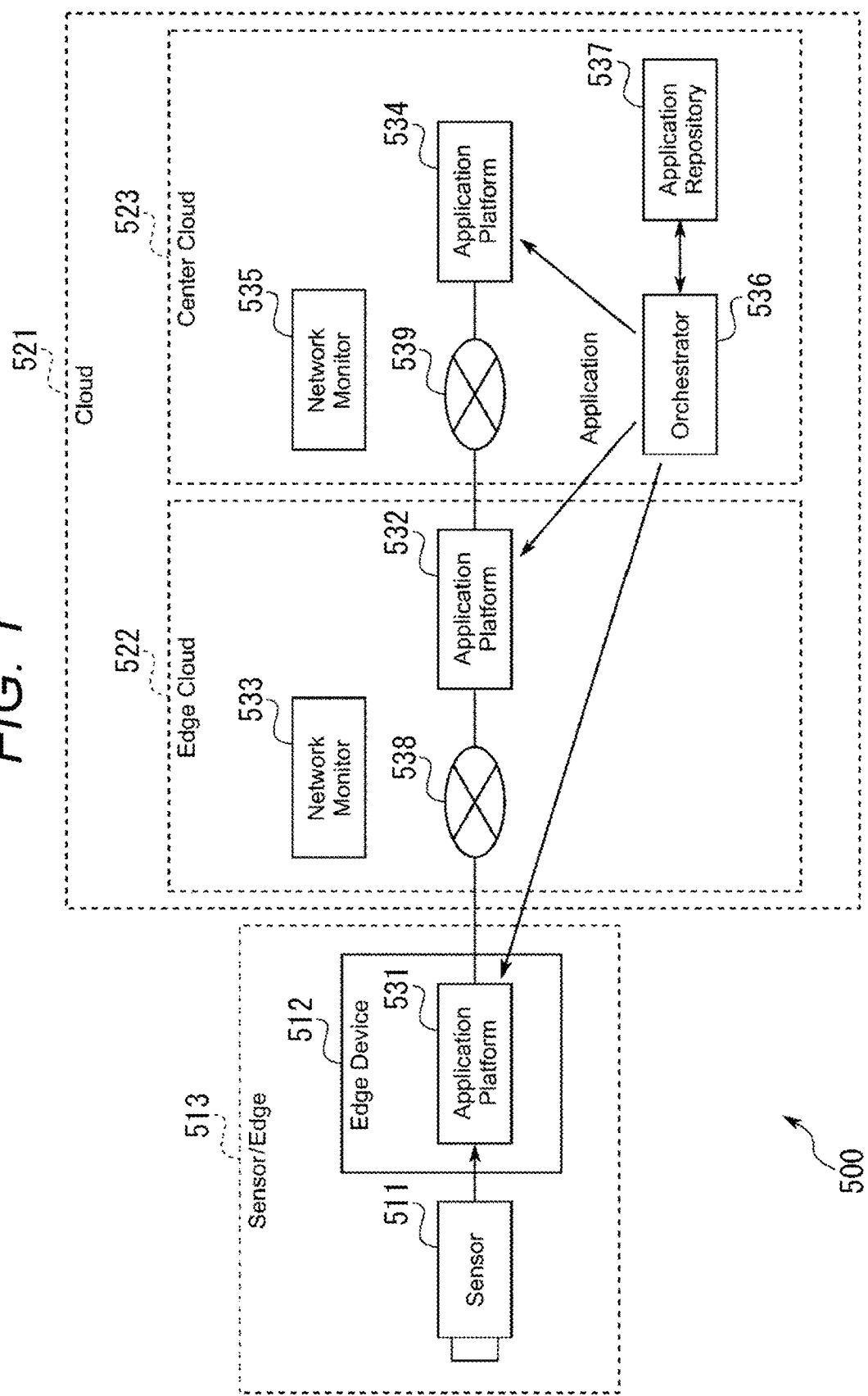
FIG. 1 is a diagram illustrating a configuration example of a data processing system that is an embodiment to which the present disclosure is applied.

Hereinafter, embodiments for implementing the present disclosure (hereinafter, referred to as embodiments) will be described with reference to the accompanying drawings. Note that, in this specification, the description of "and/or" means that both "and" and "or" can be taken. Furthermore, in this specification and the drawings, components having substantially the same functional configuration are denoted by the same reference numerals, and redundant explanations are omitted. The description will be given in the following order.

1. Configuration example of data processing system
2. Flowchart of application deployment control
3. Evaluation axis and deployment policy of optimal deployment
4. Configuration example of cloud computing
5. Super-resolution stream using DVS data
6. Image analysis network system using super-resolution image
7. Example of stream distribution method
8. Example of stream distribution method performed by image analysis network system
9. Block diagram of image analysis network system
10. Example of image stream and ROI event stream 11. Thinning synthesis processing on ROI event stream
12. Flow of processing of image analysis network system
13. Example of stream transmission format
14. Computer configuration example <1. Configuration Example of Data Processing System>

FIG. 1 illustrates a configuration example of a data processing system that is an embodiment to which the present disclosure is applied.

A data processing system 500 in FIG. 1 is a network system that sends (uplinks) sensor data generated by a sensor 511 by sensing to a cloud 521, and performs predetermined data processing on the sensor data on the cloud 521. The data processing executed on the cloud 521 is determined according to a service provided by the cloud 521. For example, in a case where the sensor 511 is an image sensor, recognition processing and analysis processing on an image generated by the image sensor are executed on the cloud 521.

The sensor 511 includes, for example, a synchronous image sensor, an asynchronous DVS, or the like, and is a sensor device that supplies sensor data generated by sensing to an edge device 512. The synchronous image sensor is a sensor that captures an image in synchronization with a vertical synchronization signal, and outputs frame data that is image data of one frame (screen) at a period of the vertical synchronization signal. The DVS is a sensor that outputs event data indicating an occurrence of an event asynchronously in accordance with a timing of the occurrence of the event, with a luminance change in a pixel as the event.

Note that, in the present embodiment, a description will be made assuming that the sensor 511 is a sensor device including one or both of a synchronous image sensor and an asynchronous DVS. However, the sensor 511 is not limited to the image sensor, and may be another sensor device. Examples of the sensor 511 include, for example, an acceleration sensor, a gyro sensor, a magnetic sensor, an odor sensor, an atmospheric pressure sensor, a temperature sensor, a humidity sensor, a wind speed sensor, an optical sensor (an RGB sensor, an IR sensor, or the like), a GPS sensor, and the like as used as an Internet of Things (IoT) sensor.

The edge device 512 is a data processing device to which the sensor 511 as an external device is connected, and includes, for example, a server device. The edge device 512 implements an application platform 531 that enables execution of an application that processes sensor data supplied from the sensor 511. For example, an application that executes a process of analyzing image data captured by the sensor 511 or the like is executed on the application platform 531. The application platform 531 also has a function of managing a plurality of applications to be executed thereon.

The sensor 511 may be connected to the edge device 512 as an external device of the edge device 512, or may be integrally incorporated as a part of the edge device 512. Hereinafter, the sensor 511 and the edge device 512 will be collectively referred to as a sensor/edge 513.

The cloud 521 includes a plurality of nodes and a network connecting the nodes. The network includes a communication network or a communication path of any communication standard such as, for example, the Internet, a public telephone network, a wide-area communication network for a wireless mobile body such as a so-called 4G line or 5G line, a wide area network (WAN), a local area network (LAN), a wireless communication network that performs communication conforming to the Bluetooth (registered trademark) standard, a communication path for short-range wireless communication such as near field communication (NFC), a communication path for infrared communication, or a communication network of wired communication conforming to a standard such as high-definition multimedia interface (HDMI (registered trademark)) or universal serial bus (USB). Each node constituting the cloud 521 includes, for example, a network connection device such as a sensor device, a router, a modem, a hub, a bridge, a switching hub, a base station control device, a switch, or a server. The network connection device as the node functions as an application platform 532, a network monitor 533, an application platform 534, a network monitor 535, an orchestrator 536, or an application repository 537 described below.

The cloud 521 includes an edge cloud 522 arranged on an edge side close to the sensor/edge 513 that injects sensor data into a network, and a center cloud 523 arranged in a core network other than that. In a case where the network is a mobile phone communication network, the edge cloud 522 includes, for example, a base station and the like.

The edge cloud 522 implements the application platform 532 that enables execution of an application that processes sensor data supplied from the sensor 511. The application platform 532 is connected to the application platform 531 of the sensor/edge 513 through a network 538. The edge cloud 522 includes the network monitor 533 that monitors a state of the network 538.

The center cloud 523 also implements the application platform 534 that enables execution of an application that processes sensor data supplied from the sensor 511. The application platform 534 is connected to the application platform 532 of the edge cloud 522 through a network 539. The center cloud 523 includes the network monitor 535 that monitors a state of the network 539.

The orchestrator 536 accesses the application repository 537 and acquires an attribute and an execution image (an execution file) of an application providing a predetermined service. The attribute of the application includes, for example, information regarding an execution environment necessary for the application, such as calculation resources, a memory, and a hardware accelerator such as a graphics processing unit (GPU).

The orchestrator 536 determines an optimal location where the application is executed in accordance with a service requirement. Specifically, the orchestrator 536 determines which one of the application platform 531 of the sensor/edge 513, the application platform 532 of the edge cloud 522, or the application platforms 534 of the center cloud 523 is optimal for deployment of the application. The orchestrator 536 reserves the execution environment of the application on the application platform determined as the execution location of the application, and causes the application to be executed.

The application repository 537 stores an attribute and an execution image (an execution file) of an application that provides a predetermined service, for every service. The application repository 537 may store a reference address or the like indicating a storage location of the execution image, instead of acquiring the execution image itself.

In the data processing system 500 of FIG. 1 configured as described above, the orchestrator 536 determines an optimal location for execution of the application in accordance with a requirement of a service to be provided, and causes the application to be executed. As a result, traffic in the network is reduced, and a processing load of an application that performs data processing is reduced.

Figure 2:
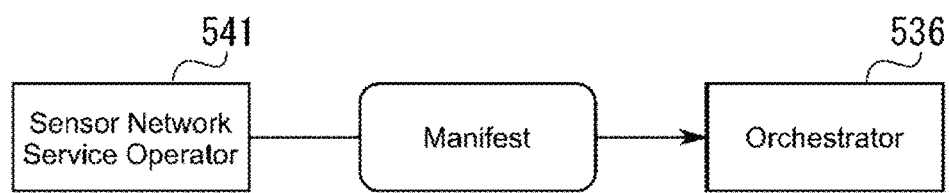
FIG. 2 is a diagram for explaining acquisition of a manifest by an orchestrator.

The orchestrator 536 determines the optimal deployment of the application on the basis of a manifest supplied from a sensor network service operator 541, as illustrated in FIG. 2. In the manifest, an evaluation axis for determining deployment of the application is described, for example, items that are regarded as important in the application deployment, an order of the items that are regarded as important, and the like, as an optimal deployment policy.

For example, as the optimal deployment policy in the manifest, information is described regarding which one of a network transfer delay (including a processing delay), a total amount of network traffic, an application processing speed, an execution cost (a calculation cost), a storage cost, and a data generation location is desired to be preferentially reduced.

Furthermore, as the optimal deployment policy in the manifest, for example, information is described regarding whether or not to execute pre-processing before application processing corresponding to a requested service and whether or not to emphasize reduction in processing load of the application.

Furthermore, for example, information regarding whether or not to emphasize reusability of sensor data is described as the optimal deployment policy in the manifest. The reusability of the sensor data indicates, for example, a degree to which a plurality of applications can share and use the sensor data or a degree to which the sensor data can be reused offline (at another timing).

<2. Flowchart of Application Deployment Control>

Figure 3:
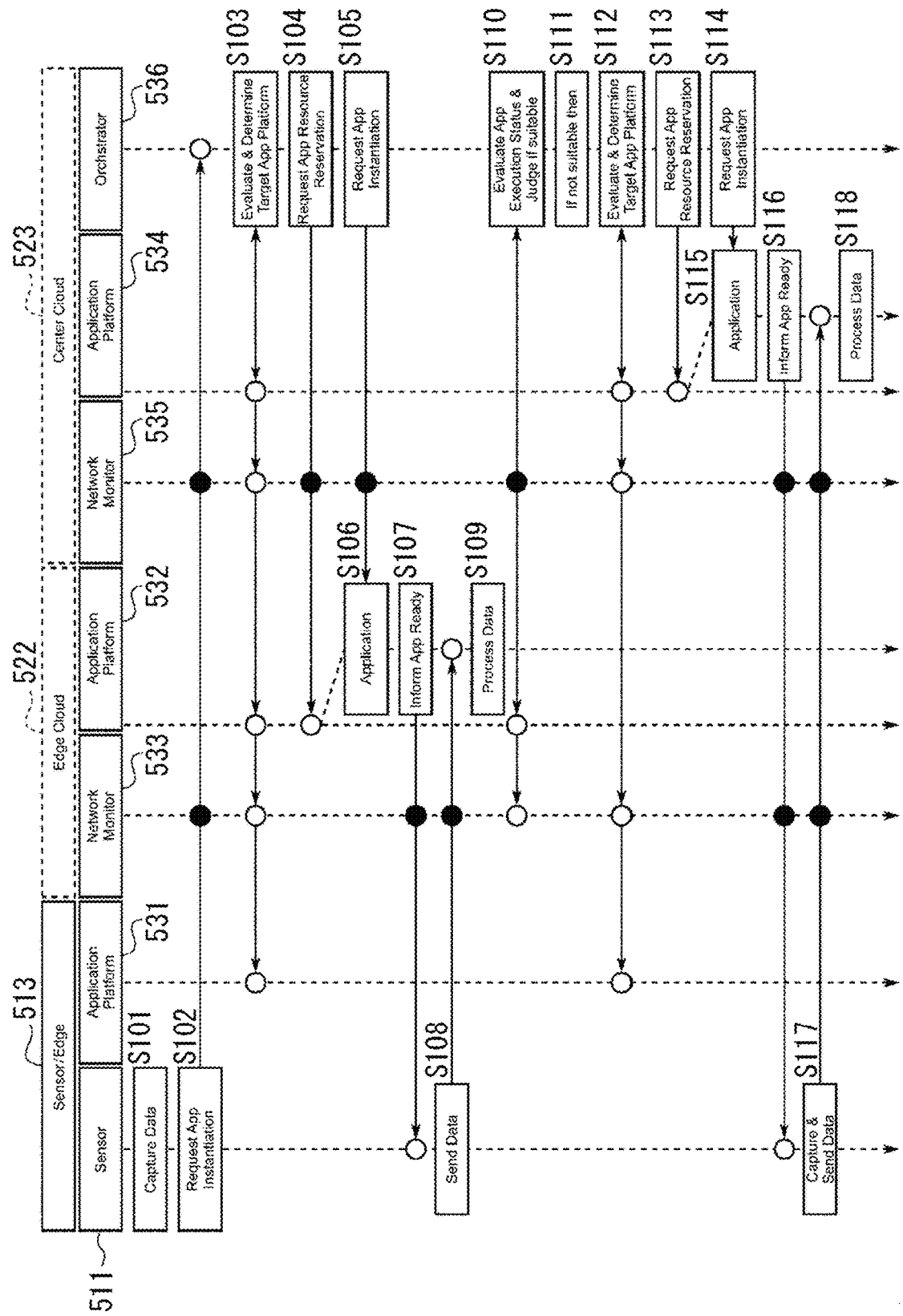
FIG. 3 is a flowchart for explaining application deployment control by the data processing system of FIG. 1.

With reference to a flowchart of FIG. 3, application deployment control for determining optimal deployment of an application will be described.

Note that, before this processing is started, it is assumed that the orchestrator 536 has accessed the application repository 537 and has acquired information regarding an execution environment necessary for the application planned to be executed.

First, the sensor 511 detects generation of sensor data by "Capture Data" in step S101, and executes "Request App Instantiation" in step S102 by using the detection as a trigger. In "Request App Instantiation", "App Requirements" requesting activation with optimal deployment of applications is sent from the sensor 511 to the orchestrator 536. The processing performed by the application can be, for example, analysis processing of an image obtained by the sensor 511, a process of recognizing an object in the image, or the like.

In step S103, the orchestrator 536 executes "Evaluate & Determine Target App Platform". That is, the orchestrator 536 searches for and determines an optimal application platform on which the application is executed, from the sensor/edge 513, the edge cloud 522, or the center cloud 523 on the basis of a manifest supplied from the sensor network service operator 541. At this time, the orchestrator 536 determines an optimal application platform after acquiring a traffic state of the network 538 between the application platforms 531 and 532 from the network monitor 533 of the edge cloud 522, and acquiring a traffic state of the network 539 between the application platforms 532 and 534 from the network monitor 535. Here, it is assumed that the application platform 532 on the edge cloud 522 is determined to be the optimal execution location.

In step S104, the orchestrator 536 sends "Request App Resource Reservation" to the application platform 532 on the edge cloud 522, and causes the application platform 532 to reserve an execution environment necessary for the application. The application platform 532 reserves the execution environment necessary for the application in accordance with "Request App Resource Reservation".

In step S105, the orchestrator 536 executes "Request App Instantiation" on the application platform 532 on the edge cloud 522. That is, the orchestrator 536 sends "App Requirements" for requesting activation of the application, to the application platform 532.

The application platform 532 on the edge cloud 522 activates and executes the application in step S106. The application activated on the application platform 532 sends "Inform App Ready" to the sensor 511 in step S107 to inform that the application has been activated, in other words, that the processing is ready.

In step S108, the sensor 511 having received "Inform App Ready" sends "Send Data", that is, the sensor data, to the application of the application platform 532 on the edge cloud 522 via the network 538.

In step S109, the application of the application platform 532 acquires the sensor data sent from the sensor 511, and executes predetermined data processing ("Process Data").

The sending of the sensor data in step S108 and the data processing of the sensor data in step S109 are continuously executed while the sensor 511 generates the sensor data. Meanwhile, in step S110, the orchestrator 536 checks an execution state of the application and a state of the network 538 between the sensor/edge 513 and the application platform of the edge cloud 522.

Then, in step S111, the orchestrator 536 determines whether a current execution location of the application is optimal, in other words, whether there is no change in determination of the optimal application deployment determined in step S103. In a case where it is determined in step S111 that there is no change in the determination of the optimal application deployment, execution of the applications on the application platform 532 on the edge cloud 522 continues.

Whereas, in a case where a change has occurred in the execution state of the application or the state of the network 538, and the orchestrator 536 determines in step S111 that the current execution location of the application is not optimal, the processing proceeds to step S112.

In step S112, the orchestrator 536 executes "Evaluate & Determine Target App Platform". That is, the orchestrator 536 again searches for and determines an optimal application platform on which the application is executed, on the basis of a manifest supplied from the sensor network service operator 541. Here, it is assumed that the application platform 534 on the center cloud 523 is determined to be the optimal execution location.

In step S113, the orchestrator 536 sends "Request App Resource Reservation" to the application platform 534 on the center cloud 523, and causes the application platform 534 to reserve an execution environment necessary for the application. The application platform 534 reserves the execution environment necessary for the application in accordance with "Request App Resource Reservation".

In step S114, the orchestrator 536 executes "Request App Instantiation" on the application platform 534 on the center cloud 523. That is, the orchestrator 536 sends "App Requirements" for requesting activation of the application, to the application platform 534. Here, the orchestrator 536 may copy state information of the application having been executed on the application platform 532 on the edge cloud 522, to the application of the application platform 534 on the center cloud 523, to synchronize.

The application platform 534 on the center cloud 523 activates and executes the application in step S115. The application activated on the application platform 534 sends "Inform App Ready" to the sensor 511 in step S116 to inform that the application has been activated, in other words, that the processing is ready.

In step S117, the sensor 511 having received "Inform App Ready" detects "Capture & Send Data", that is, generation of sensor data, and sends the detected sensor data to the application of the application platform 534 on the center cloud 523 via the networks 538 and 539.

In step S118, the application of the application platform 534 acquires the sensor data sent from the sensor 511, and executes predetermined data processing ("Process Data").

The sending of the sensor data in step S117 and the data processing of the sensor data in step S118 are continuously executed while the sensor 511 generates the sensor data.

Similarly, the processing of steps S110 to S113 is continued, that is, the processing is continued in which it is determined whether or not the current execution location of the application is optimal, and an optimal application platform is again searched for and the application is executed in optimal deployment in a case where it is determined not to be optimal. Even in a case where the number of the sensor/edge 513 participating in the network is increased or sensor data generated by the sensor 511 is increased, the orchestrator 536 can monitor traffic of the entire network and a state of the processing load, and perform network control (including fault recovery and maintenance) following the load.

<3. Evaluation Axis and Deployment Policy of Optimal Deployment>

As described above, in the process of "Evaluate & Determine Target App Platform", the orchestrator 536 determines an optimal location of the application platform for execution of the application, on the basis of the manifest supplied from the sensor network service operator 541.

Hereinafter, a specific description will be given to an example of an evaluation axis for determining deployment of the application described in the manifest and the deployment policy of the application in the evaluation axis. Note that, in the following description, the individual application platforms 531, 532, and 534 on the sensor/edge 513, the edge cloud 522, or the center cloud 523 will be referred to as platforms 531, 532, and 534 for simplicity.

<Deployment Policy of this Application>

Figure 4:
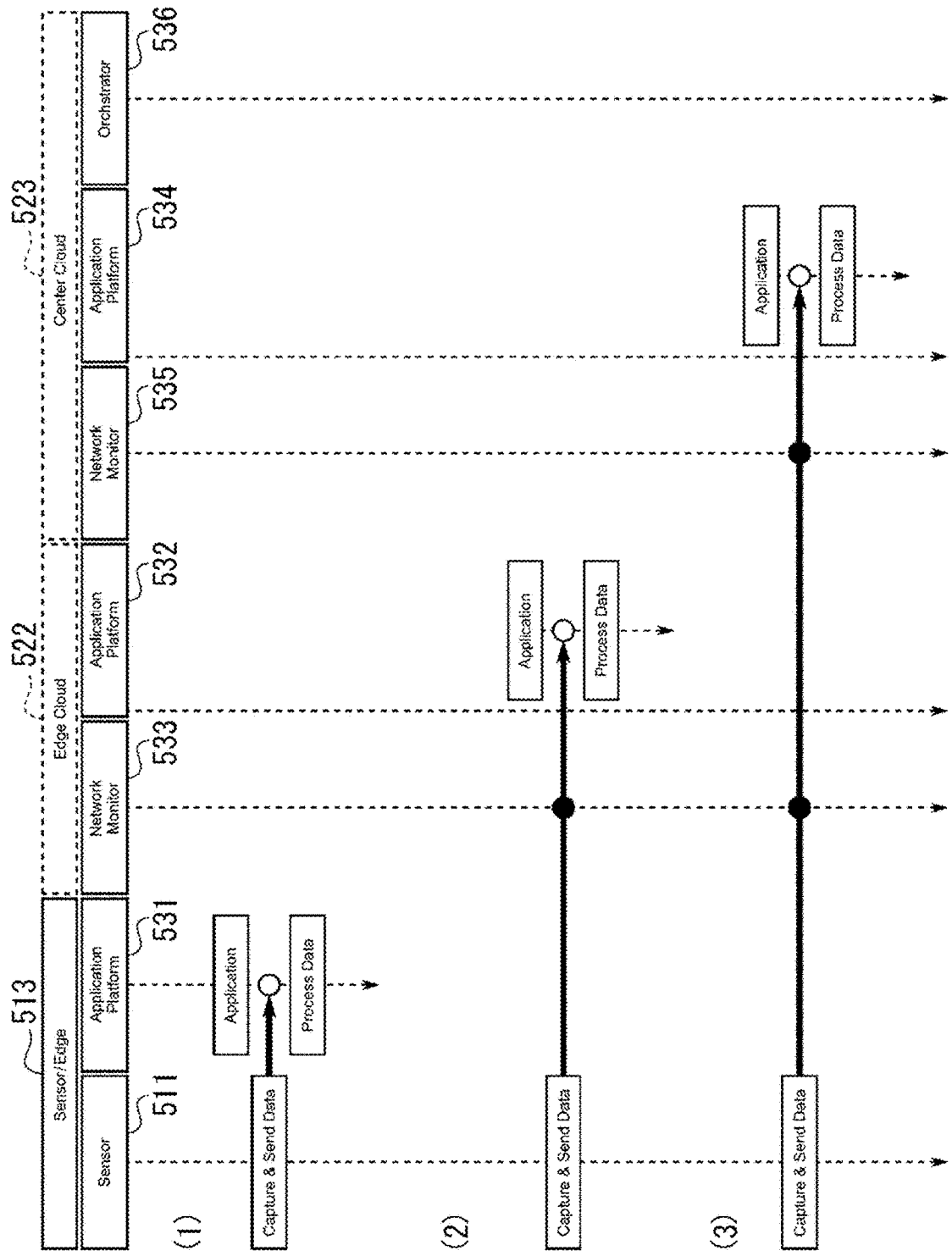
FIG. 4 is a diagram for explaining an application deployment policy.

FIG. 4 illustrates an example in which an application is deployed on each platform on the sensor/edge 513, the edge cloud 522, or the center cloud 523.

Specifically, Deployment (1) illustrated in FIG. 4 shows a deployment example in which the application is deployed and executed on the platform 531 on the sensor/edge 513. Deployment (2) shows a deployment example in which the application is deployed and executed on the platform 532 on the edge cloud 522. Deployment (3) shows a deployment example in which the application is deployed and executed on the platform 534 on the center cloud 523.

In FIG. 4, "Application" indicates a deployment location of an application that executes processing (hereinafter, referred to as main processing) corresponding to a requested service, such as analysis processing on an image obtained by the sensor 511 or a process of recognizing an object in the image. "Capture & Send Data" indicates a process of detecting generation of sensor data and sending to the application, similarly to steps S101 and S108 in FIG. 3 by the sensor 511. "Process Data" indicates a process of acquiring sensor data sent from the sensor 511 and executing the main processing, similar to steps S109 and S118 in FIG. 3.

As the optimal deployment policy, a case is considered in which reducing a processing delay due to a network transfer delay as much as possible is described in the manifest. The processing delay due to the network transfer delay becomes smaller as being closer to the sensor 511. In other words, the transfer delay increases in the order of the platform 531 on the sensor/edge 513, the platform 532 on the edge cloud 522, and the platform 534 on the center cloud 523.

Therefore, in a case where it is desired to reduce the processing delay due to the network transfer delay as much as possible, the orchestrator 536 gives highest priority to Deployment (1), and deploys the application in the priority order of Deployment (1), Deployment (2), and Deployment (3).

As the optimal deployment policy, a case is considered in which reducing a total amount of network traffic as much as possible is described in the manifest. The total amount of network traffic decreases as being closer to the sensor 511. In other words, the total amount of network traffic increases in the order of the platform 531 on the sensor/edge 513, the platform 532 on the edge cloud 522, and the platform 534 on the center cloud 523.

Therefore, in a case where it is desired to reduce the total amount of network traffic as much as possible, the orchestrator 536 gives highest priority to Deployment (1), and deploys the application in the priority order of Deployment (1), Deployment (2), and Deployment (3).

Also in a case where the manifest describes, as the optimal deployment policy, that other requirements can be ignored as long as both the processing delay due to the network transfer delay and the total amount of network traffic can be reduced as much as possible, the orchestrator 536 can give highest priority to Deployment (1), and deploy the application in the priority order of Deployment (1), Deployment (2), and Deployment (3).

A case is considered in which increasing a processing speed of the application as much as possible is described as the optimal deployment policy in the manifest. The processing speed of the application varies depending on the execution environment of the application, but increases in the order of the platform 531 on the sensor/edge 513, the platform 532 on the edge cloud 522, and the platform 534 on the center cloud 523.

Therefore, under a requirement that an application processing speed after being passed from a network interface is desired to be increased as much as possible, the orchestrator 536 gives highest priority to Deployment (3), and deploys the application in the priority order of Deployment (3), Deployment (2), and Deployment (1).

A case is considered in which reducing an execution cost of the application as much as possible, which is a cost required to execute the application, is described as the optimal deployment policy in the manifest. The execution cost of the application varies depending on a difference in an execution environment of the application, but the cost is lower as being closer to the center cloud 523 because calculation resources are more abundant. That is, the execution cost decreases in the order of the platform 531 on the sensor/edge 513, the platform 532 on the edge cloud 522, and the platform 534 on the center cloud 523.

Therefore, under a requirement that the execution cost of the application is desired to be reduced as much as possible, the orchestrator 536 gives highest priority to Deployment (3), and deploys the application in the priority order of Deployment (3), Deployment (2), and Deployment (1).

In a case where sensor data is temporarily or permanently stored in a storage and is used for multiple purposes, a case where store-and-forward is performed in which sensor data is temporarily cached and then transferred when a network on a path is unstable, and the like, a storage to store the sensor data is required. Securing the storage also involves a cost. A case is considered in which reducing a storage cost as much as possible is described as the optimal deployment policy in the manifest. The storage cost is also lower as being closer to the center cloud 523 because calculation resources are more abundant, and the storage cost is lower in the order of the platform 531 on the sensor/edge 513, the platform 532 on the edge cloud 522, and the platform 534 on the center cloud 523.

Therefore, under a requirement that the storage cost is desired to be reduced as much as possible, the orchestrator 536 gives highest priority to Deployment (3), and deploys the application in the priority order of Deployment (3), Deployment (2), and Deployment (1).

Also in a case where the manifest describes, as the optimal deployment policy, that other requirements can be ignored as long as two or more of the following are satisfied: an application processing speed is increased as much as possible; an application execution cost is as low as possible; or a storage cost is as low as possible, the orchestrator 536 can give highest priority to Deployment (3), and deploy the application in the priority order of Deployment (3), Deployment (2), and Deployment (1).

<Application Deployment Policy in Case where there is Pre-Processing>

The application deployment policy described with reference to FIG. 4 has been an example of a case where the application to be deployed is only one application that executes the main processing.

Next, a deployment policy will be described in a case of deploying two applications of: an application that executes the main processing; and an application that executes a process of compressing uncompressed sensor data (hereinafter, referred to as compression processing) as pre-processing before the main processing.

Figure 5:
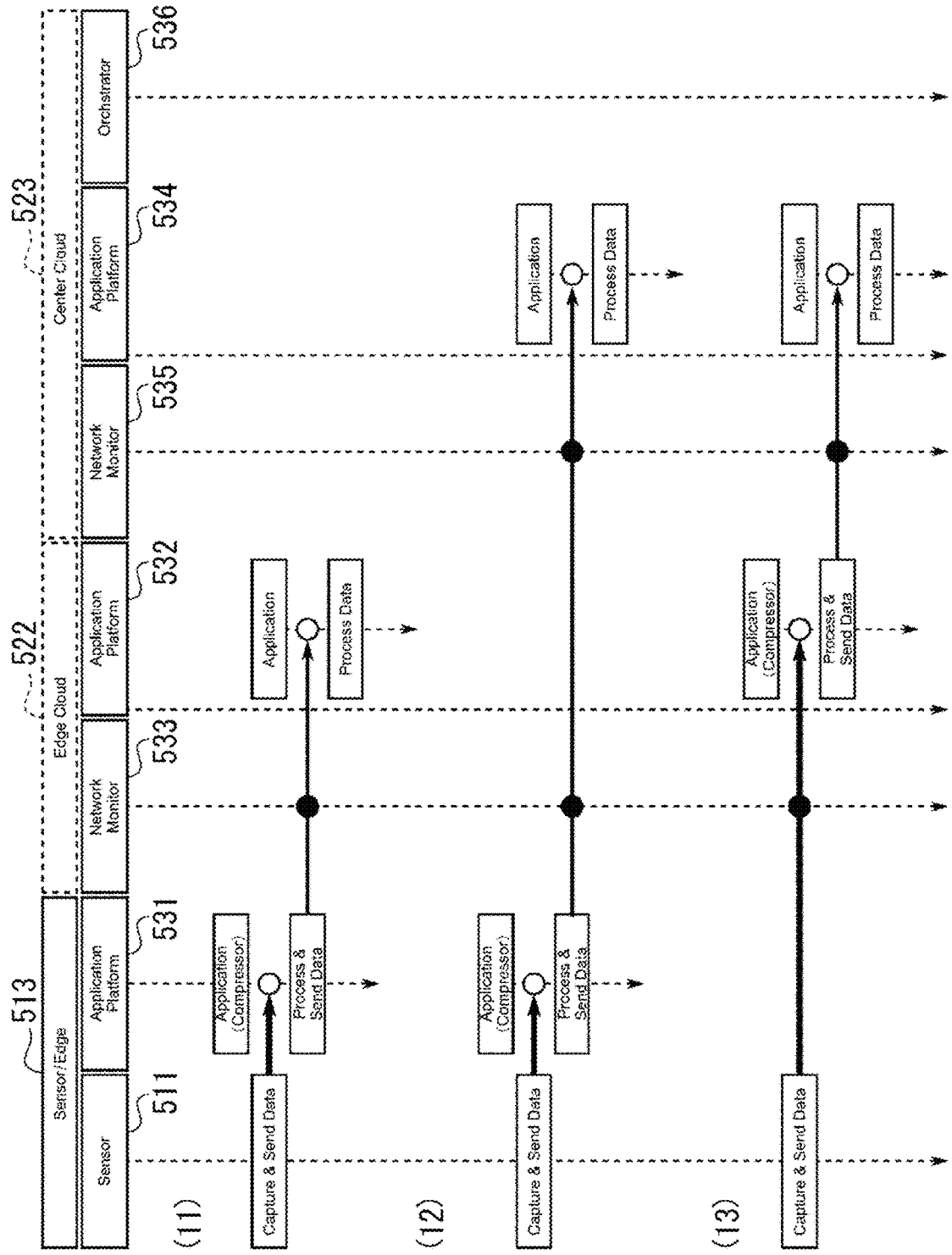
FIG. 5 is a diagram for explaining an application deployment policy in a case where compression processing is performed as pre-processing.

FIG. 5 illustrates an example in which two application are deployed on each platform on the sensor/edge 513, the edge cloud 522, or the center cloud 523.

In FIG. 5, "Application" indicates a deployment location of the application that executes the main processing. "Application (Compressor)" indicates a deployment location of the application that executes the compression processing. "Capture & Send Data" indicates a process in which the sensor 511 detects generation of sensor data and sends to the application. "Process & Send Data" of a platform on which the "Application (Compressor)" is deployed indicates a process in which the application that executes the compression processing executes the compression processing and sends the sensor data to the application that executes the main processing. "Process Data" indicates a process of acquiring sensor data after the compression processing and executing the main processing.

Deployment (11) illustrated in FIG. 5 shows a deployment example in which the application that performs the compression processing is deployed on the platform 531 on the sensor/edge 513, and the application that executes the main processing is deployed on the platform 532 on the edge cloud 522, to be executed. Deployment (12) shows a deployment example in which the application that performs the compression processing is deployed on the platform 531 on the sensor/edge 513, and the application that executes the main processing is deployed on the platform 534 on the center cloud 523, to be executed. Deployment (13) shows a deployment example in which the application that performs the compression processing is deployed on the platform 532 on the edge cloud 522, and the application that executes the main processing is deployed on the platform 534 on the center cloud 523, to be executed.

In FIG. 5, a thickness of an arrow indicating transfer of sensor data indicates a difference in bandwidth according to the presence or absence of the compression processing, and uncompressed data requires a wider band than compressed data. Furthermore, in a case where the compression processing is performed, a delay before transfer to the network occurs as compared with a case of non-compression.

In Deployment (11), the processing delay due to the network transfer delay is smaller and the network traffic is smaller, but the application processing speed is slower, the execution cost is higher, and the storage cost is higher as compared with Deployment (12) and Deployment (13).

In Deployment (12), the processing delay due to the network transfer delay is larger and the network traffic is more increased, but the application processing speed is faster, the execution cost is lower, and the storage cost is lower as compared with Deployment (11). Furthermore, in Deployment (12), the processing delay due to the network transfer delay is smaller and the network traffic is lower, but the application processing speed is slower, the execution cost is higher, and the storage cost is higher, as compared with Deployment (13).

In Deployment (13), the processing delay due to the network transfer delay is larger and the network traffic is more increased, but the application processing speed is higher, the execution cost is lower, and the storage cost is lower, as compared with Deployment (11) and Deployment (12).

As described above, in a case of deploying two applications of the application that executes the main processing and the application that executes the compression processing as pre-processing before the main processing, under a requirement that the processing delay due to the network transfer delay and/or the network traffic is desired to be made smaller, the orchestrator 536 gives highest priority to Deployment (11), and deploys the application in the priority order of Deployment (11), Deployment (12), and Deployment (13). Furthermore, under a requirement that the application processing speed is desired to be faster, the execution cost is desired to be lower, and the storage cost is desired to be lower, the orchestrator 536 gives highest priority to Deployment (13) and deploys the application in the priority order of Deployment (13), Deployment (12), and Deployment (11).

<Application Deployment Policy in Case where there is Individualized Processing>

Next, a description will be given to a deployment policy in a case of deploying two applications of the application that executes the main processing and an application that executes processing (hereinafter, referred to as individualized processing) individualized in accordance with contents of the main processing by advanced artificial intelligence (AI) processing or the like, as pre-processing before the main processing.

Figure 6:
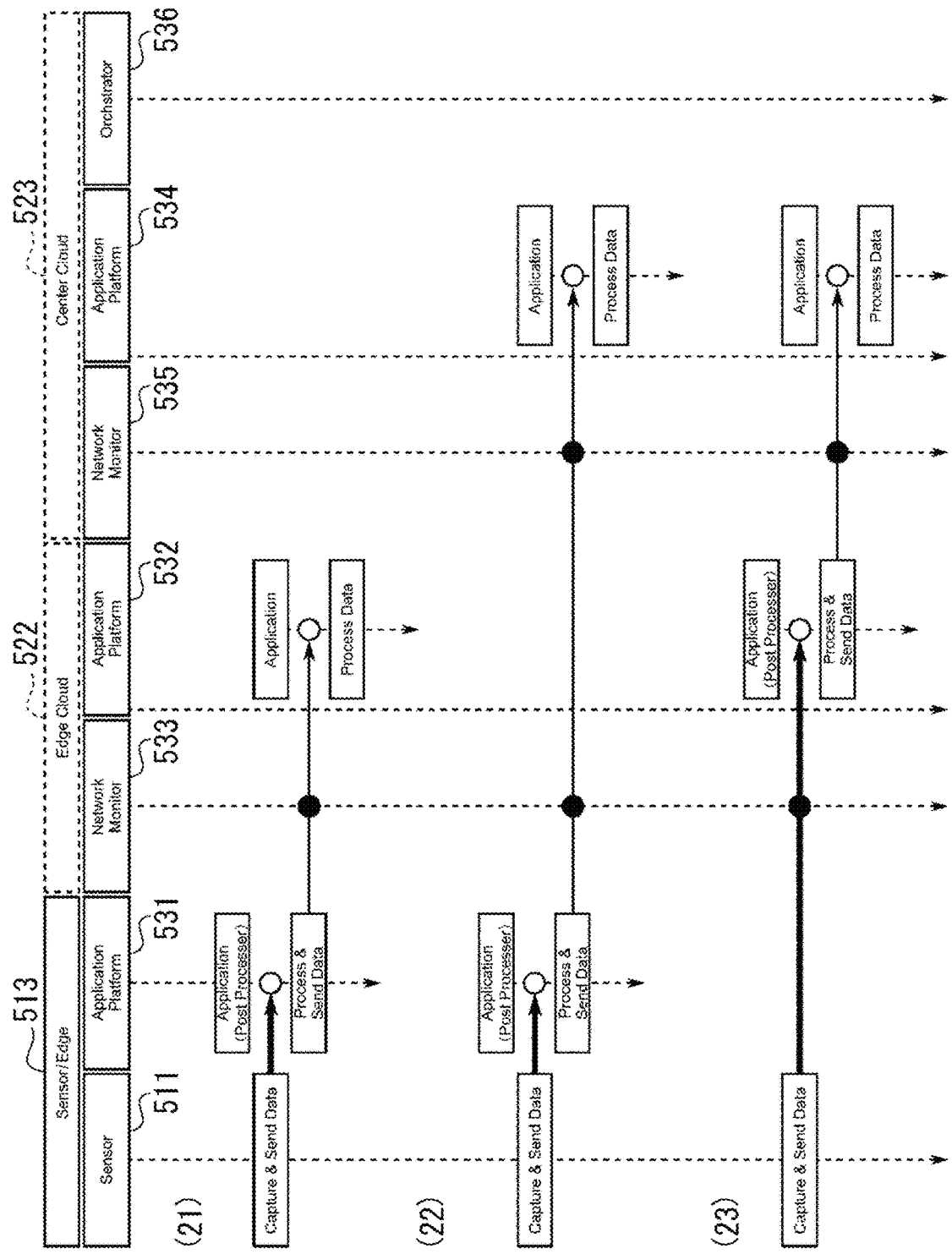
FIG. 6 is a diagram for explaining an application deployment policy in a case where the compression processing is performed as pre-processing.

FIG. 6 illustrates an example in which two application are deployed on each platform on the sensor/edge 513, the edge cloud 522, or the center cloud 523.

In FIG. 6, "Application" indicates a deployment location of the application that executes the main processing. "Application (Post Processor)" indicates a deployment location of the application that executes the individualized processing. "Capture & Send Data" indicates a process in which the sensor 511 detects generation of sensor data and sends to the application. "Process & Send Data" of a platform on which "Application (Post Processor)" is deployed indicates a process in which the application that executes the individualized processing executes the individualized processing and sends the sensor data to the application that executes the main processing. "Process Data" indicates a process of acquiring the sensor data after the individualized processing and executing the main processing.

The individualized processing according to the contents of the main processing can also be feature quantity extraction processing of extracting a feature quantity of sensor data, feature recognition processing of recognizing a feature of sensor data, for example, a process of recognizing an object in an image and outputting a location or a shape of the object, or the like. The individualized processing can be expected to have a much larger compression effect than the compression processing that is the pre-processing described in FIG. 5, but a delay before network transfer becomes large.

Deployment (21) illustrated in FIG. 6 shows a deployment example in which the application that performs the individualized processing is deployed on the platform 531 on the sensor/edge 513, and the application that executes the main processing is deployed on the platform 532 on the edge cloud 522, to be executed. Deployment (22) shows a deployment example in which the application that performs the individualized processing is deployed on the platform 531 on the sensor/edge 513, and the application that executes the main processing is deployed on the platform 534 on the center cloud 523, to be executed. Deployment (23) shows a deployment example in which the application that performs the individualized processing is deployed on the platform 532 on the edge cloud 522, and the application that executes the main processing is deployed on the platform 534 on the center cloud 523, to be executed.

In FIG. 6, a thickness of an arrow indicating transfer of sensor data indicates a difference in bandwidth according to the presence or absence of the individualized processing, and individualized processing data can be transmitted in a band narrower than that of compressed data and uncompressed data.

In Deployment (21), the processing delay due to the network transfer delay is smaller and the network traffic is smaller, but the application processing speed is slower, the execution cost is higher, and the storage cost is higher as compared with Deployment (22) and Deployment (23).

In Deployment (22), the processing delay due to the network transfer delay is larger and the network traffic is more increased, but the application processing speed is faster, the execution cost is lower, and the storage cost is lower as compared with Deployment (21). Furthermore, in Deployment (22), the processing delay due to the network transfer delay is smaller and the network traffic is lower, but the application processing speed is slower, the execution cost is higher, and the storage cost is higher, as compared with Deployment (23).

In Deployment (23), the processing delay due to the network transfer delay is larger and the network traffic is more increased, but the application processing speed is higher, the execution cost is lower, and the storage cost is lower, as compared with Deployment (21) and Deployment (22).

As described above, in a case of deploying two applications of the application that executes the main processing and the application that executes the individualized processing as pre-processing before the main processing, under a requirement that the processing delay due to the network transfer delay and/or the network traffic is desired to be made smaller, the orchestrator 536 gives highest priority to Deployment (21), and deploys the application in the priority order of Deployment (21), Deployment (22), and Deployment (23). Furthermore, under a requirement that the application processing speed is desired to be faster, the execution cost is desired to be lower, and the storage cost is desired to be lower, the orchestrator 536 gives highest priority to Deployment (23) and deploys the application in the priority order of Deployment (23), Deployment (22), and Deployment (21).

Figure 7:
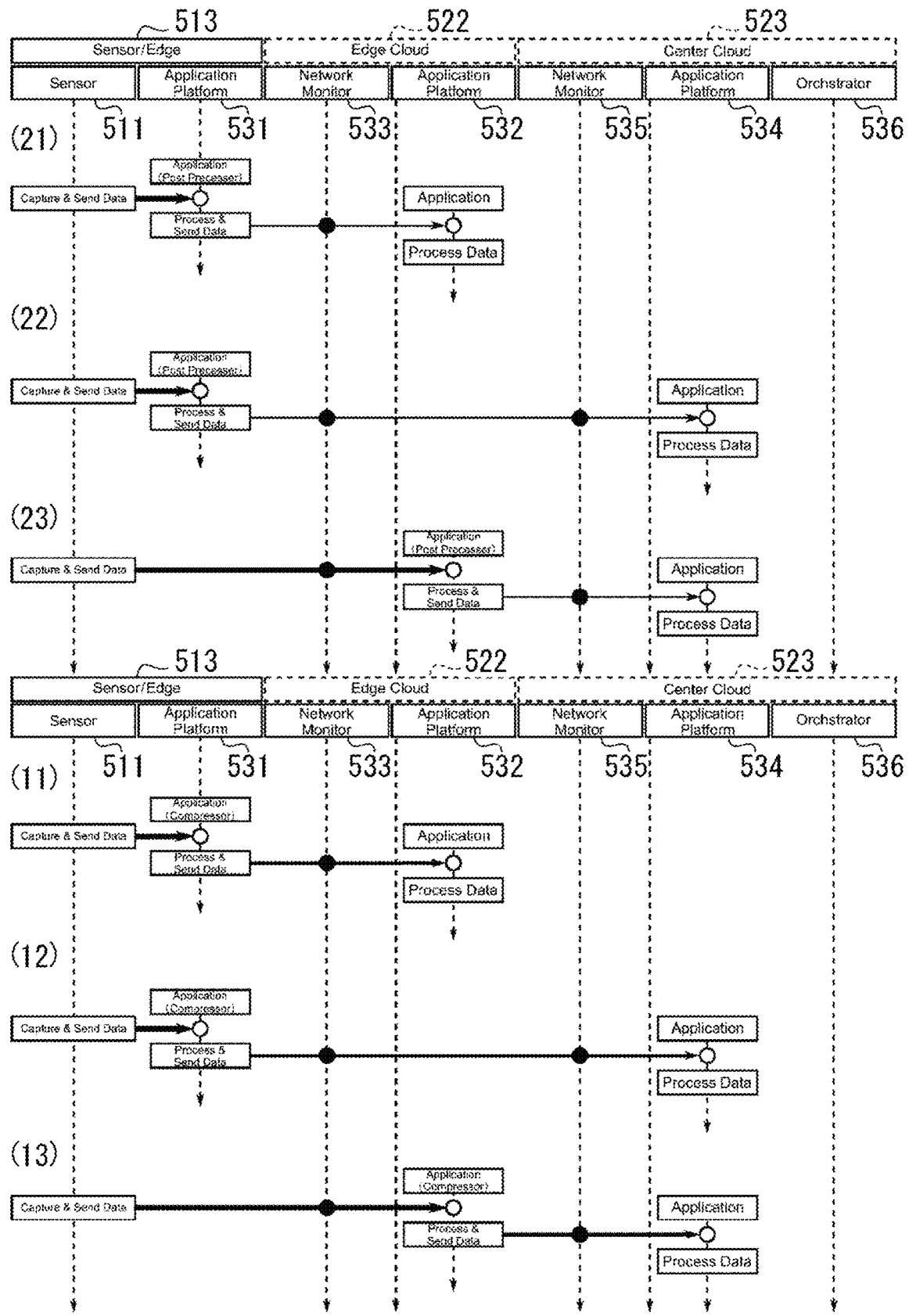
FIG. 7 is a diagram illustrating application deployment examples of FIGS. 5 and 6 in comparison.

FIG. 7 is a diagram in which the application deployment example of FIG. 5 in which the compression processing is performed as the pre-processing and the application deployment example of FIG. 6 in which the individualized processing is performed as the pre-processing, with FIG. 6 on an upper side and FIG. 5 on a lower side.

In Deployment (21) and Deployment (11), Deployment (22) and Deployment (12), or Deployment (23) and Deployment (13), those having the same deployment of the application that executes pre-processing and the application that executes the main processing are compared.

Deployment (21) can reduce the network traffic as compared with Deployment (11). Similarly, Deployment (22) can reduce the network traffic as compared with Deployment (12), and Deployment (23) can reduce the network traffic as compared to Deployment (13).

As described above, when the application that performs the individualized processing is introduced as pre-processing, it can be said that an effect of further reducing the network traffic can be expected as compared with a case where the application that performs the compression processing is introduced as pre-processing. Note that it is not possible to simply compare applications having different deployment, such as, for example, a comparison between Deployment (23) and Deployment (11).

<Application Deployment Policy in Case of Multi-Stage Deployment of Individualized Processing>

Figure 8:
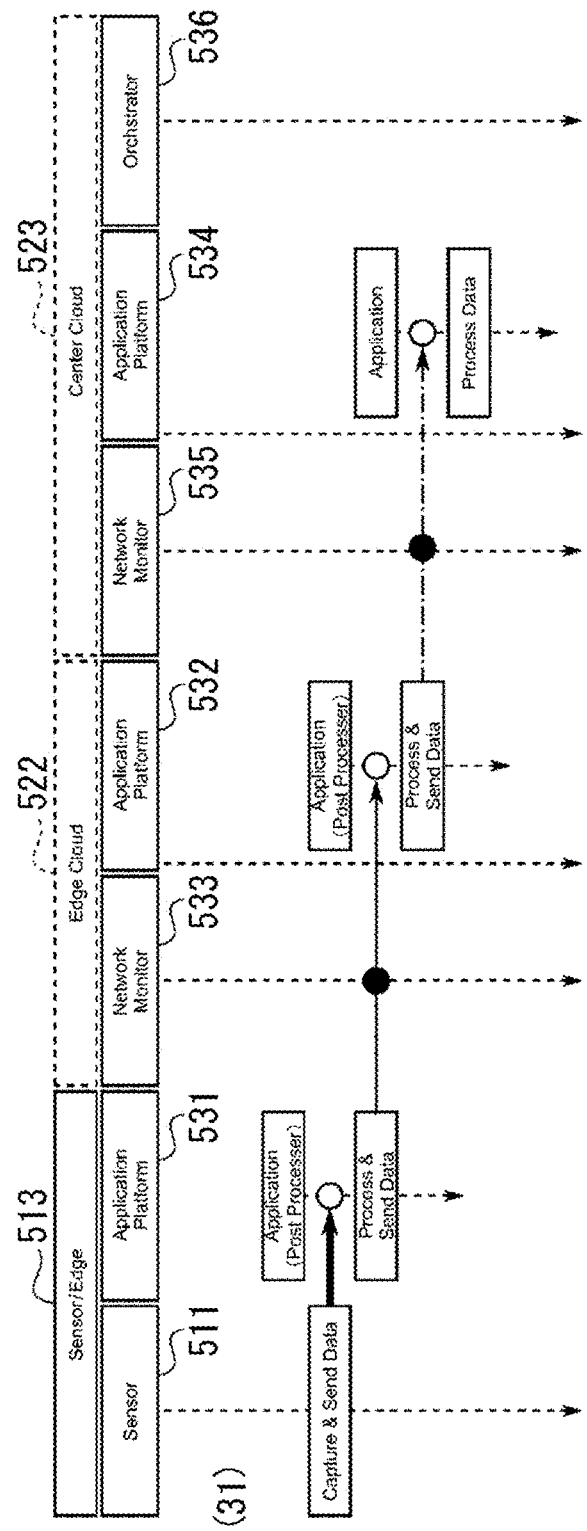
FIG. 8 is a diagram for explaining an application deployment policy in a case where individualized processing is deployed in multiple stages.
Figure 9:
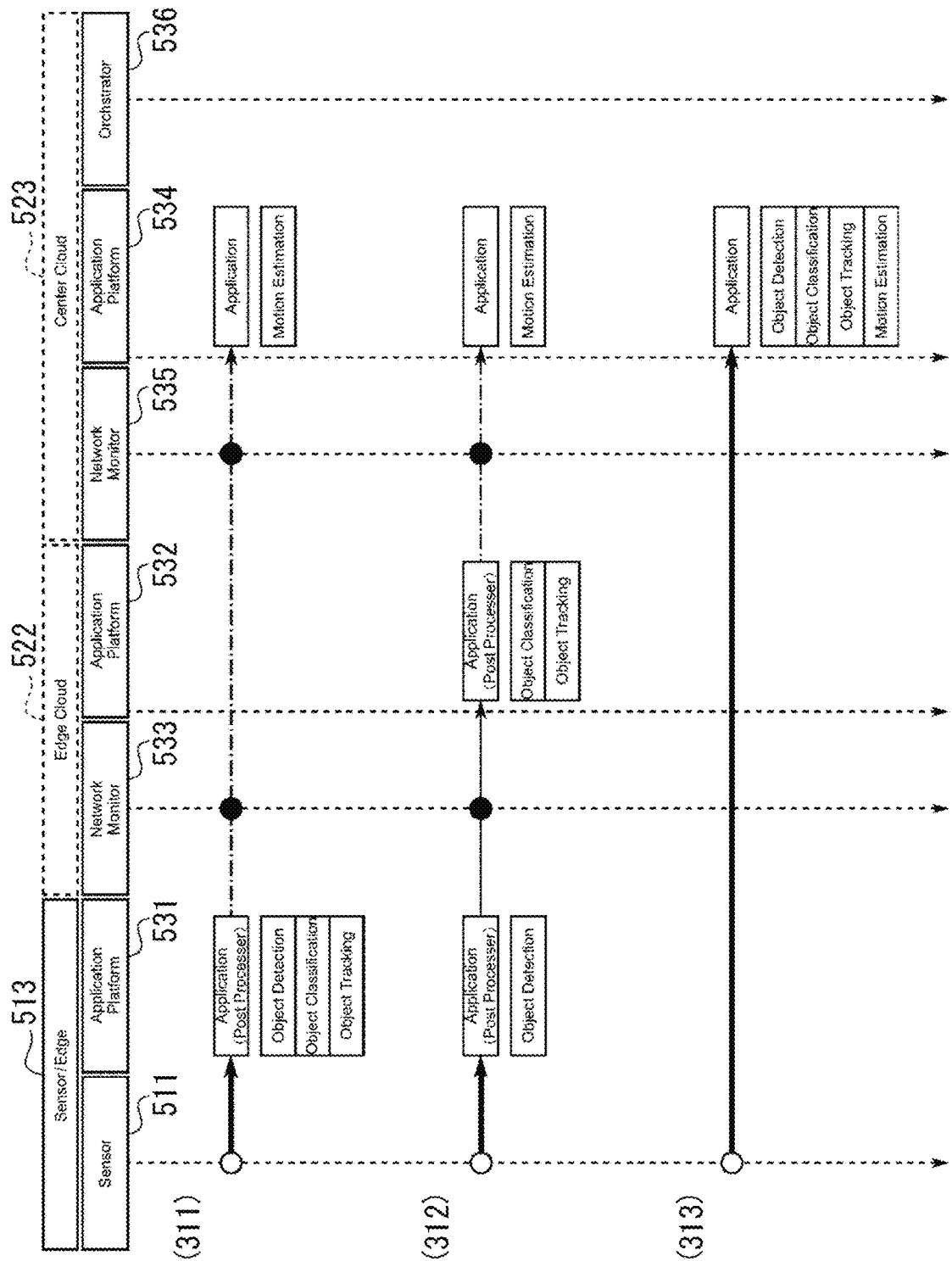
FIG. 9 is a diagram for explaining an application deployment policy in a case where the individualized processing is deployed in multiple stages.

FIGS. 8 and 9 illustrate variation examples of the deployment example of FIG. 6 in which the application that executes the individualized processing is deployed as pre-processing before the main processing.

As in Deployment (31) illustrated in FIG. 8, it is possible to adopt an application deployment in which a plurality of applications that performs the individualized processing is deployed in a preceding stage of the application that performs the main processing. Specifically, in Deployment (31), an application that performs first individualized processing is deployed on the platform 531 on the sensor/edge 513, an application that performs second individualized processing is deployed on the platform 532 on the edge cloud 522, and the application that performs the main processing is deployed on the platform 534 on the center cloud 523.

The multi-stage deployment of the applications that perform the individualized processing enables the individualized processing (AI processing) with a higher abstraction level to be performed in stages, and data more optimized according to individual requirements of the application to be finally delivered to the application that performs the main processing. However, execution of the individualized processing in stages increases a processing delay. An arrow of a one dotted chain line indicates that network traffic is smaller than an arrow of a thin solid line.

Examples of multi-stage deployment of the applications that perform the individualized processing include the following cases.

Case of Specifying Object Having Complex Trajectory

The application of the platform 531 on the sensor/edge 513 performs object (ROI) extraction, the application of the platform 532 on the edge cloud 522 performs trajectory tracking of multiple objects, and the application of the platform 534 on the center cloud 523 performs object content understanding and specification of the target object.

Case of Specifying Type of Observation Target Object and Performing Trajectory Estimation The application of the platform 531 on the sensor/edge 513 performs object (ROI) extraction, the application of the platform 532 on the edge cloud 522 performs object content understanding, specification of a target object, and trajectory tracking of the specified object, and the application of the platform 534 on the center cloud 523 performs trajectory estimation of the target object.

In this way, the type of individualization and the abstraction level can be determined according to individual requirements of the application, and the applications can be optimally deployed in a plurality of platforms in consideration of a calculation cost or the like according to the complexity of the processing.

FIG. 9 illustrates an example in which applications are deployed in multi-stage deployment and a single-stage deployment in a case where processing is performed in the order of object detection, object content understanding/classification, object trajectory tracking, and trajectory estimation.

In FIG. 9, "Object Detection" indicates that object detection processing is performed, and "Object Classification" indicates that object content understanding and classification processing is performed. "Object Tracking" indicates that object trajectory tracking processing is performed, and "Motion Estimation" indicates that trajectory estimation processing is performed.

Deployment (311) indicates a deployment example in which object detection, object content understanding/classification, and object trajectory tracking are executed by the application that executes the individualized processing deployed on the platform 531 on the sensor/edge 513, and the trajectory estimation is executed by the application that executes the main processing deployed on the platform 534 on the center cloud 523.

Deployment (312) indicates a deployment example in which object detection is executed by the application that performs the individualized processing deployed on the platform 531 on the sensor/edge 513, object content understanding/classification and object trajectory tracking are executed by the application that executes the individualized processing deployed on the platform 532 on the edge cloud 522, and the trajectory estimation is executed by the application that executes the main processing deployed on the platform 534 on the center cloud 523.

Deployment (313) indicates a deployment example in which all of object detection, object content understanding/classification, object trajectory tracking, and trajectory estimation are executed by the application that executes the main processing deployed on the platform 534 on the center cloud 523. Deployment (313) is the same as Deployment (3) in FIG. 4.

A total amount of network traffic increases in the order of Deployment (311), Deployment (312), and Deployment (313), as indicated by a thickness of an arrow. An arrow of a one dotted chain line indicates that network traffic is smaller than an arrow of a thin solid line.

In a case where reducing the total amount of network traffic as much as possible is described as the optimal deployment policy in the manifest, the orchestrator 536 gives highest priority to Deployment (311) and deploys the application in the priority order of Deployment (311), Deployment (312), and Deployment (313).

In a case where obtaining a faster application processing speed, a lower execution cost, and a lower storage cost is described as the optimal deployment policy in the manifest, the orchestrator 536 gives highest priority to Deployment (313), and deploys the application in the priority order of Deployment (313), Deployment (312), and Deployment (311).

Note that, it is needless to say that a deployment example in which four processes of object detection, object content understanding/classification, object trajectory tracking, and trajectory estimation are dispersedly executed by the plurality of applications that executes the individualized processing may take other than the deployment example of Deployment (312) described above.

<Application Deployment Policy in Case where Reusability is Emphasized>

Next, with reference to FIG. 10, an application deployment policy in a case where reusability is emphasized will be described.

There may be a case where reusability of sensor data is emphasized. That is, there is a case where it is desired to give priority to sharing and using sensor data generated by the sensor 511 by a plurality of applications, or to be able to use sensor data offline at another timing after a certain time elapses from the time of generating the sensor data.

In a case where reusability of sensor data is not considered, generated sensor data is only required to be delivered to an application that uses the data. Therefore, as in Deployment (41) illustrated in FIG. 10, the sensor data is transferred to an application deployed on any of the sensor/edge 513, the edge cloud 522, or the center cloud 523 by peer to peer (P2P). Deployment (41) of FIG. 10 is the same as Deployment (1) to (3) illustrated in FIG. 4.

Figure 10:
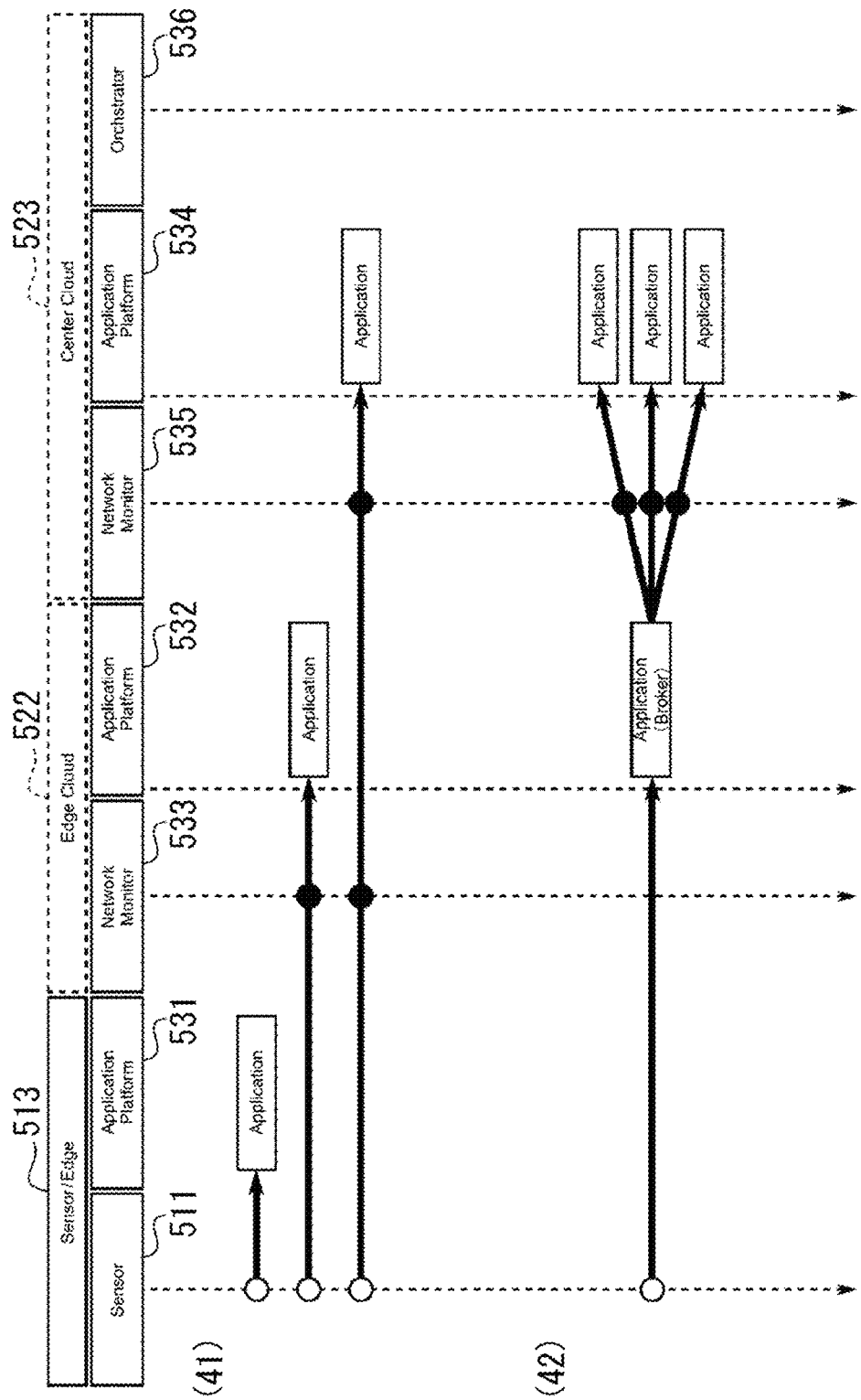
FIG. 10 is a diagram for explaining an application deployment policy in a case where reusability is emphasized.

On the other hand, in a case where reusability of sensor data is emphasized, an application that temporarily or permanently caches (stores) sensor data is deployed as preprocessing before the main processing, as in Deployment (42) illustrated in FIG. 10. Deployment (42) indicates a deployment example in which the application that temporarily or permanently caches sensor data is deployed on the platform 532 on the edge cloud 522, and the application that executes the main processing is deployed on the platform 534 on the center cloud 523, to be executed.

In FIG. 10, "Application" indicates a deployment location of the application that executes the main processing. "Application (Broker)" indicates a deployment location of the application that temporarily or permanently caches sensor data. In Deployment (42), sensor data sent from the sensor/edge 513 is transferred to the application deployed on the platform 532 on the edge cloud 522. The application on the edge cloud 522 temporarily or permanently caches the acquired sensor data, and sends the sensor data to three applications deployed on the platform 534 on the center cloud 523. The main processing executed by the three applications on the center cloud 523 may be the same processing or different processing. In a case where the same processing is executed, for example, the performance of the processing is different in some cases between an application that takes time but can execute at low cost and an application that can execute at high cost and at high speed.

As described above, under a requirement in which reusability of the sensor data is emphasized (reusability is increased), the orchestrator 536 gives highest priority to Deployment (42), and deploys the application in the priority order of Deployment (42) and Deployment (41).

Moreover, on the premise that reusability of sensor data is emphasized, network traffic may be minimized or reduced by further performing the compression processing or the individualized processing as illustrated in FIGS. 5 and 6.

Figure 11:
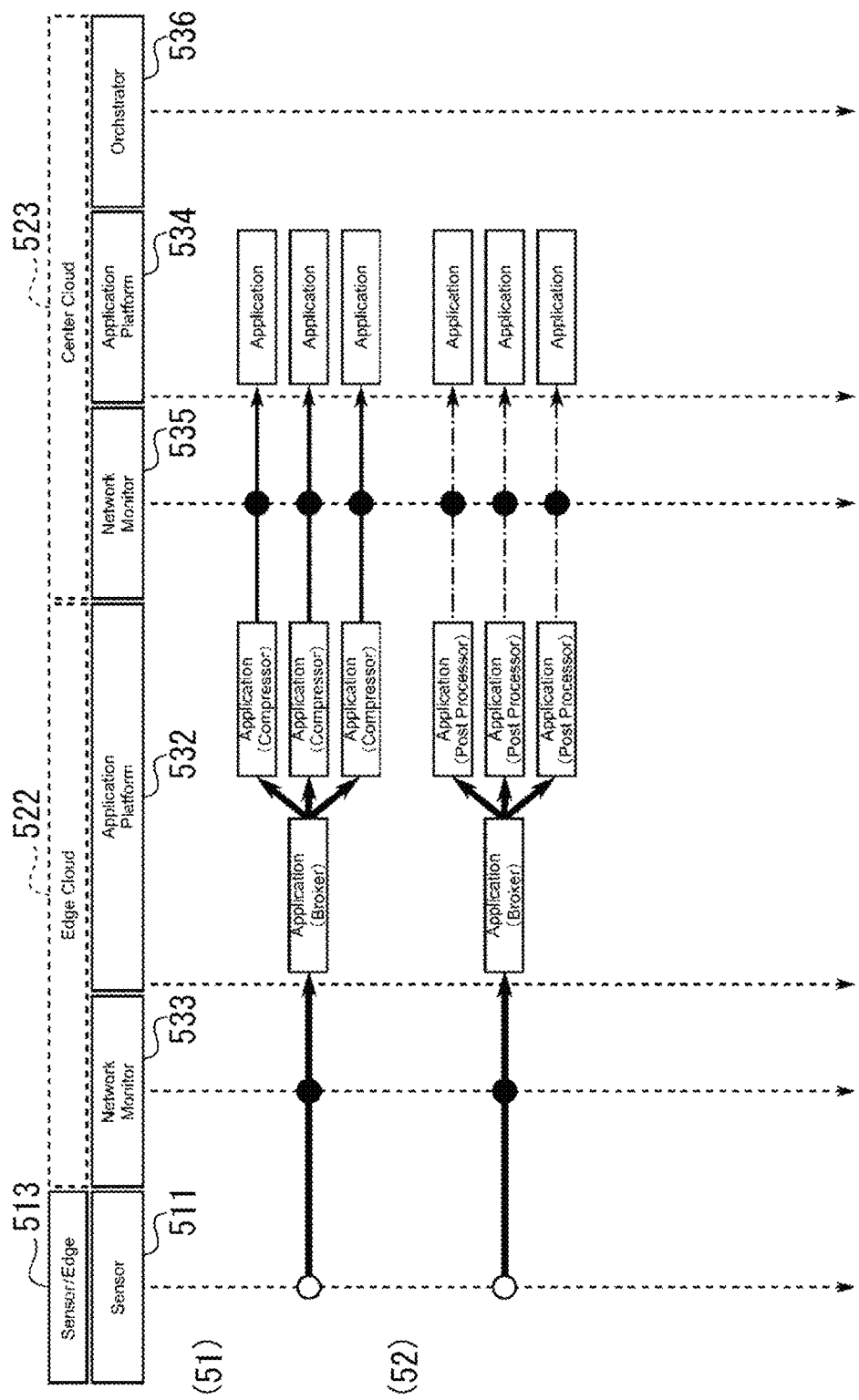
FIG. 11 is a diagram for explaining an application deployment policy in a case where reusability is emphasized.

FIG. 11 illustrates a deployment example of an application in a case where reusability of sensor data and the compression processing or the individualized processing are used together.

Specifically, Deployment (51) illustrated in FIG. 11 indicates a deployment example in which the application that temporarily or permanently caches sensor data and the application that performs the compression processing is deployed on the platform 532 on the edge cloud 522, and the application that executes the main processing is deployed on the platform 534 on the center cloud 523, to be executed. In the platform 532 on the edge cloud 522, the application that performs the compression processing is deployed at a subsequent stage of the application that caches sensor data.

Deployment (52) indicates a deployment example in which the application that temporarily or permanently caches sensor data and the application that performs the individualized processing is deployed on the platform 532 on the edge cloud 522, and the application that executes the main processing is deployed on the platform 534 on the center cloud 523, to be executed. In the platform 532 on the edge cloud 522, the application that performs the individualized processing is deployed at a subsequent stage of the application that caches sensor data.

In Deployment (51) and Deployment (52) of FIG. 11, the application that performs the compression processing or the application that performs the individualized processing is provided for each of the three applications deployed on the platform 534 on the center cloud 523. The three applications that perform the compression processing or the individualized processing perform different compression processing or individualized processing according to a requirement of the application. In a case where it is sufficient to execute the same compression processing or individualized processing, one application can perform these pieces of pre-processing.

As described with reference to FIG. 7, the total amount of network traffic can be made smaller by performing the individualized processing than the compression processing. Therefore, as indicated by a thickness of an arrow, Deployment (52) can reduce network traffic as compared with Deployment (51).

As described above, in a case of further reducing the network traffic under a requirement in which reusability of the sensor data is emphasized (reusability is increased), the orchestrator 536 gives highest priority to Deployment (52), and deploys the application in the priority order of Deployment (52) and Deployment (51).

<Summary of Evaluation Axis and Application Deployment Policy>

FIG. 12 is a table that summarizes evaluation axes at a time of application deployment and priority orders (a deployment policy) of the application deployment in that case, described with reference to FIGS. 4 to 11. The evaluation axes include a processing delay due to a network transfer delay, network traffic, a processing speed of an application, an execution cost of the application, a storage cost, reusability of sensor data, and whether to execute pre-processing before executing main processing corresponding to a requested service. Note that the sets of the evaluation axis and the priority order do not need to be all included, and it is sufficient that at least one set is included. The priority order of the application deployment is the priority order of the sensor/edge 513, the edge cloud 522, and the center cloud 523 as the application deployment location.

Information illustrated in FIG. 12 is provided as the manifest from the sensor network service operator 541 to the orchestrator 536. On the basis of the supplied manifest, the orchestrator 536 performs optimal deployment of the application in consideration of various kinds of trade-off.

That is, the orchestrator 536 determines an optimal location of the application platform on which the application is executed on the basis of the deployment policy of FIG. 12 in the process of "Evaluate & Determine Target App Platform" of the application deployment control described with reference to FIG. 3. The orchestrator 536 reduces traffic in a network, and reduces a processing load of an application that performs data processing, for example, by localizing data processing of sensor data to a predetermined platform, deploying the data processing in multiple stages in two or more of the sensor/edge 513, the edge cloud 522, or the center cloud 523, and performing the compression processing or the individualized processing before transferring.

<4. Configuration Example of Cloud Computing>

The method and the system described in this specification, including the data processing system and the application deployment control method described above, can be implemented using computer programming or engineering techniques, including computer software, firmware, hardware, or a combination or subset thereof.

FIG. 13 illustrates a block diagram of a computer in which various embodiments described in this specification can be implemented.

The present disclosure can be implemented as a system, a method, and/or a computer program. The computer program may include a computer-readable storage medium, and computer-readable program instructions that cause one or more processors to execute aspects of the embodiments are recorded on the computer-readable storage medium.

The computer-readable storage medium can be a tangible device that can store instructions for use in an instruction execution device (a processor). The computer-readable storage medium may be, for example, but not limited to, an electronic storage device, a magnetic storage device, an optical storage device, an electromagnetic storage device, a semiconductor storage device, or any suitable combination of those devices. More specific examples of the computer-readable storage medium include each (and suitable combinations) of the following: a flexible disk, a hard disk, a solid state drive (SSD), a random access memory (RAM), a read only memory (ROM), an erasable and programmable read only memory (EPROM) or a flash memory (Flash), a static random access memory (SRAM), a compact disk (CD or CD-ROM), a digital versatile disc (DVD), and a card type or a stick type memory. The computer-readable storage medium as used in the present disclosure is not to be construed as being a transitory signal itself, such as a radio wave or other freely propagating electromagnetic wave, an electromagnetic wave propagating through a waveguide or other transmission medium (for example, a light pulse through an optical fiber cable), or an electrical signal sent over a wire.

Computer-readable program instructions of the present disclosure may be downloaded from the computer-readable storage medium to a suitable computing or processing device, or may be downloaded to an external computer or external storage, for example, via a global network such as the Internet, a local area network, a wide area network, and/or a wireless network. The network includes a copper transmission line, an optical communication fiber, wireless transmission, a router, a firewall, a switch, a gateway computer, an edge server, and/or the like. A network adapter card or a network interface in a computing device or a processing device can receive the computer-readable program instructions from the network, and transfer and store the computer-readable program instructions on the computer-readable storage medium in the computing device or the processing device.

The computer-readable program instructions for executing the processes of the present disclosure include machine language instructions and/or microcode, and these are compiled or interpreted from source code written in any combination of one or more grogram languages, including an assembly language, Basic, Fortran, Java, Python, R, C, C++, C#, or similar programming languages. The computer-readable program instructions can be executed completely on a user's personal computer, notebook computer, tablet, or smartphone, and can also be executed completely on a remote computer or computer server, or any combination of these computing devices. The remote computer or computer server may be connected to a user's device or a device via a computer network, such as a local area network, a wide area network, or a global network (for example, the Internet). In order to implement aspects of the present disclosure, there is also an embodiment in which, for example, an electric circuit including a programmable logic circuit, a field-programmable gate array (FPGA), and a programmable logic array (PLA) uses information from computer-readable program instructions for configuring or customizing the electronic circuit, and execute the computer-readable program instructions.

Aspects of the present disclosure are described in this specification with reference to flowcharts and block diagrams of a method, a device (a system), and a computer program according to an embodiment of the disclosure. It will be understood by those skilled in the art that each block of the flowcharts and the block diagrams, and combinations of blocks in the flowcharts and the block diagrams can be implemented by computer-readable program instructions.

The computer-readable program instructions capable of executing the system and the method described in the present disclosure are used by one or more processors (and/or one or more cores in the processor) of a general purpose computer, a special purpose computer, or other programmable devices for manufacturing a device. By executing program instructions via a processor of a computer or other programmable devices, a system for implementing functions described in the flowcharts and the block diagrams of the present disclosure is created. These computer-readable program instructions may also be stored in a computer-readable storage medium that can instruct a computer, a programmable device, and/or other devices to function in a specific method. Accordingly, the computer-readable storage medium storing instructions is an article of manufacture including instructions for implementing aspects of the functions specified in the flowcharts and the block diagrams of the present disclosure.

The computer-readable program instructions are loaded onto a computer, other programmable device, or other device, and execute a series of operational steps on the computer, other programmable device, or other device, to generate a processing result of the computer. By the program instructions being executed on the computer, other programmable device, or other device, functions specified in the flowcharts and the block diagrams of the present disclosure is implemented.

FIG. 13 is a functional block diagram of a network system 800 in which one or a plurality of computers, servers, and the like are connected via a network. It should be noted that hardware and software environments shown in an embodiment of FIG. 13 is shown as an example of providing a platform for implementing software and/or a method according to the present disclosure.

As illustrated in FIG. 13, the network system 800 may include, but is not limited to, a computer 805, a network 810, a remote computer 815, a web server 820, a cloud storage server 825, and a computer server 830. In one embodiment, multiple instances of one or more functional blocks illustrated in FIG. 13 are used.

FIG. 13 illustrates a more detailed configuration of the computer 805. Note that the functional blocks illustrated in the computer 805 are illustrated to establish exemplary functions and not all illustrated. Furthermore, although detailed configurations of the remote computer 815, the web server 820, the cloud storage server 825, and the computer server 830 are not illustrated, they may include configurations similar to the functional blocks illustrated for the computer 805.

As the computer 805, it is possible to use a personal computer (PC), a desktop computer, a laptop computer, a tablet computer, a netbook computer, a personal digital assistant (PDA), a smartphone, or any other programmable electronic device capable of communicating with other devices on the network 810.

Then, the computer 805 includes a processor 835, a bus 837, a memory 840, a non-volatile storage 845, a network interface 850, a peripheral interface 855, and a display interface 865. Each of these functions may be implemented as an individual electronic subsystem (an integrated circuit chip or a combination of a chip and an associated device) in one embodiment, and some functions may be combined and implemented as a single chip (system on chip or SoC) in another embodiment.

The processor 835 can be one or more single or multi-chip microprocessors, such as, for example, one designed and/or manufactured by Intel Corporation, Advanced Micro Devices, Inc. (AMD), Arm Holdings (Arm), or Apple Computer. Examples of the microprocessor include Celeron, Pentium, Core i3, Core i5, and Core i7 manufactured by Intel Corporation, Opteron, Phenom, Athlon, Turion, and Ryzen manufactured by AMD, and Cortex-A, Cortex-R, and Cortex-M manufactured by Arm.

The bus 837 can employ a high speed parallel or serial peripheral interconnection bus of a proprietary or industry standard, such as, for example, ISA, PCI, PCI Express (PCI-e), or AGP.

The memory 840 and the non-volatile storage 845 are computer-readable storage media. The memory 840 can employ any suitable volatile storage device, such as a dynamic random access memory (DRAM) or a static RAM (SRAM). For the non-volatile storage 845, it is possible to adopt one or more of a flexible disk, a hard disk, a solid state drive (SSD), a read only memory (ROM), an erasable and programmable read only memory (EPROM), a flash memory, a compact disc (CD or CD-ROM), a digital versatile disc (DVD), a card type memory, or a stick type memory.

Furthermore, a program 848 is also a set of machine readable instructions and/or data. This set is stored in the non-volatile storage 845, and is used to create, manage, and control a specific software function explained in detail in the present disclosure and described in the drawings. Note that, in a configuration in which the memory 840 is much faster than the non-volatile storage 845, the program 848 can be transferred from the non-volatile storage 845 to the memory 840 before being executed by the processor 835.

Via the network interface 850, the computer 805 can communicate with and interact with other computers via the network 810. For the network 810, a configuration can be adopted including wired, wireless, or optical fiber connection by, for example, a local area network (LAN), a wide area network (WAN) such as the Internet, or a combination of LAN and WAN. In general, the network 810 includes any combination of connections and protocols that support communication between two or more computers and associated devices.

The peripheral interface 855 can input and output data to and from other devices that can be locally connected to the computer 805. For example, the peripheral interface 855 provides a connection to an external device 860. As the external device 860, a keyboard, a mouse, a keypad, a touch screen, and/or other suitable input devices are used. The external device 860 may also include a portable computer-readable storage medium, such as, for example, a thumb drive, a portable optical disk or a magnetic disk, or a memory card. Software and data for implementing an embodiment of the present disclosure, for example, the program 848, may be stored on such a portable computer-readable storage medium. In such an embodiment, software may be loaded onto the non-volatile storage 845, or alternatively may be loaded directly onto the memory 840 via the peripheral interface 855. The peripheral interface 855 may use an industry standard, such as RS-232 or universal serial bus (USB), to connect with the external device 860.

The display interface 865 can connect the computer 805 to a display 870, and there is a mode in which the display 870 is used to present a command line or a graphical user interface to a user of the computer 805. The display interface 865 can use one or more of dedicated connections or industry standards such as a video graphics array (VGA), a digital visual interface (DVI), DisplayPort, and high-definition multimedia interface (HDMI) (registered trademark), to connect to the display 870.

As described above, the network interface 850 provides communication with other computers and storage systems, or devices external to the computer 805. The software program and data described in this specification can be downloaded via the network interface 850 and the network 810, for example, to the non-volatile storage 845 from the remote computer 815, the web server 820, the cloud storage server 825, and the computer server 830. Moreover, the system and the method of the present disclosure can be executed by one or more computers connected to the computer 805 via the network interface 850 and the network 810. For example, in one embodiment, the system and the method of the present disclosure are executed by the remote computer 815, the computer server 830, or a combination of multiple interconnected computers on the network 810.

Data, data sets, and/or databases employed in the embodiment of the system and the method of the present disclosure can be downloaded and stored from the remote computer 815, the web server 820, the cloud storage server 825, and the computer server 830.

<5. Super-Resolution Stream Using DVS Data>

The data processing system 500 described above can be applied to an image processing system using a dynamic vision sensor (DVS).

The DVS detects a luminance change in a pixel as an event, and outputs event data indicating the occurrence of the event at a timing when the event occurs.

While a general image sensor captures an image in synchronization with a vertical synchronization signal and outputs image data of one frame (screen) at a fixed period, the DVS outputs event data asynchronously at a timing when an event occurs. A value of the pixel takes three values, for example, + change, − change, or no change. Since the DVS outputs a combination of position coordinates of the pixel and time information only for the pixel having a change, it is possible to output data with high efficiency, a high speed, and a low delay.

Hereinafter, in order to facilitate distinction, a normal synchronous image sensor is referred to as an image sensor, and data on a frame basis outputted by the image sensor is referred to as image data. Furthermore, an event sensor that asynchronously detects an event is referred to as a DVS, and data outputted by the DVS is referred to as event data.

The event data of the DVS can be used, for example, in a process of generating a super-resolution image in combination with an image of a normal frame-based image sensor.

As the process in which the synchronous image sensor and the asynchronous DVS are combined, a technique is proposed in which a super-resolution moving image with enhanced time resolution is generated by applying an event output by the asynchronous DVS to a moving image obtained by the synchronous image sensor (for example, Non Patent Document "Liyuan Pan, Richard Hartley, Cedric Scheerlinck, Miaomiao Liu, Xin Yu, Yuchao Dai, High Frame Rate Video Reconstruction based on an Event Camera, Extension of our CVPR2019 (Oral) paper, the Internet <https://arxiv.org/pdf/1903.06531.pdf>").

Figure 14:
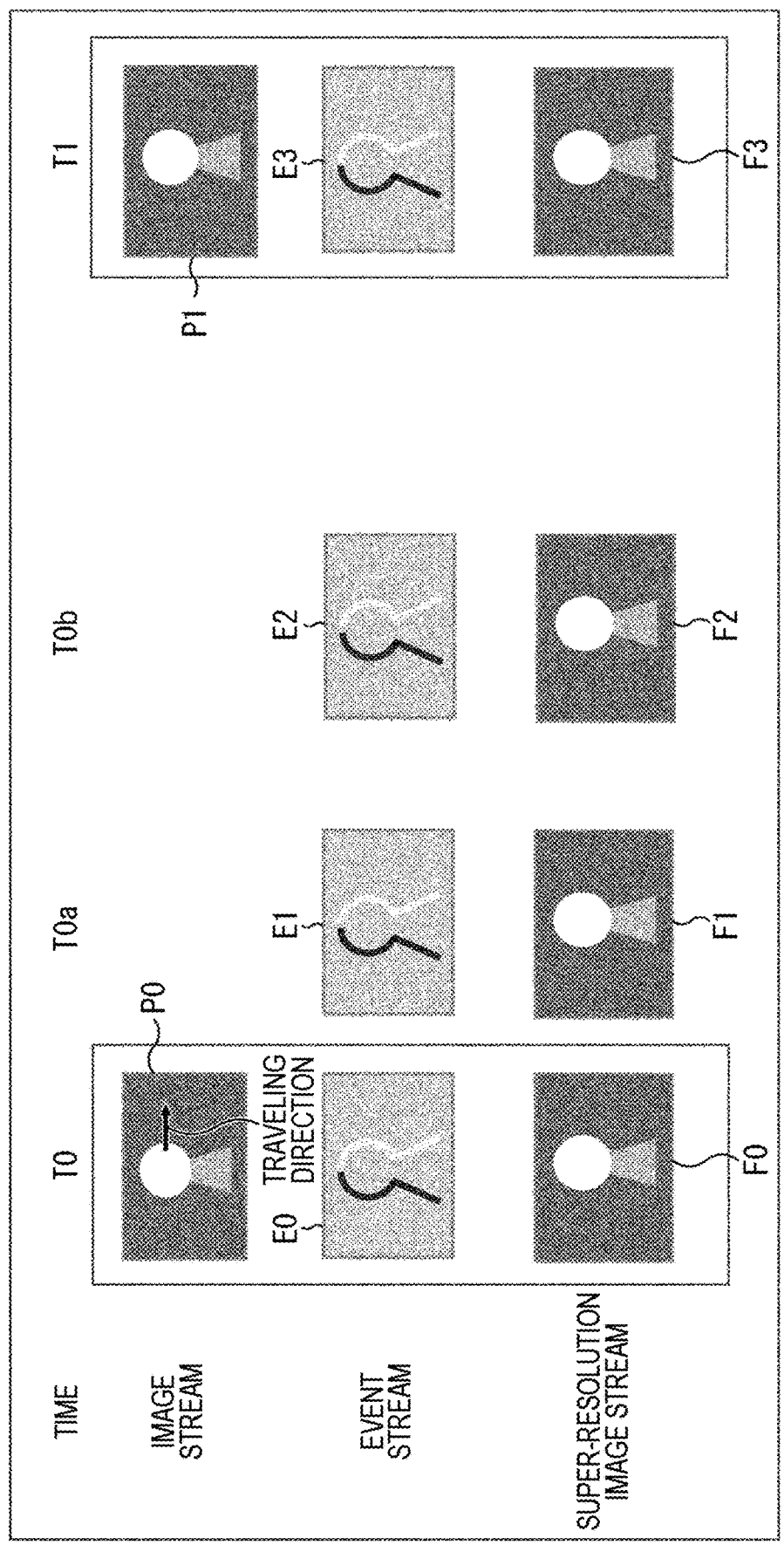
FIG. 14 is a view illustrating an example of generating a super-resolution image using event data of a DVS.

FIG. 14 illustrates an example of generating a super-resolution image with enhanced temporal resolution by using the event data of the DVS.

The image sensor generates and outputs an image at a fixed frame rate, such as 30 fps or 60 fps, for example, which is a longer period than that of the DVS. The image captured at the fixed frame rate and outputted from the image sensor is referred to as a frame image. In the example of FIG. 14, a frame image P0 is outputted at a time T0, and a frame image P1 is outputted at a time T1.

The DVS detects an event at a random timing when the event occurs, and generates and outputs an image. The image randomly outputted by the DVS is referred to as an event image. In the example of FIG. 14, an event image E0 is outputted at the time T0, an event image E3 is outputted at the time T1, and event images E1 and E2 are outputted at a time T0a and a time T0b between the time T0 and the time T1.

For example, an image processing device configured to generate a super-resolution image generates and outputs a super-resolution image F1 at the time T0a on the basis of the frame image P0 at the time T0 and the event image E1 representing a luminance change between the time T0 and the time T0a. Furthermore, for example, the image processing device generates and outputs a super-resolution image F2 at the time T0b on the basis of the frame image P0 at the time T0, the super-resolution image F1 at the time T0a, and the event image E2 representing a luminance change between the time T0a and the time T0b.

As described above, by performing super-resolution processing using an image stream that is an image stream of a moving image outputted from the image sensor and an event stream that is an image stream of a moving image outputted from the DVS, the image processing device can generate a super-resolution image stream that is an image stream of a super-resolution moving image with enhanced resolution in a time direction.

Note that the example of FIG. 14 is an example of generating an image with enhanced resolution in the time direction as a super-resolution image by the super-resolution processing, but a high dynamic range image with an expanded dynamic range or an image with enhanced spatial resolution may be generated, for example, as the super-resolution image.

Using the super-resolution image increases a possibility that a feature of the image that cannot be captured by a current image sensor can be detected.

However, in a case where the super-resolution moving image with enhanced time resolution is sent to a large number of image processing devices via a network, there is a concern that pressure is caused on the network traffic.

Therefore, an embodiment will be described below in which the data processing system 500 in FIG. 1 is applied to an image analysis network system that performs the super-resolution processing described above. The sensor 511 in the data processing system 500 in FIG. 1 corresponds to a sensor device 11 or an analysis device 12 in an image analysis network system 1 in FIG. 15. Whereas, the application that performs the main processing in the data processing system 500 in FIG. 1 corresponds to an application (a super-resolution processing node 14C) that executes the super-resolution processing to generate a super-resolution image stream in FIG. 30. For example, a case is assumed in which reducing network traffic as much as possible and increasing a priority order of a node closer to the analysis device 12 are described in the manifest as the evaluation axes. Alternatively, the evaluation axis and the priority order may be determined in advance without referring to the manifest. By optimally deploying the application that executes the super-resolution processing, it is possible to efficiently perform network transmission of a super-resolution image stream.

<6. Image Analysis Network System Using Super-Resolution Image>

Figure 15:
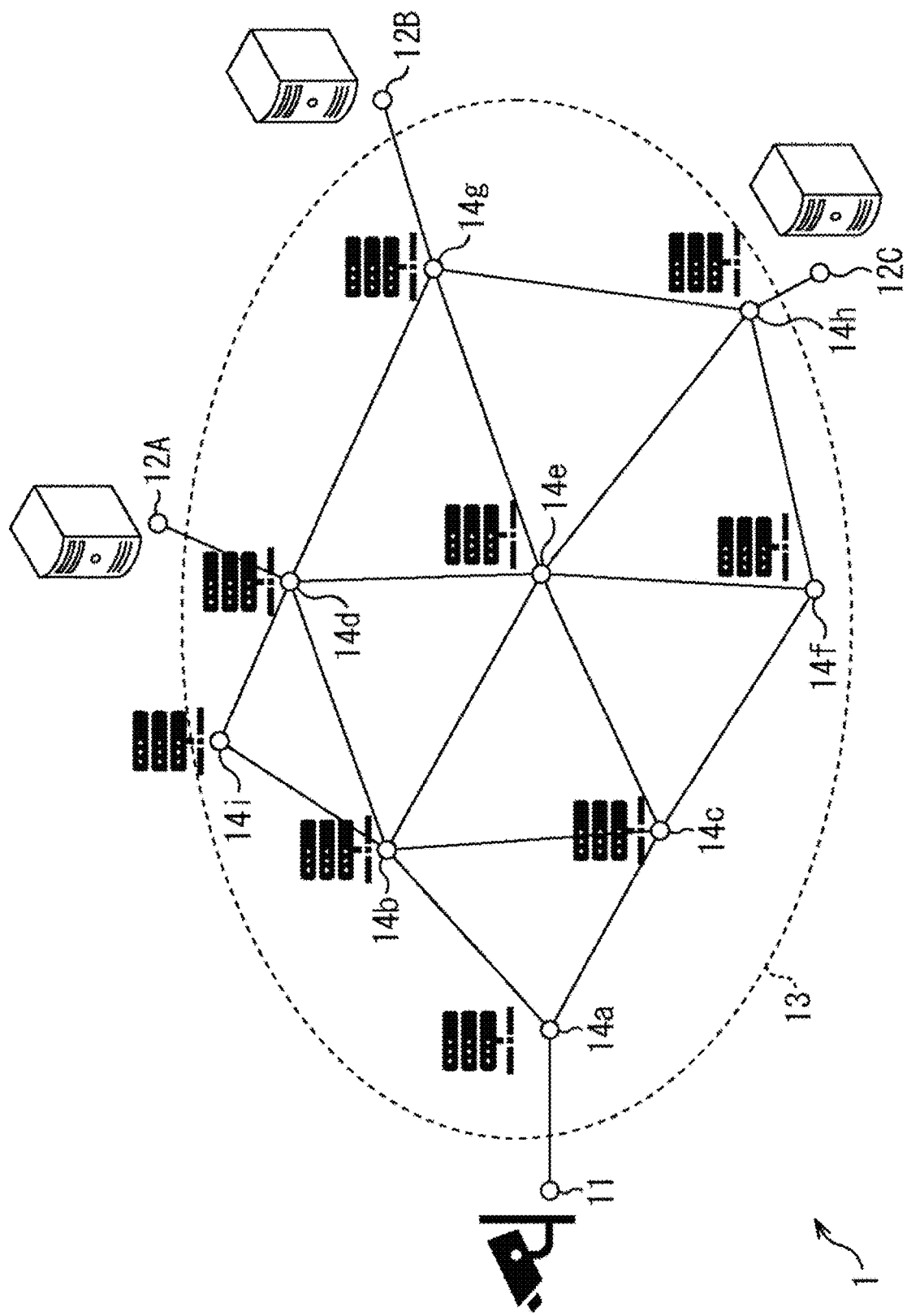
FIG. 15 is a diagram illustrating a configuration example of an image analysis network system that is an embodiment of an image processing system to which the present technology is applied.

FIG. 15 illustrates a configuration example of an image analysis network system that is an embodiment of an image processing system to which the present technology is applied.

The image analysis network system 1 of FIG. 15 is a system that performs image analysis processing using a super-resolution image generated by the super-resolution processing described above. In the image analysis network system 1, the sensor device 11 and a plurality of analysis devices 12 (12A to 12C) are connected via a network 13.

The sensor device 11 includes an image sensor and a DVS, and generates image data and event data serving as source data for performing the super-resolution processing.

The analysis device 12 is, for example, an image processing device that includes an AI engine using machine learning such as deep learning, and performs image analysis processing using a super-resolution image generated from image data and event data.

The network 13 is a communication network or a communication path of any communication standard such as, for example, the Internet, a public telephone network, a wide-area communication network for a wireless mobile body such as a so-called 4G line or 5G line, a wide area network (WAN), a local area network (LAN), a wireless communication network that performs communication conforming to the Bluetooth (registered trademark) standard, a communication path for short-range wireless communication such as near field communication (NFC), a communication path for infrared communication, or a communication network of wired communication conforming to a standard such as high-definition multimedia interface (HDMI (registered trademark)) or universal serial bus (USB).

On the network 13, there is a plurality of nodes 14 (14a to 14i) in addition to the sensor device 11 and the plurality of analysis devices 12. Each node 14 is, for example, a network connection device such as a sensor device, a router, a modem, a hub, a bridge, a switching hub, a base station control device, or a server, and has at least a function of transferring data from an output source of data to a destination device. In the present embodiment, an output source of data is the sensor device 11, and data to be outputted is event data or image data which is sensor data, or a super-resolution image generated by the super-resolution processing. The destination device of data outputted from the sensor device 11 is each analysis device 12 that performs the image analysis processing using a super-resolution image.

Note that, in the following description, when a predetermined node 14 on a data transmission path from the sensor device 11 as the output source of data to each analysis device 12 as the destination device is set as a starting point, a path on the sensor device 11 side, which is a data acquisition destination, may be referred to as upstream, and a path on the analysis device 12 side, which is a data output destination, may be referred to as downstream.

FIG. 15 illustrates an example in which the number of nodes 14 is nine of the node 14a to the node 14i and the number of analysis devices 12 is three of the analysis devices 12A to 12C due to constraints of the page, but the number of analysis devices 12 and the number of nodes 14 are not limited thereto and any number may be adopted.

<Example of Analysis Application for Super-Resolution Image>

Figure 16:
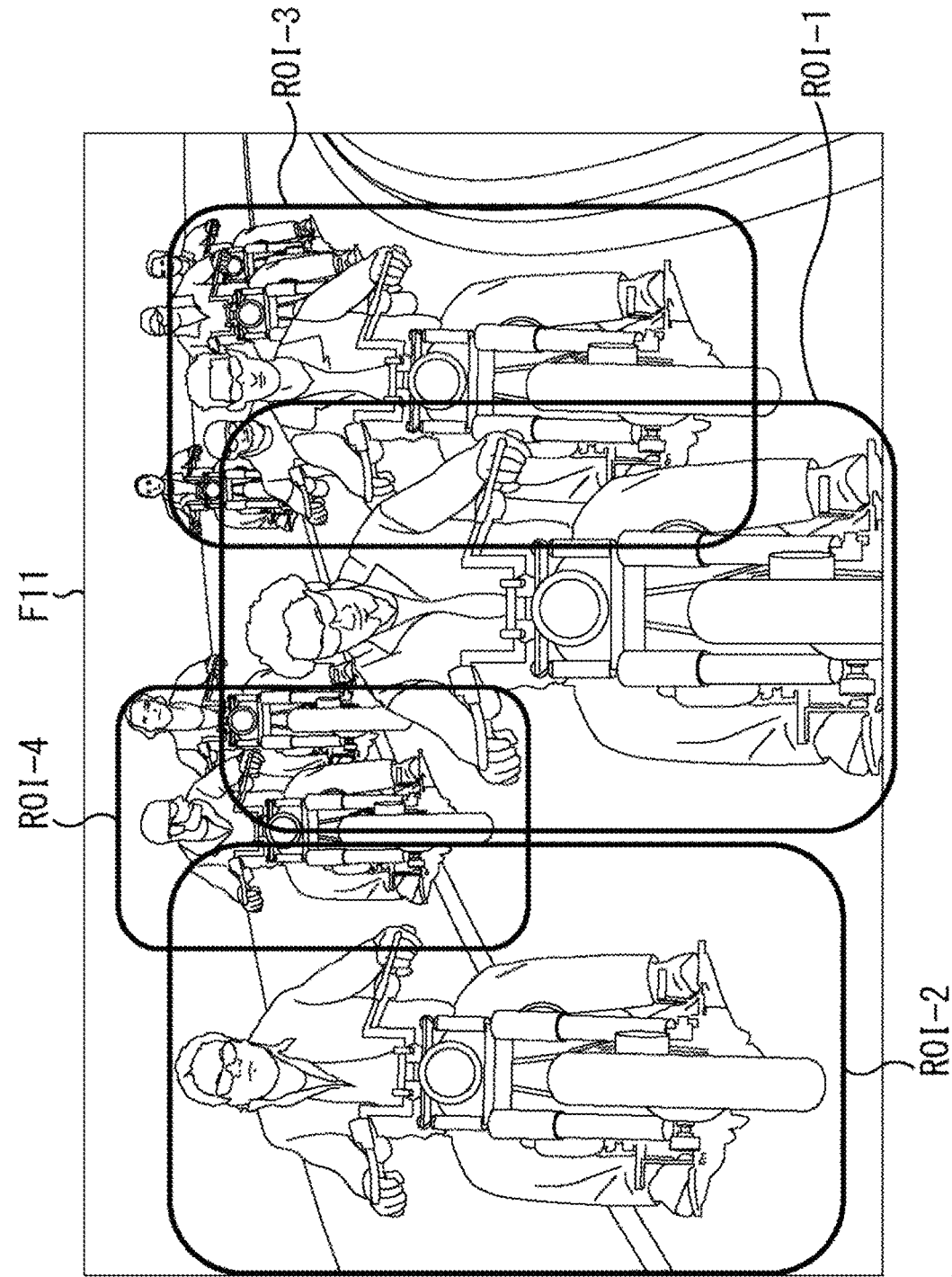
FIG. 16 is a view illustrating an application example of the image analysis network system in FIG. 15.
Figure 17:
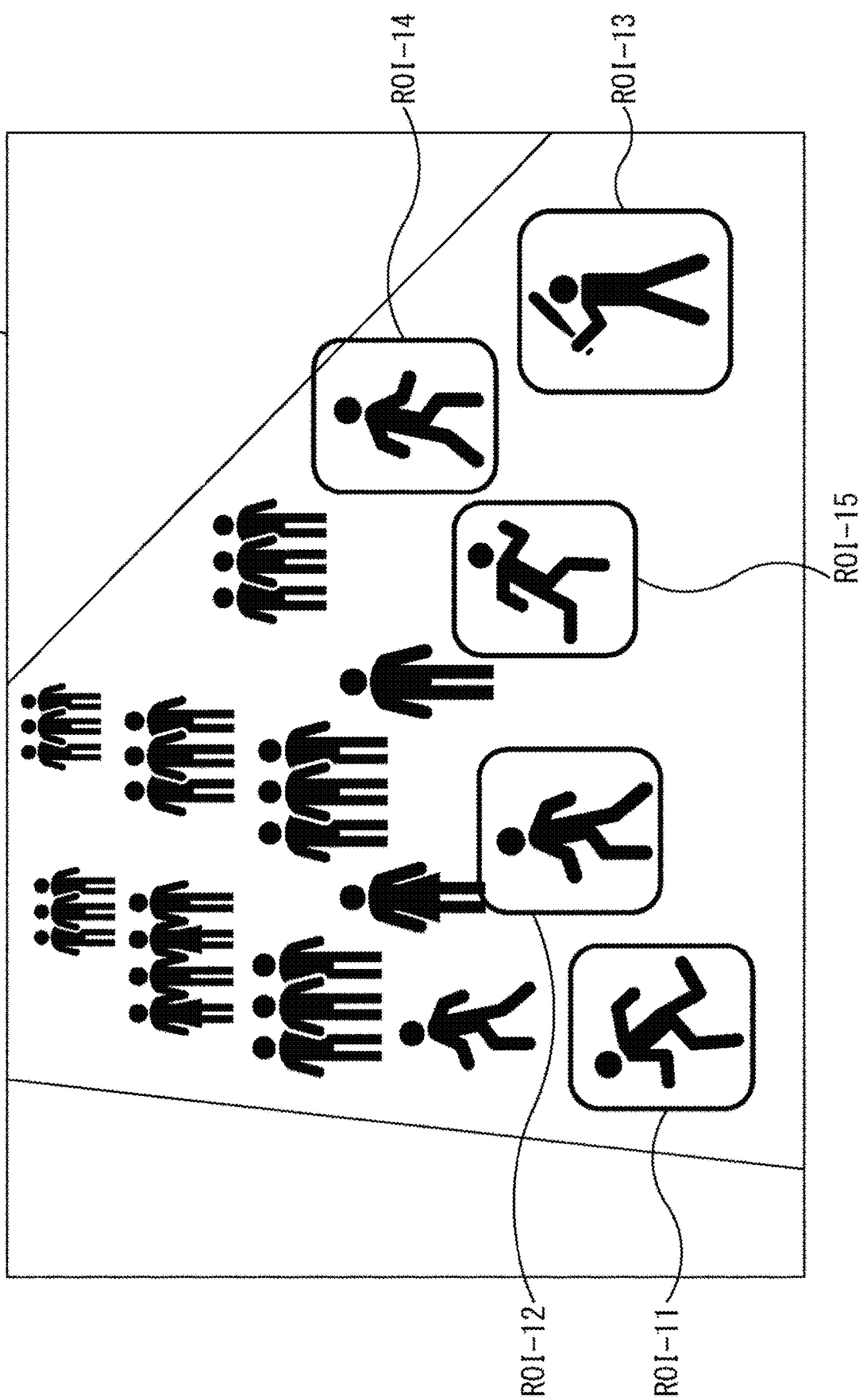
FIG. 17 is a view illustrating an application example of the image analysis network system in FIG. 15.

With reference to FIGS. 16 and 17, an application example of an application of the image analysis network system 1 of FIG. 15 will be described.

FIG. 16 is a reference image example of a first application to which the image analysis network system 1 is applied.

The image analysis network system 1 as the first application is a system that detects a motorcycle (a moving object) involving a speed limit violation, specifies a person riding the motorcycle, and tracks and reports the person.

The sensor device 11 is arranged on a highway or the like, for example, and outputs high-speed and low-delay event data and long-period image data such as 30 fps or 60 fps capturing a moving object such as a motorcycle or an automobile passing through.

The plurality of analysis devices 12 is scattered and arranged all over the country, and each analysis device 12 collects feature quantities of various persons with the application and creates a database. The analysis device 12 recognizes features of persons included in the regions of interest ROI-1 to ROI-4 in a super-resolution image F11 generated from image data and event data outputted from the sensor device 11, and specifies and reports the persons.

There are individual differences in fine movements of parts of a human body. The DVS can detect not only feature quantities that have been conventionally used for specifying a person, such as a feature quantity of a face of a search target person, but also a feature of a fine motion of each part of a body that can be analyzed only by the AI engine beyond human eyes and can be detected only by the DVS.

Therefore, each analysis device 12 can specify the person with high accuracy by performing the recognition processing using the super-resolution image generated using the event data by the DVS, as compared with performing determination only from the image data on a frame basis.

Furthermore, the person identification as described above needs to be performed immediately, and it is possible to perform image analysis processing that ensures real-time property by simultaneously sharing and analyzing data that should be analyzed for the analysis devices 12 that dispersedly operate all over the country.

Therefore, in the image analysis network system 1, person recognition processing is performed by a group of AI engines capable of performing motion feature analysis beyond human eyes and having a feature quantity database of various persons scattered all over the country, and real-time determination of the person can be performed.

FIG. 17 is a reference image example of a second application to which the image analysis network system 1 is applied.

The image analysis network system 1 as the second application is a system that predicts dangerous behavior of a person who has turned into a mob in a protesting demonstration, identifies the dangerous person, and gives a defense instruction or the like to riot police in real time.

The sensor device 11 is arranged, for example, on a road, a sidewalk, or the like in an urban area, and outputs high-speed and low-delay event data and long-period image data such as 30 fps or 60 fps capturing a crowd of demonstrators in a protesting demonstration.

Each analysis device 12 predicts an action (a dangerous action) of a person and identifies a dangerous person by performing recognition processing using image data on a frame basis and a super-resolution image generated using the event data obtained by the DVS. For example, persons included in regions of interest ROI-11 to ROI-15 in a super-resolution image F12 are identified as dangerous persons by the analysis device 12, and are notified to riot police. By performing recognition processing of recognizing a person by using a super-resolution image generated by using the event data obtained by the DVS, it is possible to recognize a fine motion of a human body that cannot be detected with image data on a frame basis, and to perform dangerous behavior prediction and dangerous person identification with high accuracy.

In the future, since each and every sensor device 11 becomes widespread in the world, various types of data detected by the sensor device 11 may be dispersed and accumulated in physically distant places. Furthermore, it is also expected that data taken for a certain purpose will be used for other purposes or various purposes. For example, it is also conceivable that data taken for agricultural management is used for weather forecast, or data taken as a life log is used for criminal investigation or the like. Since these pieces of data are dispersedly managed, there is a high possibility that the analysis devices 12 that performs analysis on the basis of these pieces of data are also dispersedly arranged to be operated.

It is desirable that various types of data detected by the sensor device 11 are transferred to the analysis device 12 at high speed, and the analysis device 12 perform analysis processing while securing real-time property.

Therefore, in a case where data from the image sensor or the DVS is delivered to such a dispersed analysis device 12 and analyzed, it is necessary to prevent useless data from flowing in the network 13. For flowing on a path of the network 13 from the sensor device 11 to each analysis device 12, data needs to be narrowed to minimum necessary as much as possible.

That is, a mechanism is required in which data obtained by the sensor device 11 is delivered to each analysis device 12 dispersed in the network 13 without waste (at the minimum necessary) and analyzed by each analysis device 12.

<7. Example of Stream Distribution Method>

Considering a mechanism to transfer a super-resolution image stream (image data of a super-resolution image) from the sensor device 11 to each analysis device 12 while reducing unnecessary network traffic, a method illustrated in FIGS. 18 to 24 can be considered.

First, in a case of improving a processing speed of the analysis processing performed by the analysis device 12 and securing the real-time property, it is preferable to cause each of the plurality of analysis devices 12 that are dispersedly arranged, to perform the analysis processing by dividing the processing for every region of interest ROI, and distributing the super-resolution image stream (hereinafter, referred to as a ROI super-resolution image stream) for every region of interest ROI, instead of causing the plurality of analysis devices 12 to process all the analysis targets detected in the image data or the super-resolution image.

Figure 18:
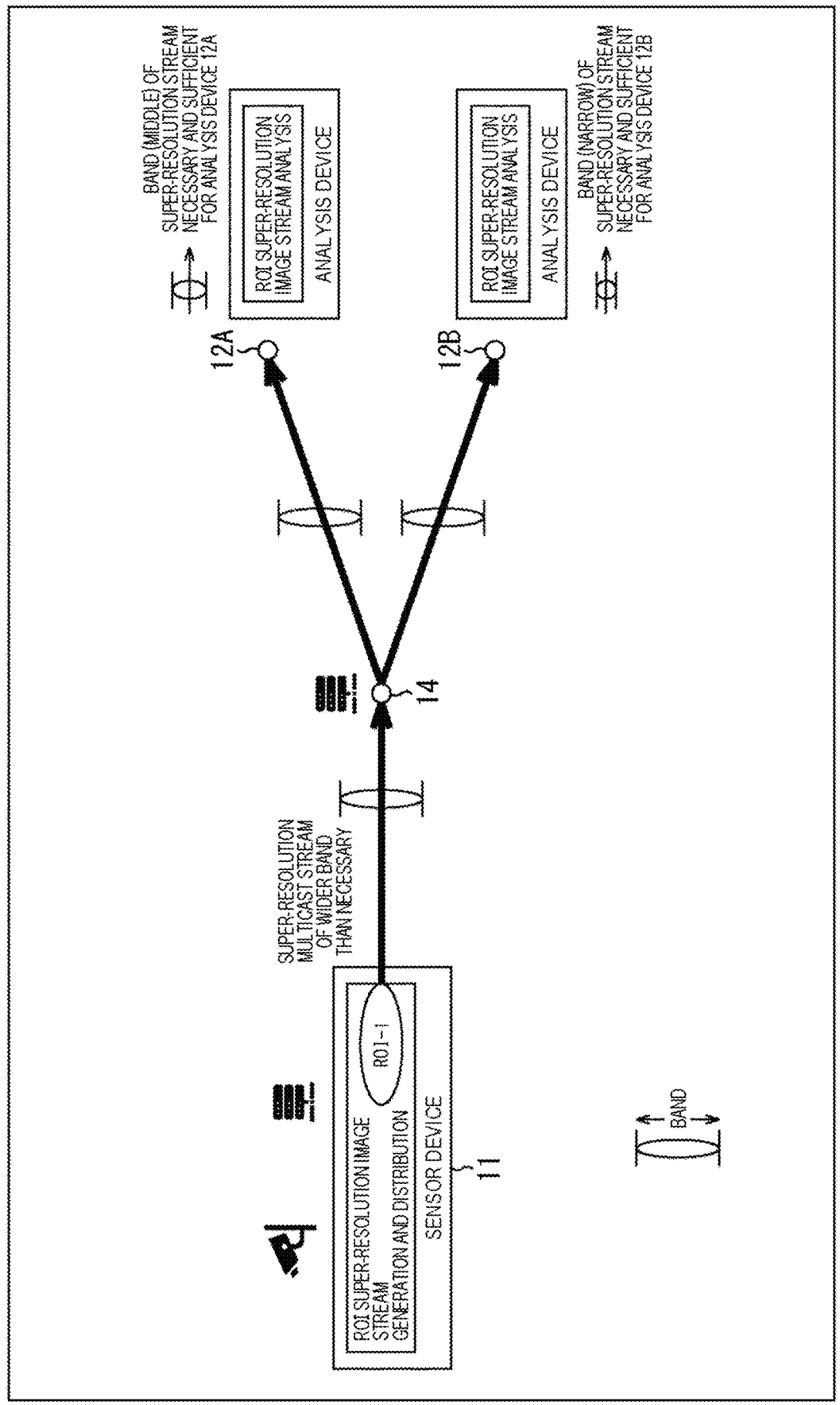
FIG. 18 is a diagram illustrating a first example in which a ROI super-resolution image stream is distributed from upstream.

For example, as illustrated in FIG. 18, the sensor device 11 generates a ROI super-resolution image stream of the region of interest ROI-1, and distributes the ROI super-resolution image stream to each responsible analysis device 12 via the network 13.

Here, it is assumed that the sensor device 11 generates the ROI super-resolution image stream of the region of interest ROI-1 with high resolution, and performs multicast distribution to each analysis device 12 in order to correspond to analysis capabilities of all the analysis devices 12.

However, in a case where the analysis capability of the analysis device 12 responsible for the analysis of the region of interest ROI-1 is not so high, and the ROI super-resolution image stream has higher resolution (in the present example, temporal resolution) than necessary, a band occupied by the image stream becomes larger as the resolution is higher, resulting in a factor of causing pressure on traffic.

For example, assuming that a band occupying the network 13 is classified into three types of a wide band (high resolution), a middle band (medium resolution), and a narrow band (low resolution) according to the resolution of the ROI super-resolution image stream to be distributed, in a case where the sensor device 11 distributes a broadband ROI super-resolution image stream by multicast, a band of the super-resolution stream necessary and sufficient for the analysis device 12A is the middle band, and a band of the super-resolution stream necessary and sufficient for the analysis device 12B is the narrow band, the sensor device 11 is to distribute a ROI super-resolution image stream of a wider band than necessary and causes pressure on traffic of the network 13.

Figure 19:
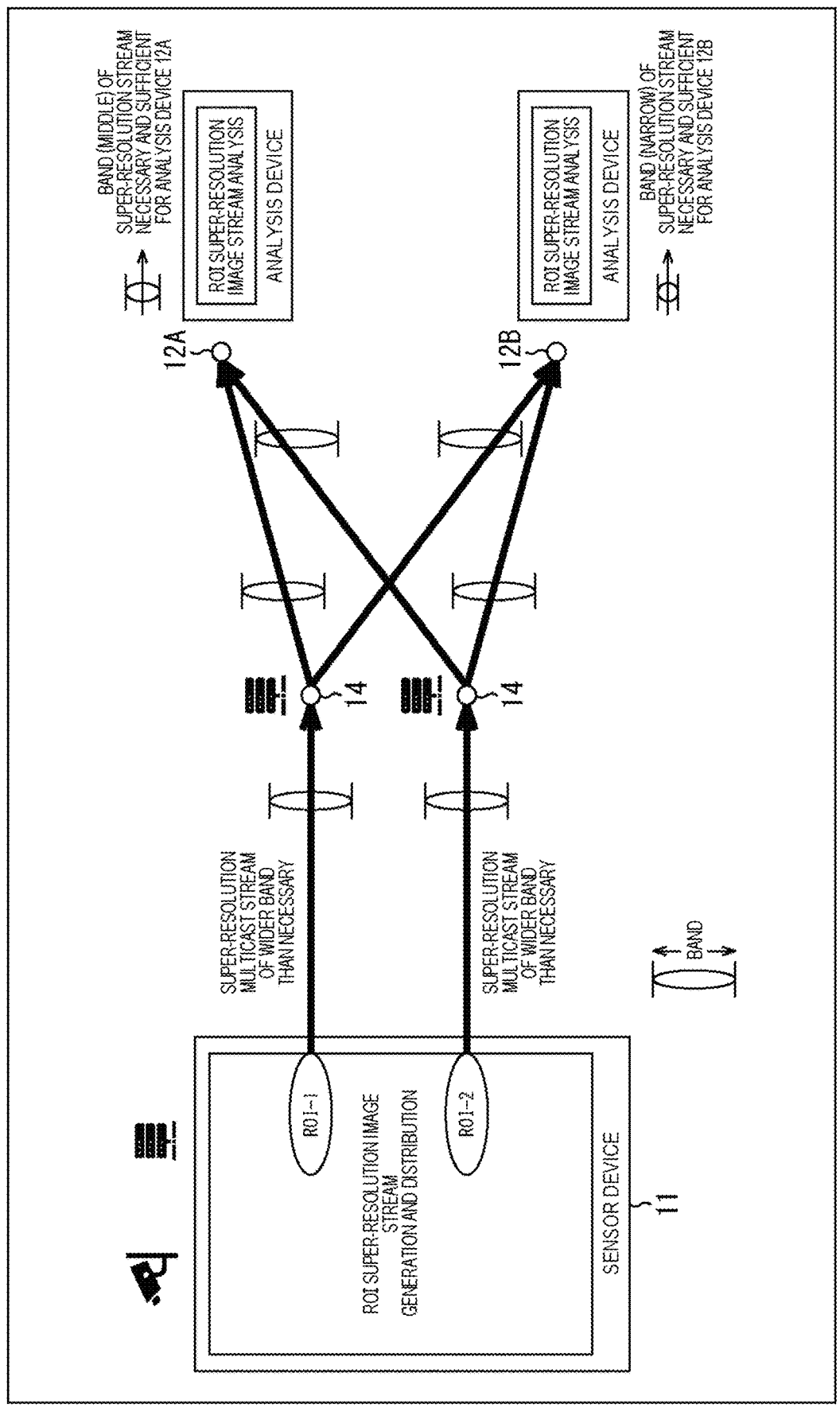
FIG. 19 is a diagram illustrating a first example in which a ROI super-resolution image stream is distributed from upstream.

In practice, as illustrated in FIG. 19, for each of the plurality of regions of interest ROI detected in an image data or a super-resolution image, a ROI super-resolution image stream of a wider band than necessary is to be distributed, so that more pressure is caused on traffic.

Figure 20:
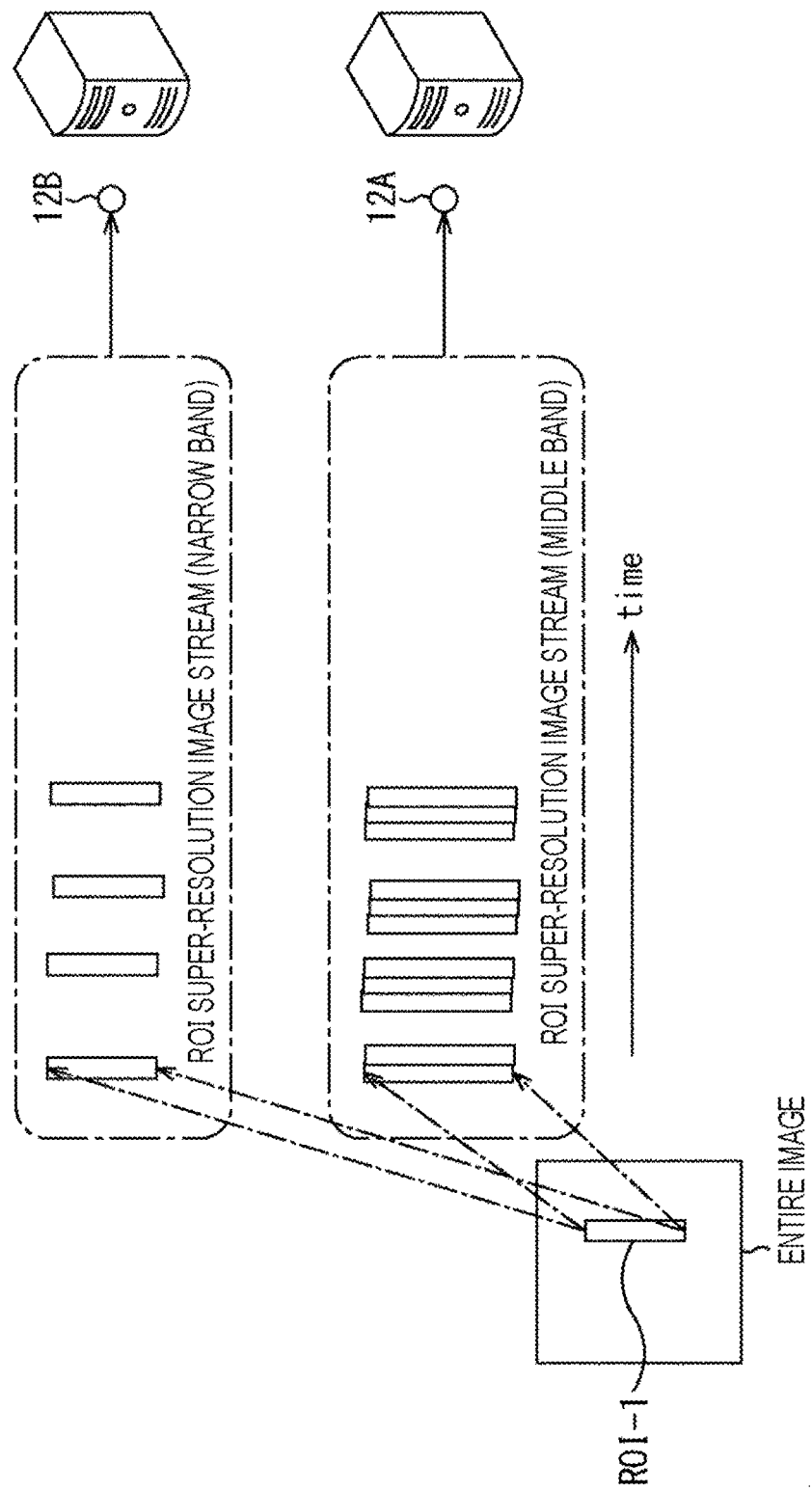
FIG. 20 is a diagram illustrating an example of a ROI super-resolution image stream according to resolution of an analysis device.

In order to cope with distribution of the ROI super-resolution image stream of a wider band than necessary, it is conceivable that the upstream side is notified of requirements of each analysis device 12 for the resolution in advance, and the sensor device 11 generates and distributes a ROI super-resolution image stream according to the resolution of each analysis device 12, as illustrated in FIG. 20.

FIG. 20 illustrates a state in which a super-resolution stream of the middle band necessary and sufficient for the analysis device 12A is generated for the analysis device 12A, and a super-resolution stream of the narrow band necessary and sufficient for the analysis device 12B is generated for the analysis device 12B.

Figure 21:
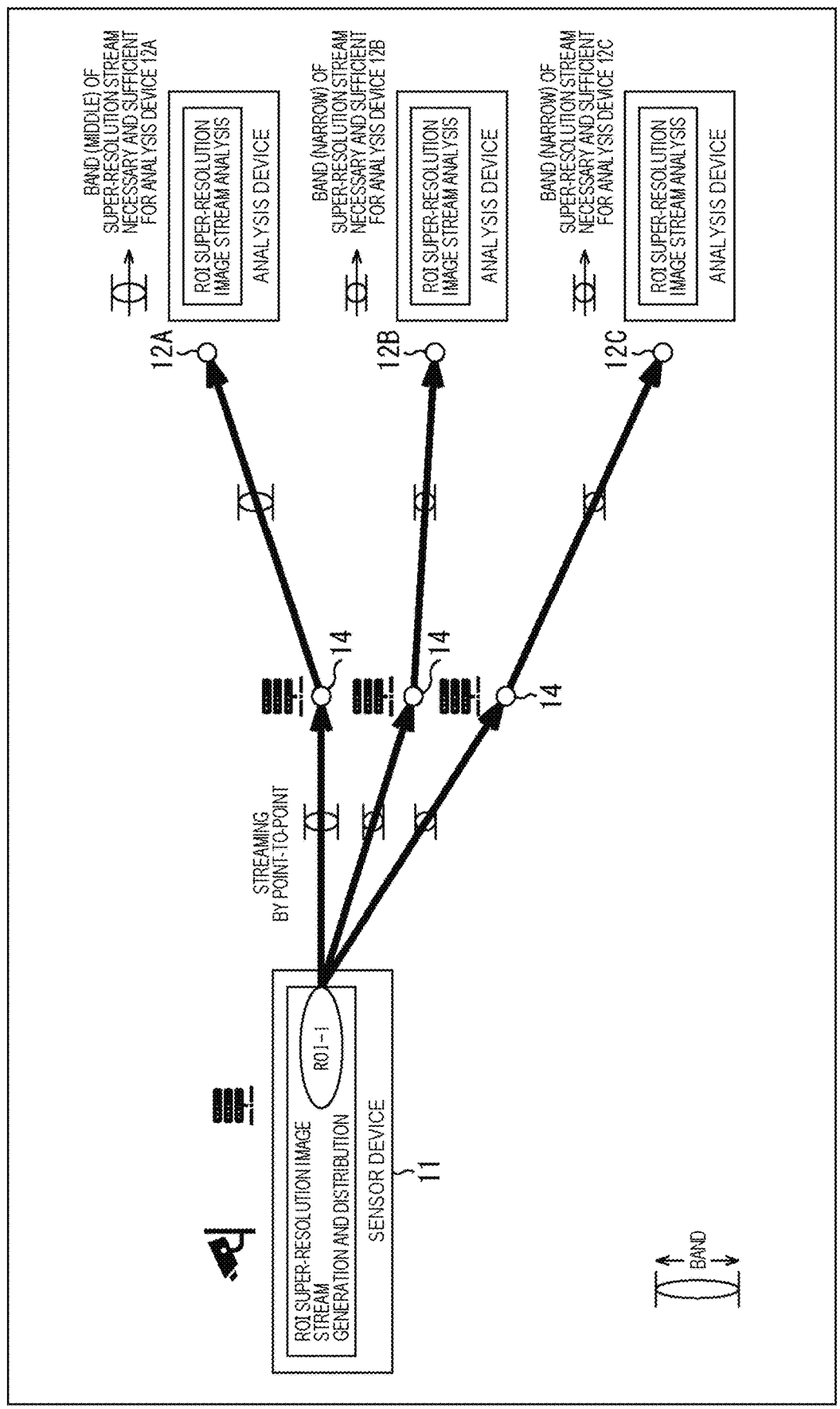
FIG. 21 is a diagram illustrating a second example in which a ROI super-resolution image stream is distributed from upstream.

Furthermore, it is desirable to distribute a super-resolution stream of a necessary and sufficient band by point-to-point as illustrated in FIG. 21, instead of distributing the generated ROI super-resolution image stream by multicast.

FIG. 21 illustrates a state in which the sensor device 11 generates a ROI super-resolution image stream of the middle band necessary and sufficient for the analysis device 12A and distributes to the analysis device 12A by point-to-point, and generates a ROI super-resolution image stream of the narrow band necessary and sufficient for the analysis devices 12B and 12C by point-to-point and distributes to the analysis devices 12B and 12C.

However, in the point-to-point distribution, if the number of analysis devices 12 is very large, a load of the point-to-point streaming increases. Furthermore, since it is difficult to generate a stream on the upstream side in accordance with a resolution requirement of each analysis device 12, some optimization is required.

Figure 22:
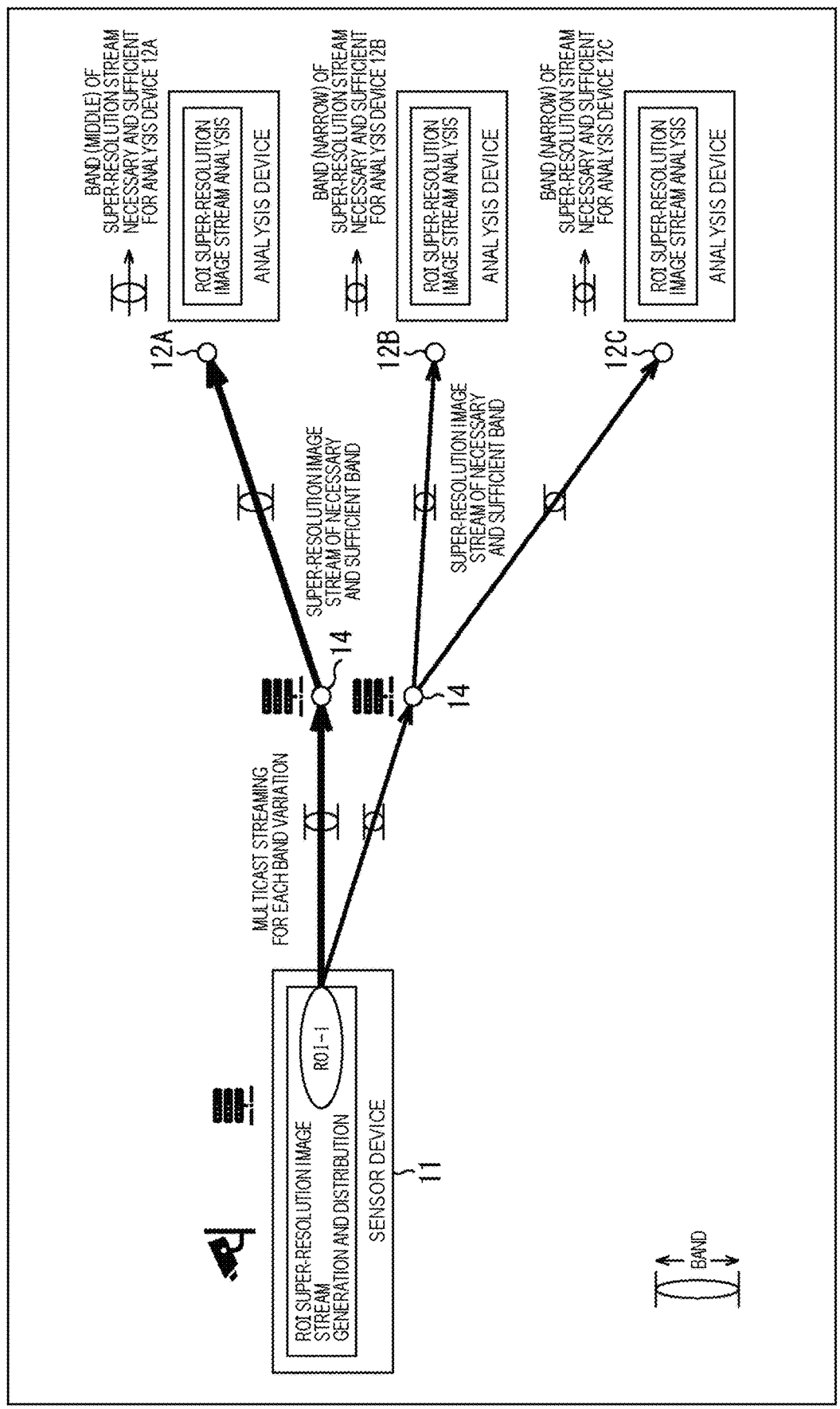
FIG. 22 is a diagram illustrating a third example in which a ROI super-resolution image stream is distributed from upstream.

For example, as illustrated in FIG. 22, a method is conceivable in which the sensor device 11 generates ROI super-resolution image streams of the middle band and the narrow band, and distributes the ROI super-resolution image streams by multicast to the analysis devices 12 that require individual resolution. In the example of FIG. 22, the ROI super-resolution image stream of the middle band is distributed to the analysis device 12A, and the ROI super-resolution image stream of the narrow band is distributed to the analysis devices 12B and 12C by multicast.

Figure 23:
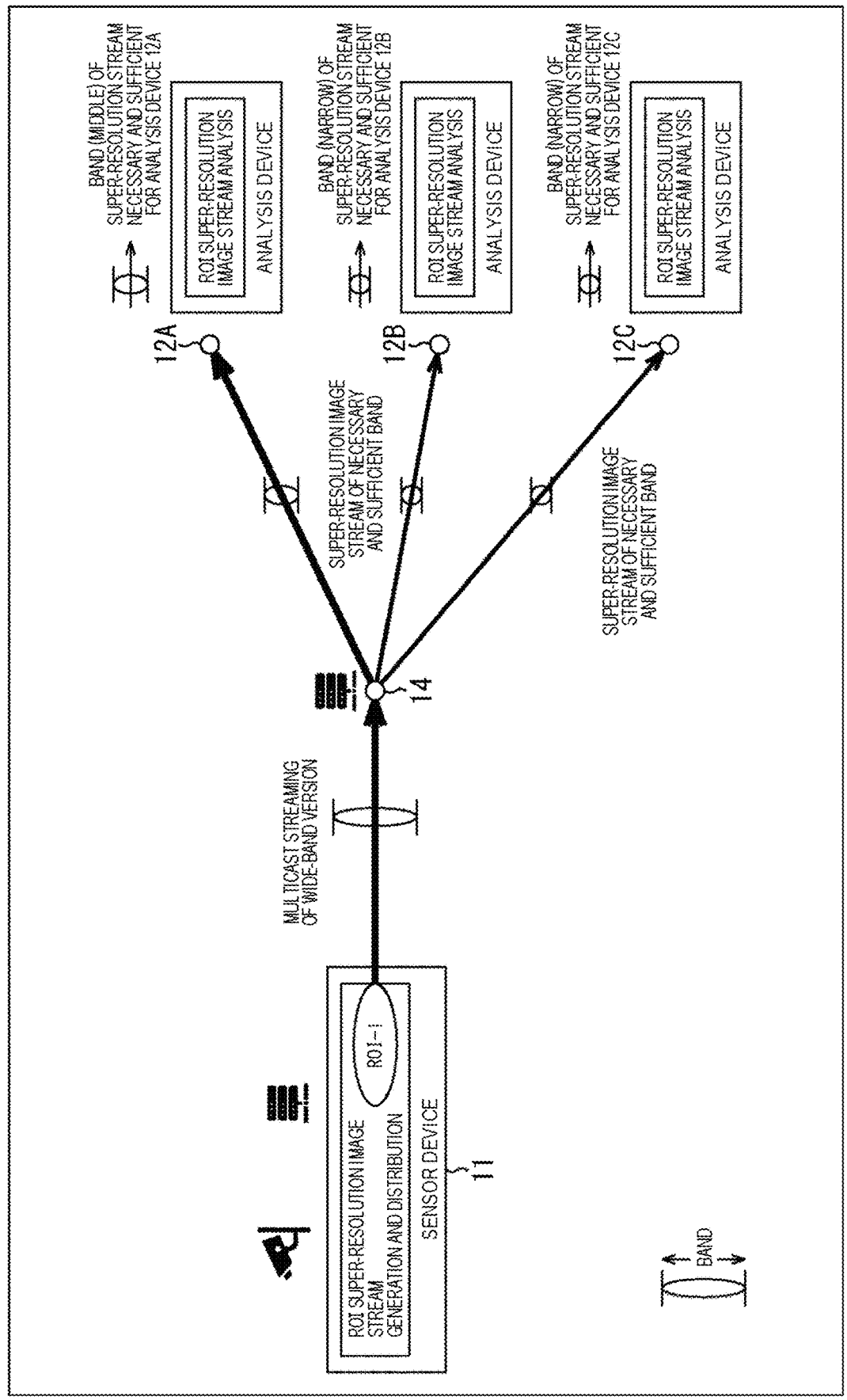
FIG. 23 is a diagram illustrating a fourth example in which a ROI super-resolution image stream is distributed from upstream.

Alternatively, as illustrated in FIG. 23, a method is considered in which the ROI super-resolution image stream of a maximum band (the wide band) is distributed by multicast from the sensor device 11 to the node 14 at some midpoint on the network 13, and a ROI super-resolution image stream having resolution changed in accordance with a resolution requirement of the analysis device 12 of a downstream distribution destination is generated in the node 14 at some midpoint, and distributed by multicast to each analysis device 12. In the example of FIG. 22, ROI super-resolution image streams of the middle band and the narrow band are generated from the ROI super-resolution image stream of the wide band at the node 14 at some midpoint, the ROI super-resolution image stream of the middle band is distributed to the analysis device 12A, and the ROI super-resolution image stream of the narrow band is distributed to the analysis devices 12B and 12C by multicast.

Figure 24:
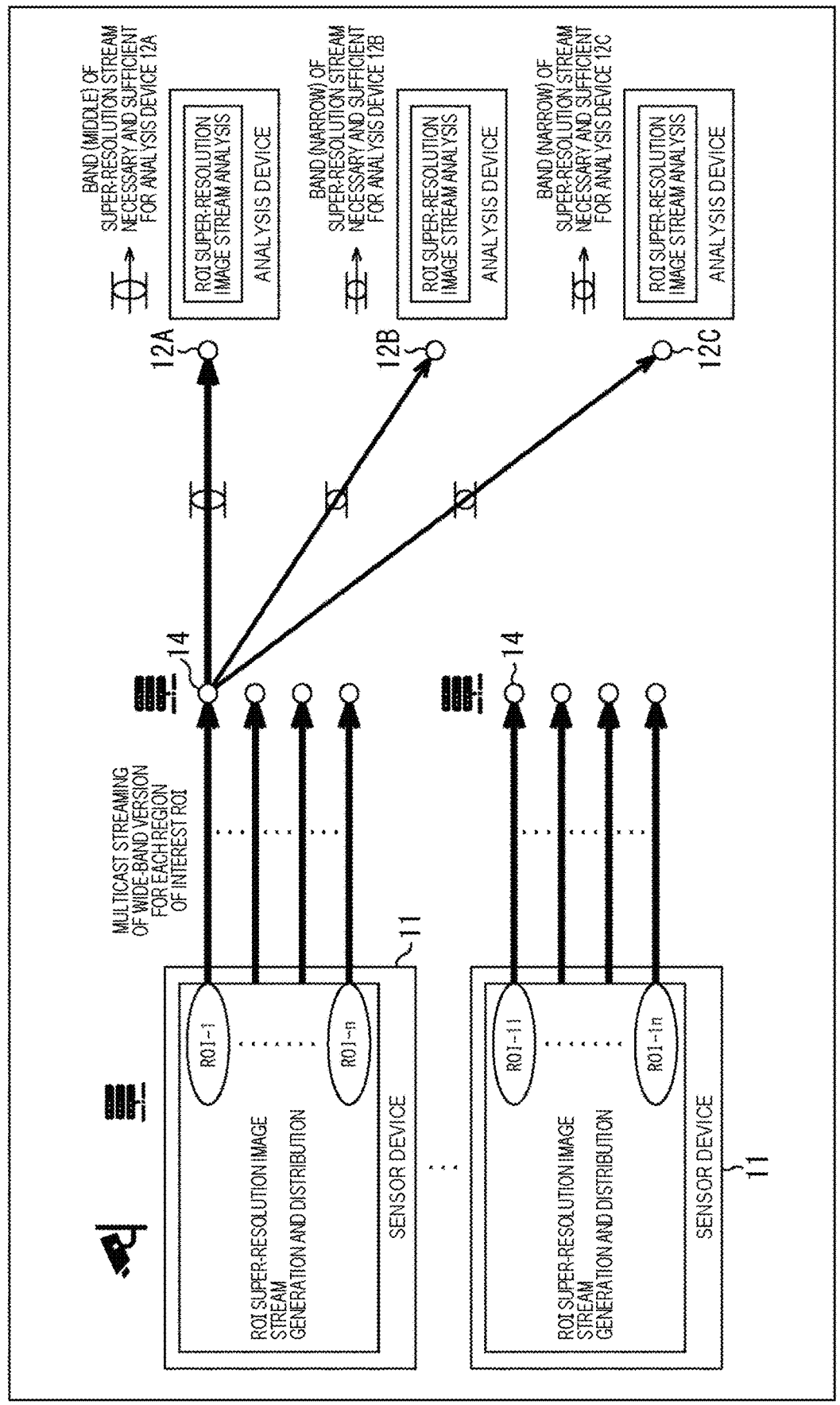
FIG. 24 is a diagram illustrating an example in which a ROI super-resolution image stream is distributed from upstream.

Even in a case where any of the methods described above is adopted, the ROI super-resolution image stream flows from the upstream side on the network 13. Therefore, as illustrated in FIG. 24, in a case where there are a large number of sensor devices 11 and a large number of regions of interest ROI are set in images captured by the individual sensor devices 11, pressure on traffic in the network 13 is inevitable.

As described above, in a case where a large number of analysis target objects are included in an image captured by the sensor device 11, the region of interest ROI is set for those, and the analysis processing is simultaneously executed in order for a large number of analysis devices 12 dispersedly arranged in the network 13 to perform image analysis within a predetermined time, it is necessary to distribute an image stream (a ROI super-resolution stream) subjected to the super-resolution processing for each region of interest ROI and having high temporal resolution, to a large number of analysis devices 12 via the network 13. Therefore, more pressure is caused on traffic of the network 13 as the number of regions of interest ROI is larger.

Furthermore, in a case where the sensor device 11 or the node 14 such as a server connected first with the sensor device 11 generates the ROI super-resolution stream, if an analysis capability of each analysis device 12 as a distribution destination has been unable to be grasped, there is a possibility that an image stream with higher resolution than necessary is to be distributed. As a result, pressure is caused on traffic of the network 13.

<8. Example of Stream Distribution Method Performed by Image Analysis Network System>

Figure 25:
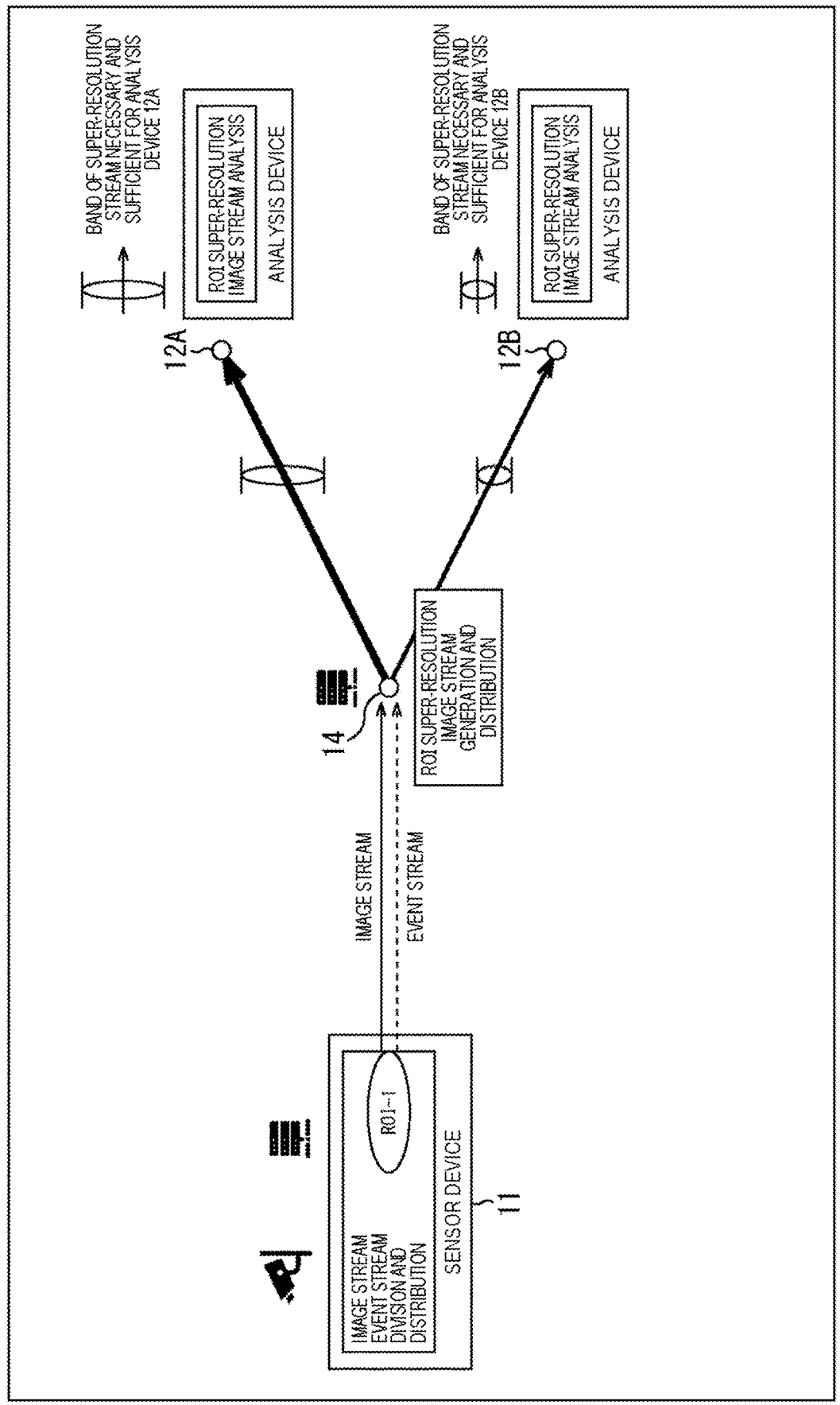
FIG. 25 is a diagram illustrating an example of distribution of a ROI super-resolution image stream performed by the image analysis network system in FIG. 15.

Therefore, the image analysis network system 1 of FIG. 15 can also distribute the ROI super-resolution stream for each region of interest ROI as described above, but distributes the ROI super-resolution stream as illustrated in FIG. 25 in order to reduce traffic of the network 13 and efficiently perform transmission.

FIG. 25 illustrates a conceptual diagram of distribution of a ROI super-resolution stream performed by the image analysis network system 1 of FIG. 15.

The image analysis network system 1 generates the ROI super-resolution stream from an image stream and an event stream at the node 14 on downstream close to the analysis device 12, among a plurality of nodes 14 in the network 13 from the sensor device 11 to the plurality of analysis devices 12, and distributes the ROI super-resolution stream to the analysis device 12. The image stream and the event stream generated by the sensor device 11 are transmitted as they are to the downstream node 14 that is to generate the ROI super-resolution stream. The node 14 (the super-resolution processing node 14C to be described later) that generates the ROI super-resolution stream from the image stream and the event stream is the node 14 closer to the analysis device 12 than at least the sensor device 11.

Figure 26:
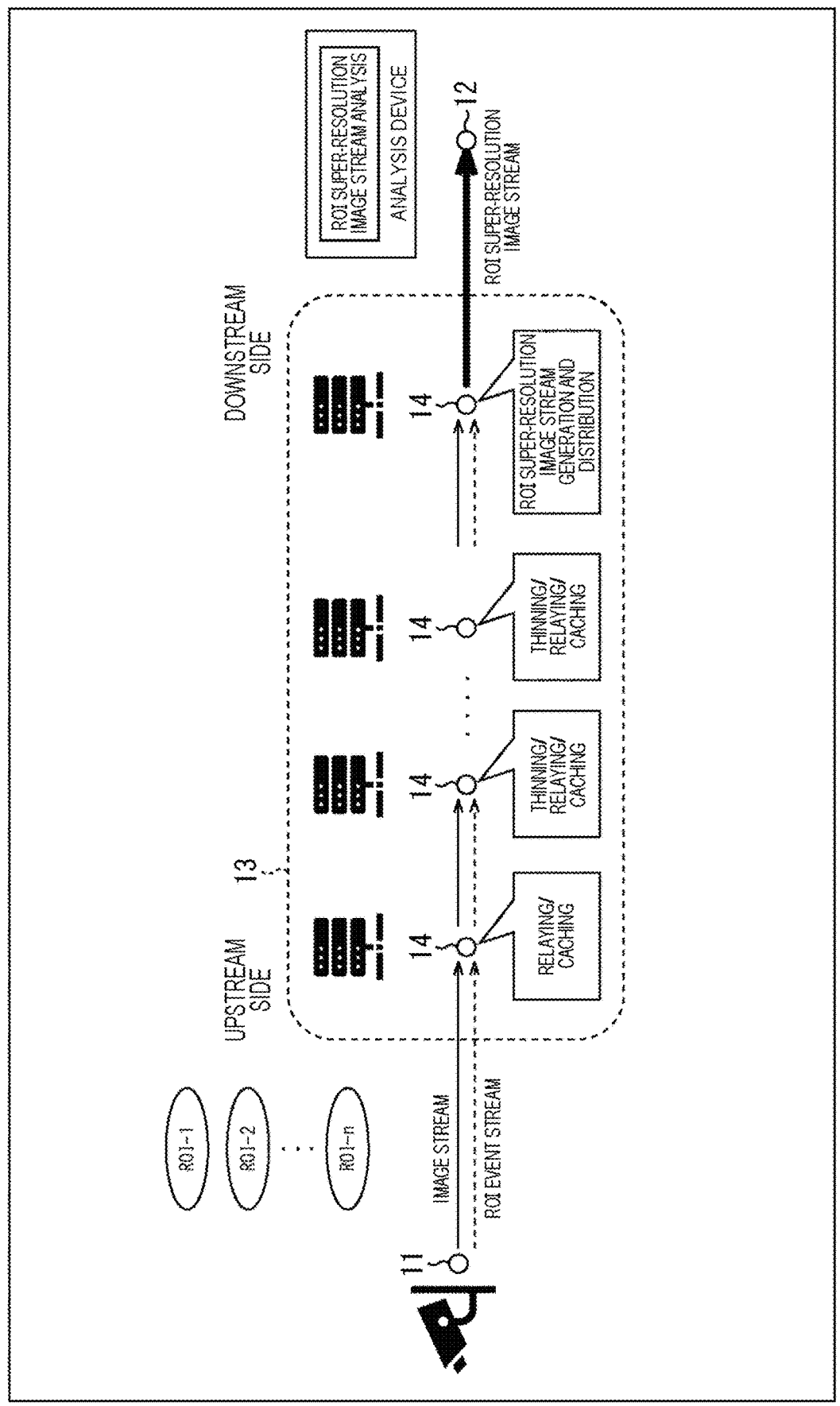
FIG. 26 is a diagram illustrating details of the example of distribution of FIG. 25.

FIG. 26 is a diagram illustrating a conceptual diagram of distribution of the ROI super-resolution stream in FIG. 25 in more detail.

An image stream and an event stream for each of a plurality of regions of interest ROI-1 to ROI-n included in a frame image captured by the image sensor are transmitted to a downstream side close to the analysis device 12 on a transmission path of the network 13, for example, the node 14 connected first with the analysis device 12. The node 14 connected first with the analysis device 12 generates a ROI super-resolution stream from the acquired image stream and event stream, and sends the ROI super-resolution stream to the analysis device 12.

Since the image stream is a stream including a long-period frame image, and the event stream is ternary data of only a pixel (an address) where an event has occurred, both the image stream and the event stream are streams with a lighter transfer load than the ROI super-resolution stream.

The image stream may be a stream for each region of interest ROI extracted on a region of interest ROI basis from the frame image captured by the image sensor, or may be a stream of the frame image as it is (hereinafter, referred to as an entire image) captured by the image sensor. In the present embodiment, the image stream of the entire image is transmitted.

Each of other nodes 14 on the upstream side of the node 14 that generates the ROI super-resolution stream relays the image stream and the event stream. That is, each node 14 receives the image stream and the event stream sent from the upstream side, and sends to the node 14 on the downstream side. Furthermore, each node 14 caches (stores) the received image stream and event stream, and can send the cached image stream and event stream as necessary in a case where a new analysis device 12 is added on the downstream side and another path is added.

Furthermore, each node 14 that relays the image stream and the event stream can thin out the event stream as necessary in accordance with a capability of temporal resolution of the analysis device 12 as a distribution destination on the downstream side, and send to the node 14 on the downstream side. Note that, hereinafter, the capability of the temporal resolution of the analysis device 12 is also referred to as a temporal resolution requirement, as a requirement of necessary and sufficient temporal resolution in the analysis device 12.

Figure 27:
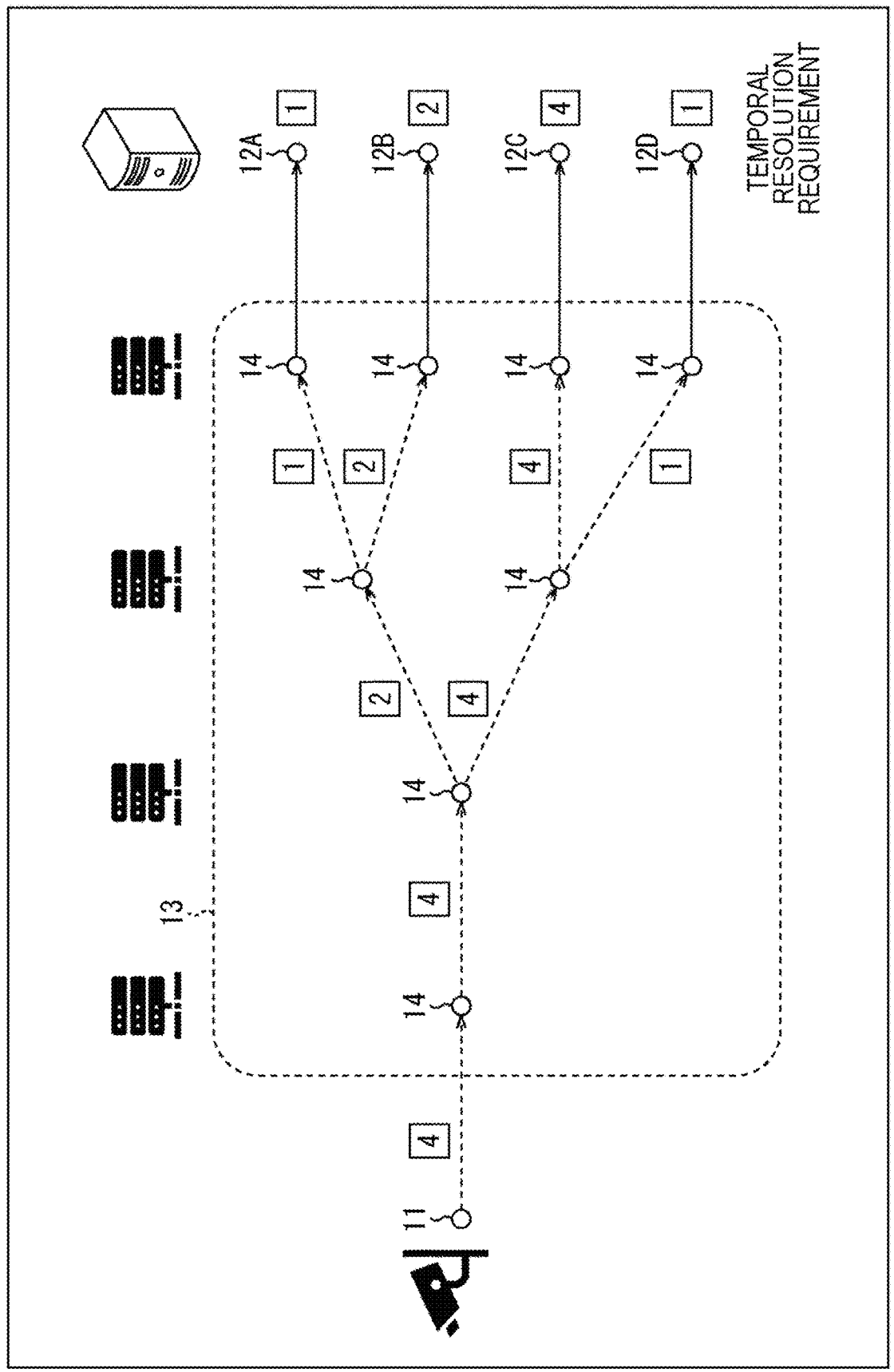
FIG. 27 is a diagram illustrating an example in which an event stream is thinned out and transmitted.

FIG. 27 illustrates an example in which the event stream is thinned out and transmitted in the node 14 on the transmission path in accordance with the temporal resolution requirement of each of the plurality of analysis devices 12.

The temporal resolution of the analysis device 12 is equivalent to, for example, the number of super-resolution images that can be subjected to the analysis processing by the analysis device 12 in a certain period, and corresponds to a frequency at which an event occurs in the super-resolution processing, since the super-resolution image is generated every time an event occurs. Therefore, the temporal resolution of the analysis device 12 corresponds to an event frequency (an event density) of the event stream.

In the example of FIG. 27, the temporal resolution requirement of the analysis device 12 is represented by the event frequency, and the temporal resolution requirement of each analysis device 12 is represented by a number surrounded by a rectangular frame. Specifically, the temporal resolution of the analysis device 12A is "1", the temporal resolution of the analysis device 12B is "2", the temporal resolution of the analysis device 12C is "4", and the temporal resolution of an analysis device 12D is "1".

The temporal resolution of the event stream generated by the sensor device 11 is "4". When sending the event stream to the downstream side, each node 14 of the network 13 thins out the event stream in accordance with a maximum value of the temporal resolution requirement (the event frequency) of the analysis device 12 connected to a downstream path, and sends the event stream to the node 14 on the downstream side.

For example, the temporal resolution of the event stream of a predetermined region of interest ROI transmitted to the analysis device 12A is "4→4→2→1" from the sensor device 11. Furthermore, the temporal resolution of the event stream of a predetermined region of interest ROI transmitted to the analysis device 12B is "4→4→2→2" from the sensor device 11. The temporal resolution of the event stream of a predetermined region of interest ROI transmitted to the analysis device 12C is "4→4→4→4" from the sensor device 11. Furthermore, the temporal resolution of the event stream of a predetermined region of interest ROI transmitted to the analysis device 12D is "4→4→4→1" from the sensor device 11.

In this manner, by thinning out the event stream in accordance with the maximum value of the temporal resolution requirement (the event frequency) and sending the event stream to the node 14 on the downstream side, network traffic can be optimized and reduced.

The process of thinning out the event stream can be performed, for example, by integrating (synthesizing) events adjacent in a time direction, as described later with reference to FIGS. 40 and 41.

Figure 28:
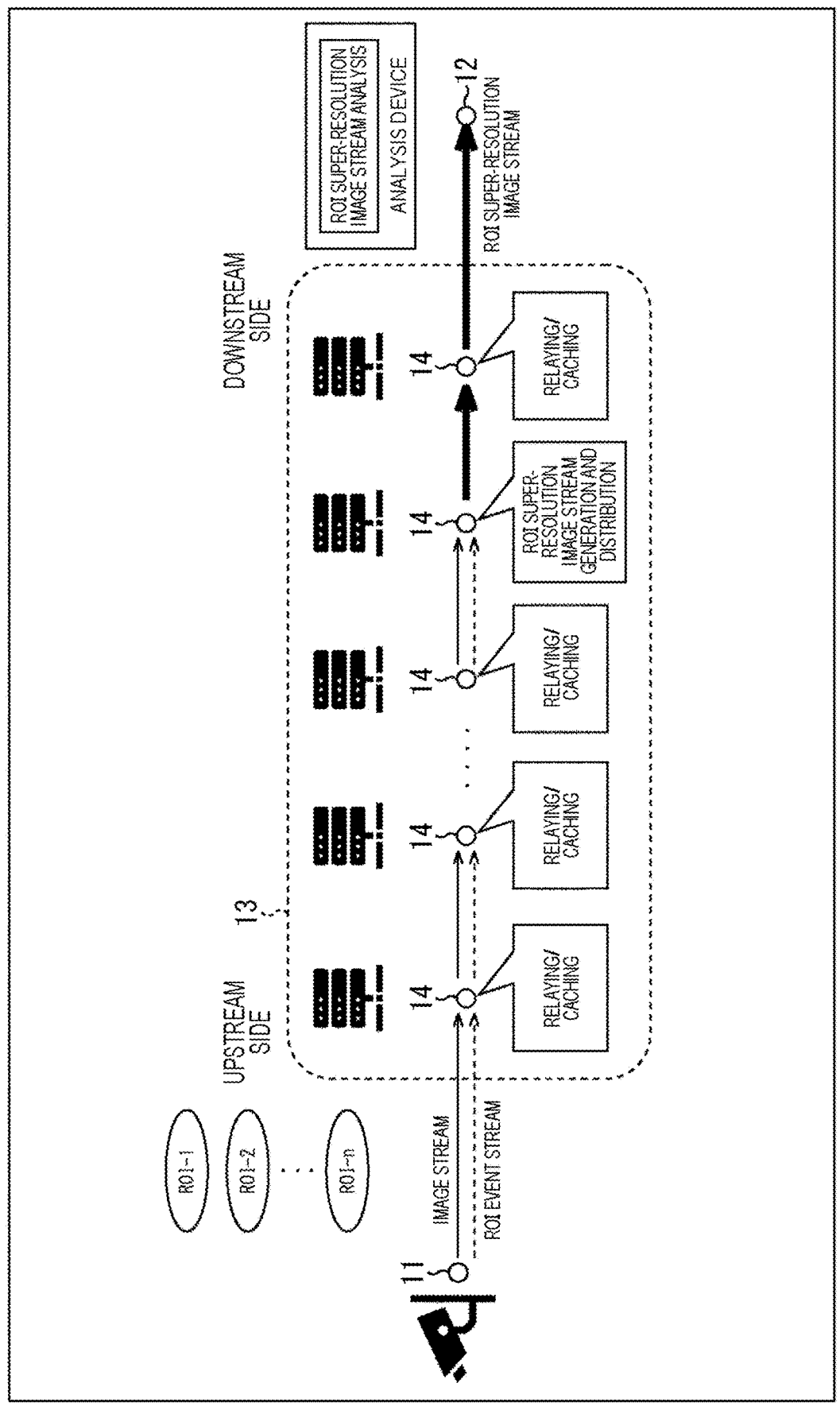
FIG. 28 is a diagram illustrating details of the example of distribution of FIG. 25.

Note that, depending on the number of analysis devices 12 connected to the path on the downstream side, the number of regions of interest ROI, and the like regarding the node 14 that generates the ROI super-resolution stream, there is a case where the network traffic as a whole can be reduced more by generating the ROI super-resolution stream at, rather than the node 14 of the edge connected first with the analysis device 12, the node 14 one before or the node 14 two before as illustrated in FIG. 28. In this case, the node 14 downstream of the node 14 that generates the ROI super-resolution stream is a node that relays and caches the ROI super-resolution stream.

Figure 29:
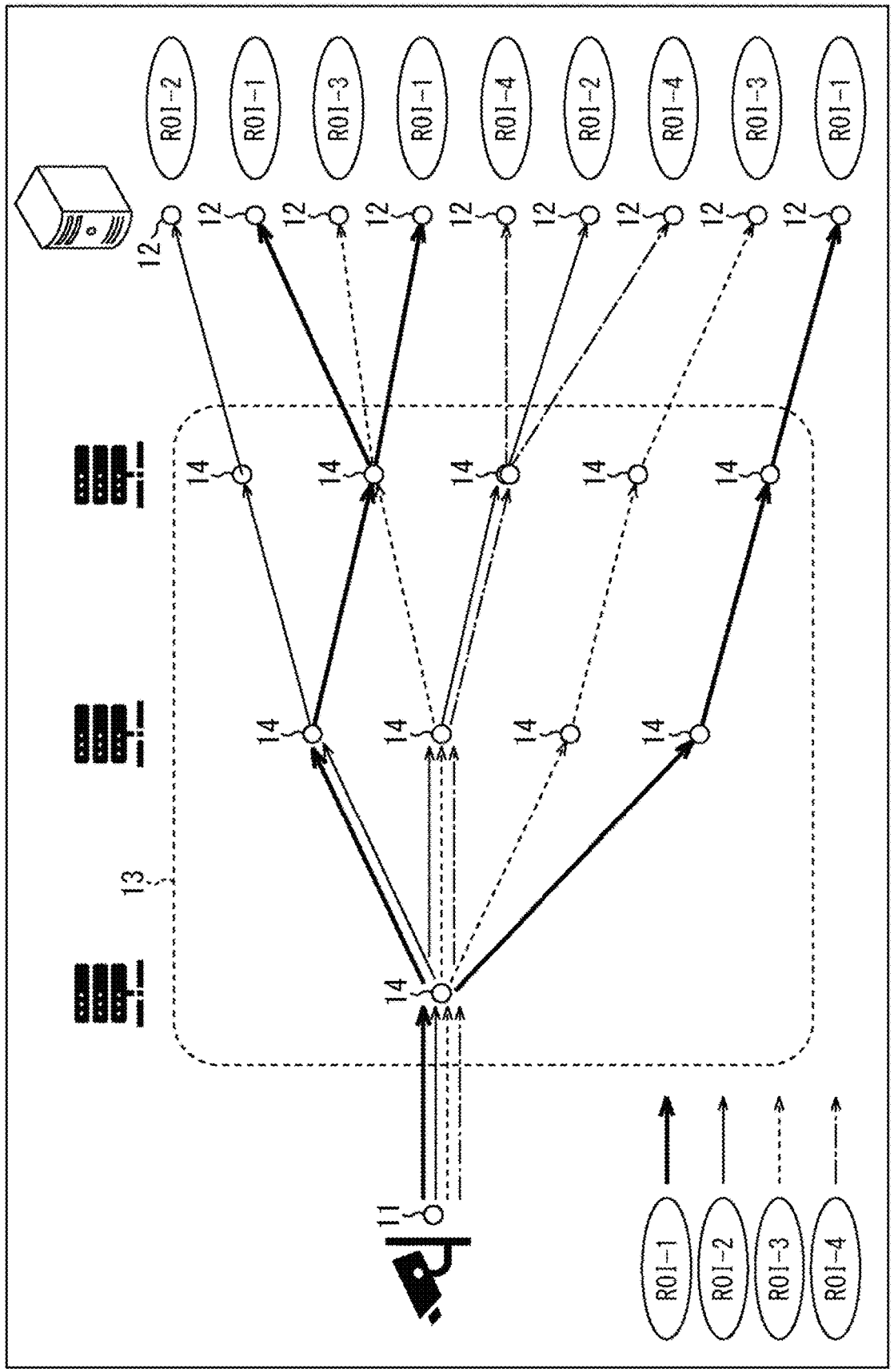
FIG. 29 is a diagram illustrating a transmission path of a stream of each region of interest ROI.

FIG. 29 is a diagram illustrating a transmission path of a stream of each region of interest ROI, focusing on a plurality of regions of interest ROI included in a frame image captured by the image sensor.

Note that, in FIG. 29, in order to prevent complication of the figure, the number of regions of interest is four, that is, the regions of interest ROI-1 to ROI-4.

When a path through which an event stream of each of regions of interest ROI-1 to ROI-4 is transmitted is viewed for every region of interest ROI, the event stream is distributed by multicast for every region of interest ROI for which the analysis device 12 connected to the path on the downstream side is responsible for the analysis processing. That is, the event stream of each region of interest ROI is not distributed by multicast to all the analysis devices 12, but the event stream of the region of interest ROI as a processing target is distributed by multicast only to the analysis device 12 responsible for the analysis processing. As a result, an unnecessary event stream is not transmitted to the path of the network 13, and network traffic is optimized and reduced.

In a case of transmitting an image stream of the entire image, the image stream is distributed by multicast to all the nodes 14 on the path connected to the analysis device 12. Whereas, in a case of transmitting an image stream for each region of interest ROI, similarly to the event stream, the image stream of the region of interest ROI as a processing target is distributed by multicast only to the analysis device 12 responsible for the analysis processing.

As described above with reference to FIGS. 25 to 29, the image analysis network system 1 of FIG. 15 generates the super-resolution stream at the node 14 on the downstream side close to the analysis device 12 on the network 13. As a result, since transmission to the node 14 of the network 13 that generates the super-resolution stream can be performed with the image stream and the event stream with a light transfer load, traffic can be reduced. That is, it is possible to efficiently perform network transmission of a super-resolution image stream.

Furthermore, the image analysis network system 1 does not cause transmission of the streams at a uniform frame rate in all the regions of interest ROI, but causes transmission of the streams at an optimal variable frame rate according to a necessary and sufficient event frequency, in accordance with a temporal resolution requirement of the analysis device 12 for every individual region of interest ROI. As a result, traffic of the transmission path can be reduced, and a cache amount of the node 14 that relays the stream can also be optimized. Furthermore, the node 14 that performs the super-resolution processing can also save the super-resolution processing that is more than necessary, and can efficiently use the CPU (GPU) performance.

<9. Block Diagram of Image Analysis Network System>

Figure 30:
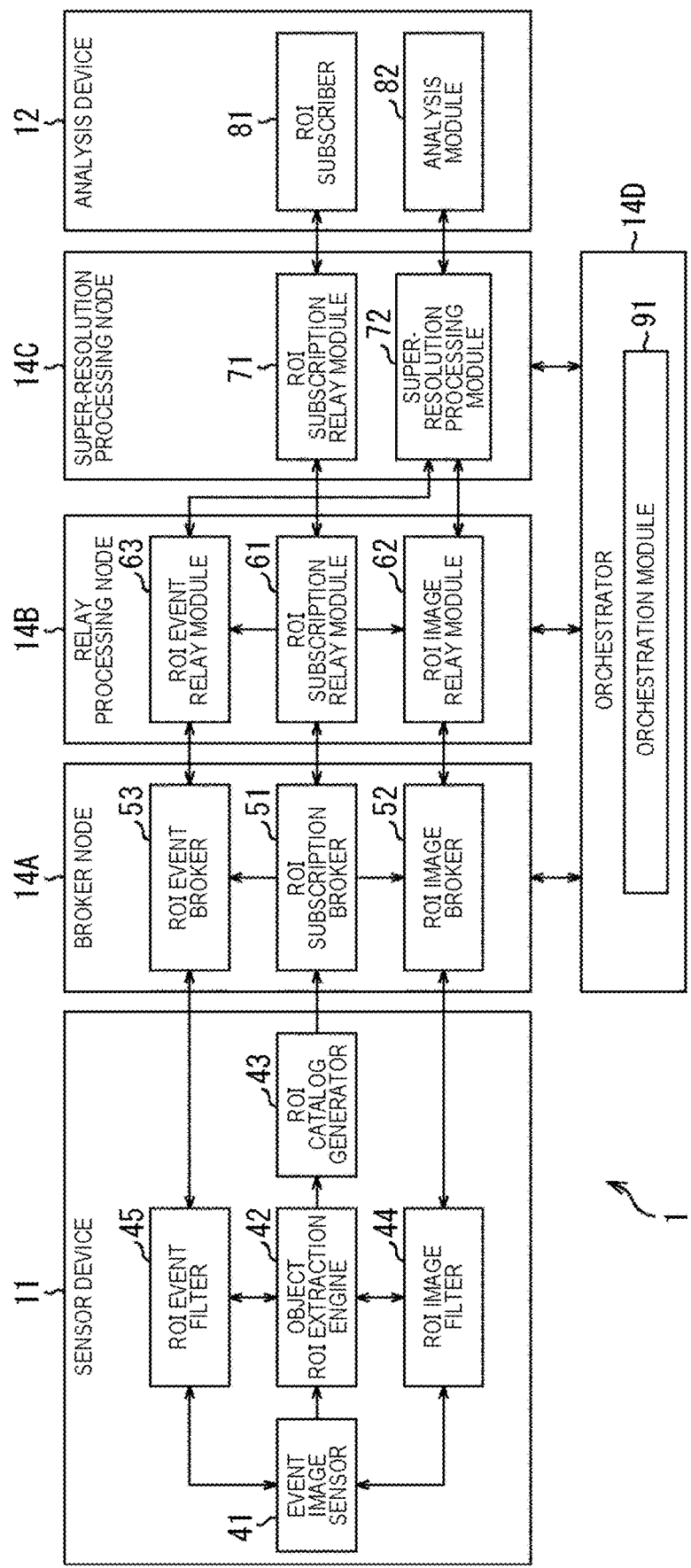
FIG. 30 is a block diagram illustrating a configuration example of the image analysis network system in FIG. 15.

FIG. 30 is a block diagram illustrating a configuration example of the image analysis network system 1 of FIG. 15 that implements the stream distribution method described with reference to FIGS. 25 to 29.

The image analysis network system 1 includes the sensor device 11, a broker node 14A, a relay processing node 14B, a super-resolution processing node 14C, an orchestrator 14D, and the analysis device 12.

FIG. 30 illustrates a configuration example related to a path through which a ROI super-resolution stream is distributed from the sensor device 11 to one predetermined analysis device 12. Therefore, the analysis device 12 in FIG. 30 corresponds to, for example, a predetermined one of the three analysis devices 12A to 12C illustrated in FIG. 25.

The broker node 14A, the relay processing node 14B, the super-resolution processing node 14C, and the orchestrator 14D are any nodes 14 in the network 13 of FIG. 15, and each node 14 in the network 13 is assigned to any of the broker node 14A, the relay processing node 14B, the super-resolution processing node 14C, or the orchestrator 14D, depending on a function to be executed by the each node 14.

The broker node 14A is the node 14 (an edge node) that is in the network 13 and is connected first with the sensor device 11 in the network 13, and is, for example, the node 14a in FIG. 15.

The relay processing node 14B is a node that relays and caches the image stream and the event stream described in FIG. 26, and is, for example, the node 14c or the node 14e in FIG. 15.

Note that a plurality of relay processing nodes 14B is generally interposed between the broker node 14A and the super-resolution processing node 14C, but, a description is given with one relay processing node in FIG. 30.

The super-resolution processing node 14C is a node that executes the super-resolution processing of generating a super-resolution image by using the image stream and the event stream transmitted from the node 14 on the upstream side (the relay processing node 14B), and is, for example, the node 14g or the node 14h in FIG. 15. The super-resolution processing node 14C is often the node 14 (the edge node) that is in the network 13 and is connected first with the analysis device 12 in the network 13, but may be a node 14 on the upstream side of the edge node in consideration of a processing capability of the node 14, a band of the entire stream flowing through the network 13, and the like.

The orchestrator 14D is a node that monitors a band or the like of a stream flowing through a path of the network 13 and determines the node 14 (the super-resolution processing node 14C) that executes the super-resolution processing, and is, for example, the node 14i in FIG. 15. Each configuration of FIG. 30 illustrates a configuration in a state where the super-resolution processing node 14C has been determined.

The sensor device 11 includes an event image sensor 41, an object ROI extraction engine 42, a ROI catalog generator 43, a ROI image filter 44, and a ROI event filter 45.

The broker node 14A includes each module of a ROI subscription broker 51, a ROI image broker 52, and a ROI event broker 53.

The relay processing node 14B includes a ROI subscription relay module 61, a ROI image relay module 62, and a ROI event relay module 63.

The super-resolution processing node 14C includes a ROI subscription relay module 71 and a super-resolution processing module 72.

The orchestrator 14D includes an orchestration module 91.

The analysis device 12 includes each module of a ROI subscriber 81 and an analysis module 82.

The event image sensor 41 of the sensor device 11 has a DVS (an event sensor) and an image sensor. The DVS generates an event image at a random timing when an event occurs, and the image sensor generates a frame image at a longer period than that of the DVS, for example, 30 fps or 60 fps. The generated event image and frame image are supplied to the object ROI extraction engine 42, the ROI image filter 44, and the ROI event filter 45.

When the DVS detects the first event, the event image sensor 41 causes the image sensor to perform imaging, and supplies a generated frame image as a snapshot to the object ROI extraction engine 42.

The object ROI extraction engine 42 executes a process of recognizing an object on the basis of the snapshot from the event image sensor 41, and assigns a region of interest ROI for each recognized object. Then, the object ROI extraction engine 42 supplies, to the ROI catalog generator 43, the snapshot at the time of specifying the object, and information (ROI specification information) specifying the region of interest ROI assigned to each object. The ROI specification information includes, for example, a ROI-ID (ROI identification information) for identifying the region of interest ROI of the object and attribute information (object attribute information) of the object. The attribute information of the object includes, for example, a type (a person, a car, a name of a thing, and the like), color, coordinates indicating a region, and the like of the object detected by the recognition processing. The snapshot and the ROI specification information are also supplied from the object ROI extraction engine 42 to the ROI image filter 44 and the ROI event filter 45.

The ROI catalog generator 43 generates a ROI catalog on the basis of a snapshot, which is an image including an object, and the ROI specification information for specifying a region of interest ROI, which are supplied from the object ROI extraction engine 42, and supplies the ROI catalog to the ROI subscription broker 51 of the broker node 14A.

Figure 31:
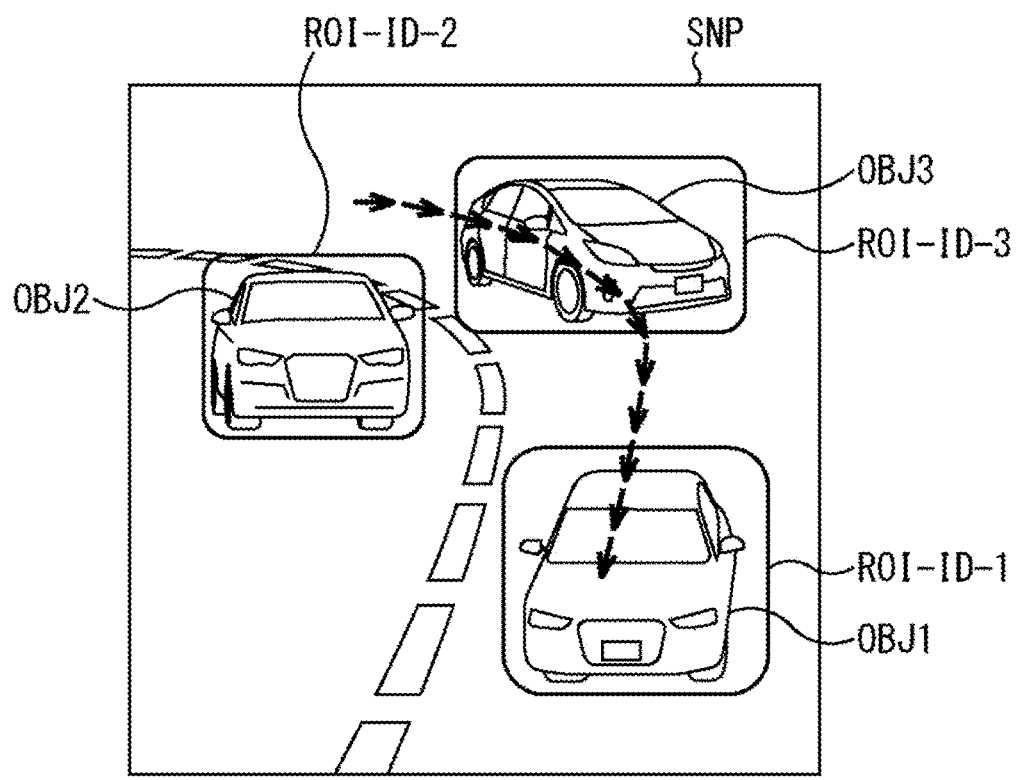
FIG. 31 is a view illustrating an example of a snapshot and assignment of the region of interest ROI.

FIG. 31 illustrates an example of a snapshot supplied from the object ROI extraction engine 42 and assignment of the region of interest ROI.

A snapshot SNP of FIG. 31 includes objects OBJ1 to OBJ3 detected by the recognition processing. The objects OBJ1 to OBJ3 are, for example, vehicles having different colors and vehicle types. ROI-ID-1 to ROI-ID-3 are assigned to the objects OBJ1 to OBJ3 as ROI identification information.

For each of the objects OBJ1 to OBJ3, the ROI catalog generator 43 converts the regions of interest ROI-ID-1 to ROI-ID-3 into global ROI-IDs for globally unique identification. The global ROI-ID is, for example, a uniform resource name (urn) including a sensor ID (a sensor-ID-n) for identifying the event image sensor 41 and the ROI specification information (ROI-ID-n) (n=1, 2, 3, . . . ). In a case where an image stream is not for every region of interest ROI but is a stream of the entire image, for example, an urn that does not limit the region of interest ROI is applied, such as ROI-ID-0 in which n of the ROI specification information (ROI-ID-n) is set to 0.

Returning to the description of FIG. 30, the ROI catalog generator 43 sets, as the ROI catalog, the ROI specification information including the snapshot SNP, the global ROI-ID for every object OBJ, and the object attribute information, and supplies the ROI catalog to the ROI subscription broker 51. This ROI catalog is notified to the ROI subscriber 81 via the ROI subscription broker 51, the ROI subscription relay module 61, and the ROI subscription relay module 71.

The ROI image filter 44 filters a frame image supplied from the event image sensor 41 on the basis of the snapshot and the ROI specification information for each object, which are supplied from the object ROI extraction engine 42, and supplies the frame image after the filtering processing to the ROI image broker 52 of the broker node 14A.

The ROI event filter 45 filters an event image supplied from the event image sensor 41 on the basis of the snapshot and the ROI specification information for each object, which are supplied from the object ROI extraction engine 42, and supplies the event image after the filtering processing to the ROI event broker 53 of the broker node 14A.

That is, the ROI event filter 45 performs filtering (extracting) such that the event images sequentially supplied from the event image sensor 41 are on a region of interest ROI basis specified by the ROI specification information, and supplies the event images for each region of interest ROI to the ROI event broker 53 as an event stream.

Whereas, as described above, the image stream may be either the image stream for each region of interest ROI or the image stream of the entire image. While the ROI image filter 44 performs filtering (extraction) so as to be on a region of interest ROI basis in the case of the image stream for each region of interest ROI, the frame images sequentially supplied from the event image sensor 41 are not filtered and are supplied as they are as the image stream to the ROI image broker 52 in the case of the image stream of the entire image.

Note that, since an object included in the frame image and the event image moves or changes, the ROI image filter 44 and the ROI event filter 45 execute the filtering processing while tracking the object in cooperation with the object ROI extraction engine 42.

The ROI subscription broker 51 of the broker node 14A sends the ROI catalog supplied from the ROI catalog generator 43, to the ROI subscription relay module 61.

Furthermore, the ROI subscription broker 51 acquires a ROI subscription request supplied from the ROI subscriber 81 of each analysis device 12 via the ROI subscription relay module 61. The ROI subscription request is a request for a region of interest ROI subscribed by each analysis device 12. In the present embodiment, subscribing means continuously acquiring a super-resolution image stream. Therefore, the ROI subscription request is, in other words, a request for the region of interest ROI for which the analysis device 12 desires to continuously acquire the super-resolution image stream.

Figure 32:
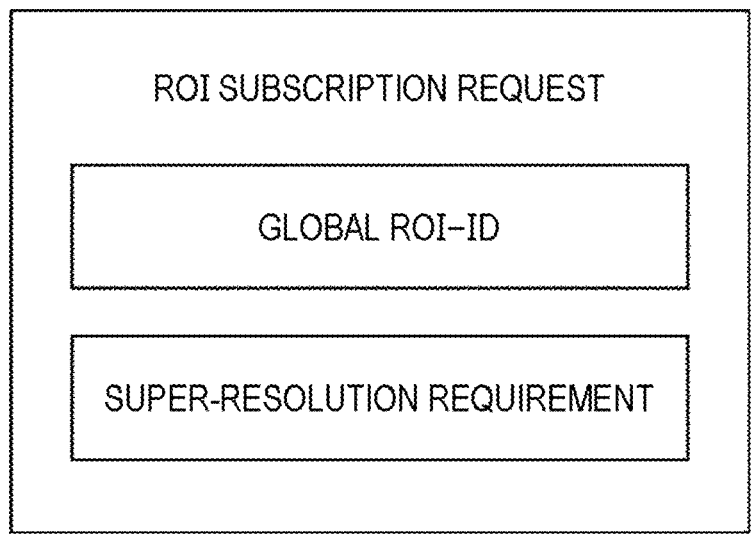
FIG. 32 is a diagram for explaining a ROI subscription request.

Specifically, as illustrated in FIG. 32, the ROI subscription request includes a global ROI-ID of the requested region of interest ROI and a super-resolution requirement. The super-resolution requirement is information indicating resolution of a super-resolution image necessary and sufficient for the recognition processing executed by the analysis device 12. In the present embodiment, the super-resolution image is an image with enhanced temporal resolution. Therefore, for example, the super-resolution requirement includes a frame rate [fps] that is temporal resolution of a frame image outputted by the image sensor, and an event sensitivity corresponding to a threshold value of a luminance value when the DVS detects an event. The event sensitivity may be, for example, an event frequency (an event density).

The ROI subscription broker 51 obtains a sending destination and a path for every region of interest ROI of an image stream and an event stream from the orchestration module 91 of the orchestrator 14D, and supplies the sending destination and the path to the ROI image broker 52 and the ROI event broker 53.

Moreover, the ROI subscription broker 51 determines a frame rate (an operation frame rate) of the image sensor and an event sensitivity (an operation sensitivity) of the DVS, on the basis of the super-resolution requirement for every region of interest ROI of the ROI subscription request supplied from each of the plurality of analysis devices 12. The determined frame rate is provided to the ROI image filter 44 and the event image sensor 41 via the ROI image broker 52, and the event sensitivity is provided to the ROI event filter 45 and the event image sensor 41 via the ROI event broker 53.

The ROI image broker 52 supplies the image stream supplied from the ROI image filter 44 to the ROI image relay module 62 of the required relay processing node 14B, on the basis of the sending destination and the path for every region of interest ROI of the image stream supplied from the ROI subscription broker 51. In a case where the image stream to be distributed is the stream of the entire image, the sending destination is not selected according to the region of interest ROI.

The ROI event broker 53 supplies the event stream supplied from the ROI image filter 44 to the ROI event relay module 63 of the required relay processing node 14B, on the basis of the sending destination and the path for every region of interest ROI of the event stream supplied from the ROI subscription broker 51.

The ROI subscription relay module 61 of the relay processing node 14B relays the ROI catalog and the ROI subscription request. That is, the ROI subscription relay module 61 acquires the ROI catalog supplied from the ROI subscription broker 51, and supplies to the ROI subscription relay module 71 of the super-resolution processing node 14C. Furthermore, the ROI subscription relay module 61 acquires the ROI subscription request supplied from the ROI subscription relay module 71, and supplies to the ROI subscription broker 51. In a case where another relay processing node 14B is interposed between the relay processing node 14B and the super-resolution processing node 14C, a similar operation is performed via the ROI subscription relay module 61 of the another relay processing node 14B.

The ROI image relay module 62 relays the entire image or the image stream of the region of interest ROI. That is, the ROI image relay module 62 acquires the entire image or the image stream of the region of interest ROI supplied from the ROI image broker 52, and supplies to the super-resolution processing module 72 of the super-resolution processing node 14C. In a case where another relay processing node 14B is interposed between the relay processing node 14B and the super-resolution processing node 14C, the entire image or the image stream of the region of interest ROI is supplied to the ROI image relay module 62 of the another relay processing node 14B.

The ROI event relay module 63 relays the event stream of the region of interest ROI. That is, the ROI event relay module 63 acquires the event stream of the region of interest ROI supplied from the ROI event broker 53, and supplies to the super-resolution processing module 72 of the super-resolution processing node 14C. In a case where another relay processing node 14B is interposed between the relay processing node 14B and the super-resolution processing node 14C, the event stream of the region of interest ROI is supplied to the ROI event relay module 63 of the another relay processing node 14B.

Furthermore, the ROI event relay module 63 performs thinning synthesis on the event stream of the region of interest ROI as necessary on the basis of the super-resolution requirement of the downstream path, generates an event stream of a region of interest ROI of low resolution with a low event frequency, and supplies to the super-resolution processing module 72 or another ROI event relay module 63.

The ROI subscription relay module 71 of the super-resolution processing node 14C relays the ROI catalog and the ROI subscription request, similarly to the ROI subscription relay module 61 of the relay processing node 14B. That is, the ROI subscription relay module 71 acquires the ROI catalog supplied from the ROI subscription relay module 61, and supplies to the ROI subscriber 81 of the analysis device 12. Furthermore, the ROI subscription relay module 71 acquires the ROI subscription request supplied from the ROI subscriber 81, and supplies to the ROI subscription relay module 61.

The super-resolution processing module 72 executes the super-resolution processing, by using the entire image or the image stream of the region of interest ROI supplied from the ROI image relay module 62 of the relay processing node 14B and the event stream of the region of interest ROI supplied from the ROI event relay module 63. A generation method for the super-resolution processing is not particularly limited. For example, the method used in Non Patent Document 1 described above can be used.

The super-resolution processing module 72 supplies the super-resolution image stream (the ROI super-resolution image stream) of the region of interest ROI obtained by the super-resolution processing, to the analysis module 82 of the analysis device 12.

The orchestration module 91 of the orchestrator 14D obtains the ROI catalog and the ROI subscription request from the ROI subscription relay module 61 of each relay processing node 14B. That is, the ROI catalog and the ROI subscription request are acquired from the ROI subscription relay module 61 of each relay processing node 14B, on the path in the network 13 between the sensor device 11 and the large number of dispersedly arranged analysis devices 12.

From the ROI catalog and the ROI subscription request, the orchestration module 91 determines a path from the sensor device 11 to each analysis device 12 for each region of interest ROI on the basis of the region of interest ROI for which each analysis device 12 performs the analysis processing, and supplies the path to the ROI subscription relay module 61 of the relay processing node 14B, the ROI subscription broker 51 of the broker node 14A, and the like.

The orchestration module 91 comprehensively determines: a stream band (an image stream band and an event stream band for each region of interest ROI) estimated from the ROI catalog from the sensor device 11; a stream band for each relay processing node 14B based on information about the ROI subscription request of the ROI subscription relay module 61 of each relay processing node 14B; a stream band of the ROI super-resolution image stream after the super-resolution processing is performed; and resources (an operation processing capability, a cache capacity, and the like) necessary for the super-resolution processing node 14C, and determines, as the super-resolution processing node 14C, the relay processing node 14B on the downstream side as close to the analysis device 12 side as possible.

Furthermore, the orchestration module 91 determines the super-resolution processing node 14C so as to reduce a total band of a transmission path of each stream passing through the network 13 as much as possible.

Even after transmission of each stream is started, the orchestration module 91 performs adjustment such as rearranging the super-resolution processing node 14C so as to optimally maintain traffic while monitoring a streaming situation one after another.

In determination of arrangement of the super-resolution processing node 14C, the orchestration module 91 determines whether to set the node 14 connected first with the analysis device 12 as the super-resolution processing node 14C or to set the node 14 on the upstream side thereof as the super-resolution processing node 14C, on the basis of the number of analysis devices 12 connected to the path on the downstream side, the number of regions of interest ROI, and the like.

The ROI subscriber 81 of the analysis device 12 refers to the ROI catalog supplied from the ROI catalog generator 43 of the sensor device 11 via the ROI subscription relay module 71 of the super-resolution processing node 14C, and generates a ROI subscription request. Specifically, on the basis of the ROI catalog, the ROI subscriber 81 selects a region of interest ROI to be subjected to the recognition processing by the self, among one or more regions of interest ROI included in the ROI super-resolution image. Then, the ROI subscriber 81 generates a ROI subscription request including a global ROI-ID of the selected region of interest ROI and a super-resolution requirement. The generated ROI subscription request is notified to the ROI subscription broker 51 via the super-resolution processing node 14C and the relay processing node 14B.

The analysis module 82 includes an AI engine using machine learning such as deep learning, acquires the ROI super-resolution image stream from the super-resolution processing module 72, and performs image analysis processing of analyzing the super-resolution image of the region of interest ROI. For example, the analysis module 82 performs a process of identifying (recognizing) a person of an object OBJ included in a super-resolution image of the region of interest ROI, predicting (determining) an action (a dangerous action) of the person, and the like.

As described above, in accordance with arrangement of the sensor device 11 and the plurality of analysis devices 12, each node 14 of the network 13 between the sensor device 11 and the plurality of analysis devices 12 is assigned with a node function of any of the broker node 14A, the relay processing node 14B, the super-resolution processing node 14C, or the orchestrator 14D, and executes each operation.

A module necessary for the node function assigned to each node 14 is searched and dynamically retrieved as needed from an application repository in the network 13.

Each node 14 can share data acquired from another node 14 with each module in the node 14 and store (cache) the data inside for a certain period of time, and send each piece of data such as the image stream, the event stream, the ROI catalog, and the super-resolution requirement stored in the self in response to a request from the node 14 newly participating in the network 13.

Figure 33:
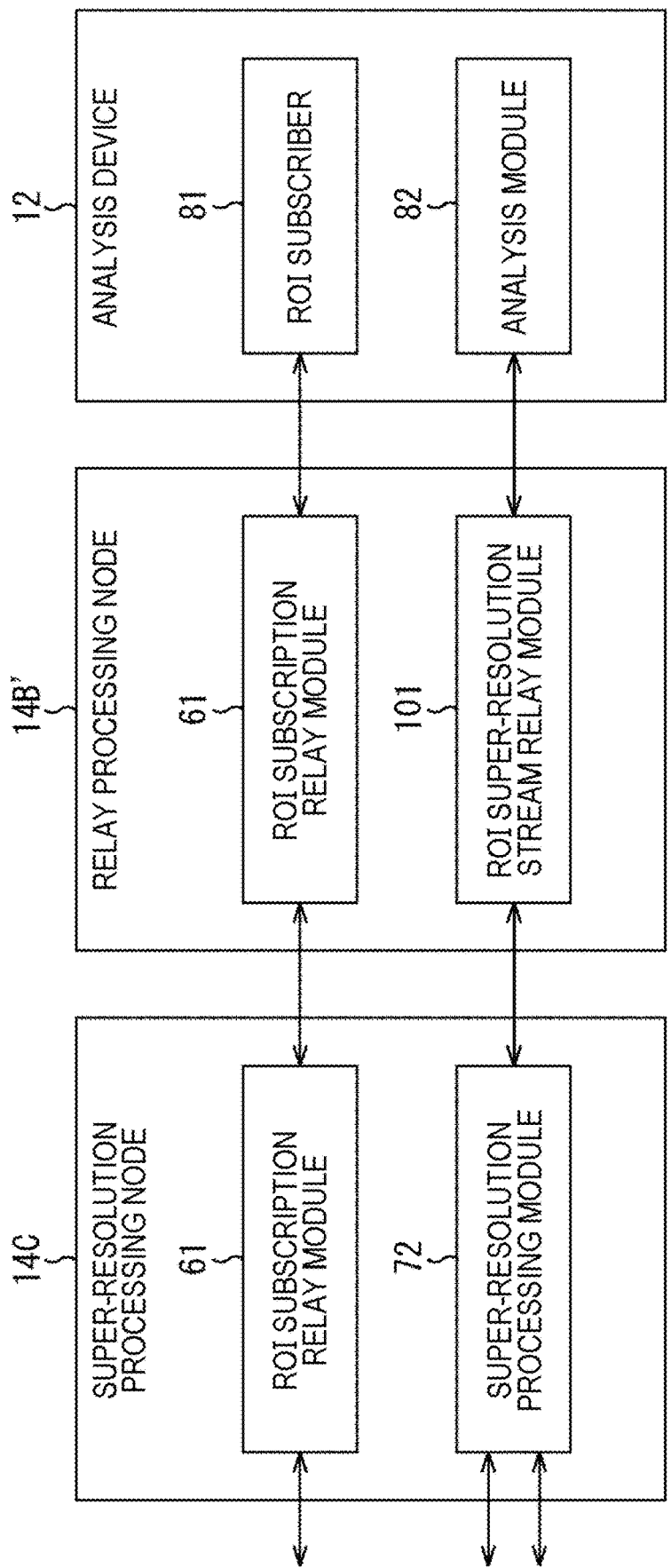
FIG. 33 is a block diagram illustrating a configuration example in a case where a super-resolution processing node is deployed at a node on an upstream side of the analysis device by one.

FIG. 33 illustrates a configuration example of the super-resolution processing node 14C and the analysis device 12, and a relay processing node 14B' in between, in a case where the super-resolution processing node 14C is arranged not at the node 14 connected first with the analysis device 12 but at the node 14 on the upstream side by one.

In a case where the super-resolution processing node 14C is arranged not at the node 14 at an edge of the network 13 but at the node 14 on the upstream side thereof, the relay processing node 14B' between the super-resolution processing node 14C and the analysis device 12 includes the ROI subscription relay module 61 and a ROI super-resolution stream relay module 101.

That is, in the relay processing node 14B', the ROI image relay module 62 and the ROI event relay module 63 of the relay processing node 14B are replaced with the ROI super-resolution stream relay module 101.

Since the super-resolution processing module 72 of the super-resolution processing node 14C generates a ROI super-resolution image stream, the ROI super-resolution stream relay module 101 that relays the ROI super-resolution image stream is arranged instead of the ROI image relay module 62 and the ROI event relay module 63 that relay an image stream and an event stream.

<Modifications of Sensor Device and Broker Node>

Figure 34:
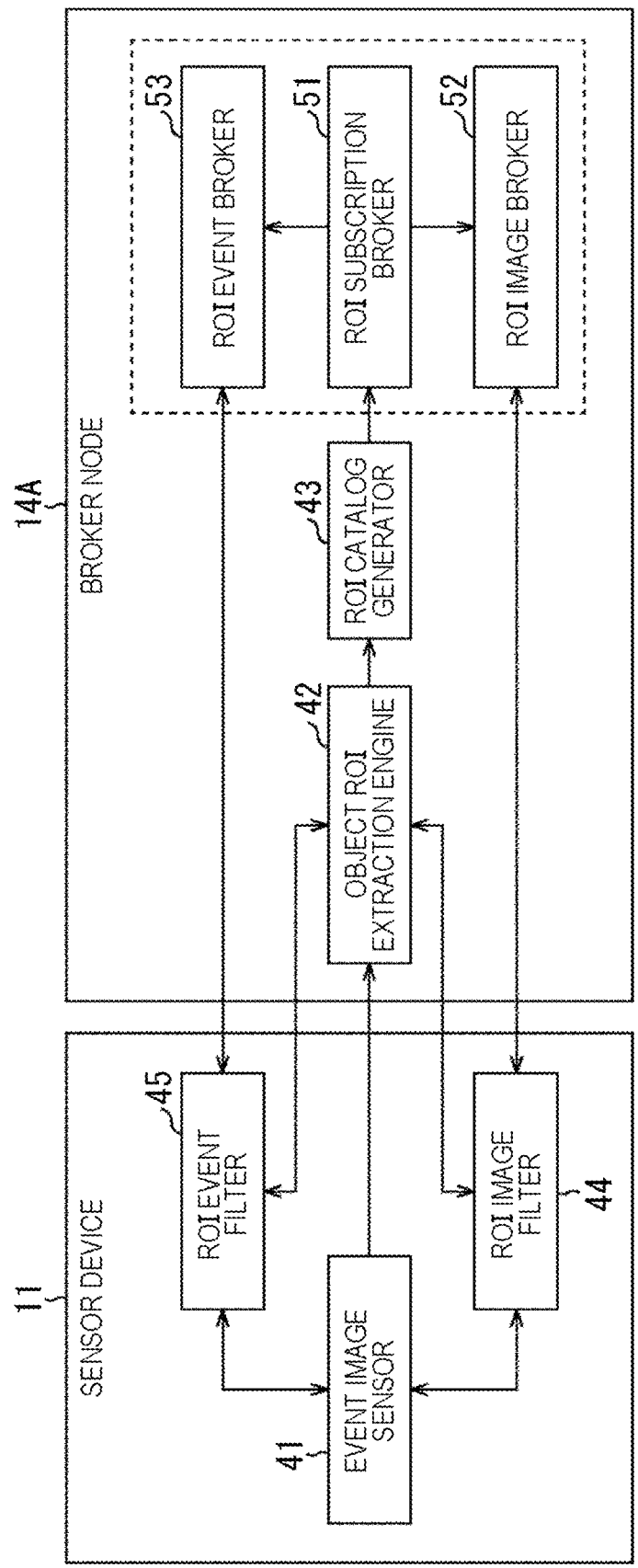
FIG. 34 is a block diagram illustrating another configuration example of a sensor device and a broker node.
Figure 35:
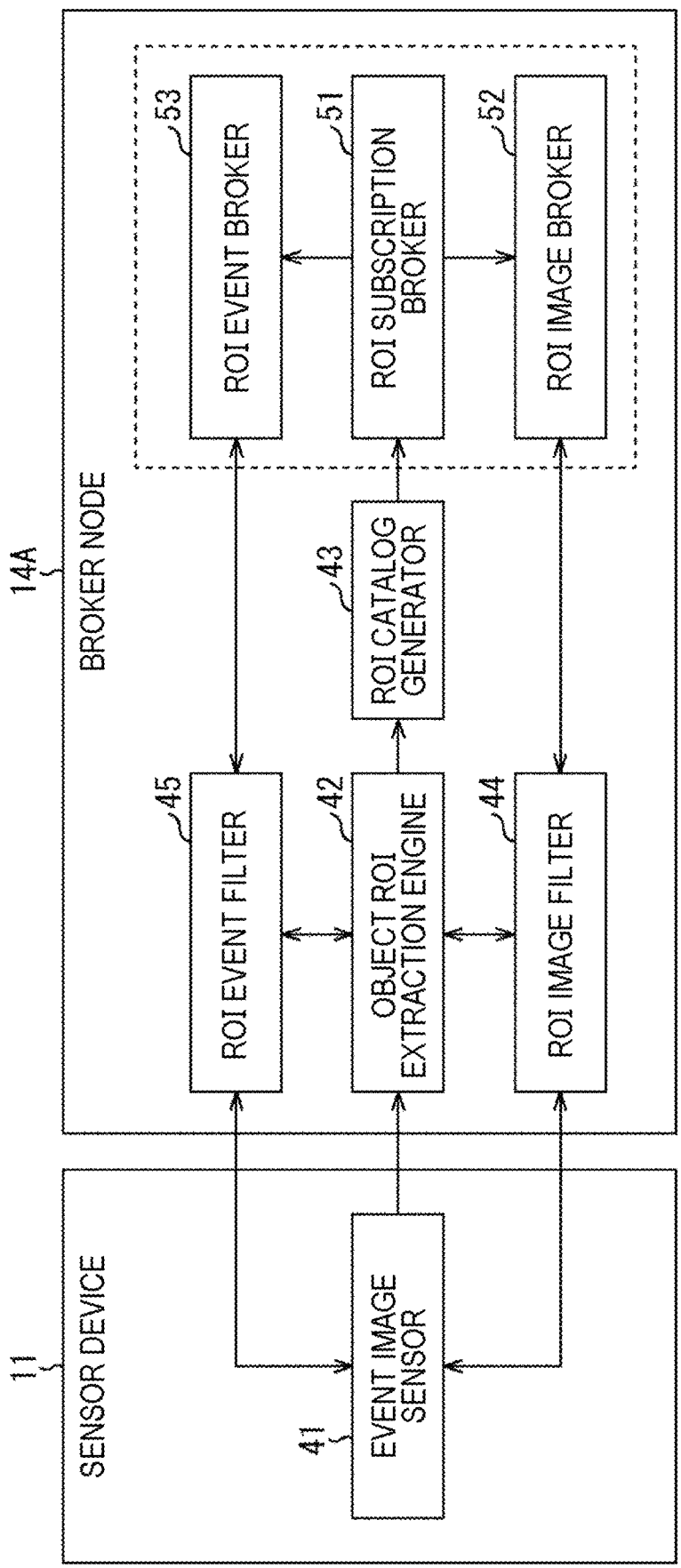
FIG. 35 is a block diagram illustrating another configuration example of the sensor device and the broker node.

FIGS. 34 and 35 illustrate another configuration example of the sensor device 11 and the broker node 14A.

In the configuration example illustrated in FIG. 30, the sensor device 11 includes the event image sensor 41, the object ROI extraction engine 42, the ROI catalog generator 43, the ROI image filter 44, and the ROI event filter 45, but modules other than the event image sensor 41 may be arranged in the broker node 14A.

FIG. 34 illustrates a configuration example in which the object ROI extraction engine 42 and the ROI catalog generator 43 are arranged in the broker node 14A.

In this case, the sensor device 11 includes the event image sensor 41, the ROI image filter 44, and the ROI event filter 45. The broker node 14A includes each module of the object ROI extraction engine 42, the ROI catalog generator 43, the ROI subscription broker 51, the ROI image broker 52, and the ROI event broker 53.

FIG. 35 illustrates a configuration example in which all modules other than the event image sensor 41 are arranged in the broker node 14A.

In this case, the sensor device 11 includes the event image sensor 41. The broker node 14A includes the object ROI extraction engine 42, the ROI catalog generator 43, the ROI image filter 44, the ROI event filter 45, the ROI subscription broker 51, the ROI image broker 52, and the ROI event broker 53.

Broken lines in FIGS. 34 and 35 show the configuration of the broker node 14A in FIG. 30.

Each module arrangement of FIGS. 30, 34, and 35 can also be implemented by being dynamically acquired from an application repository in the network 13 as necessary.

<10. Example of Image Stream and ROI Event Stream>

Figure 36:
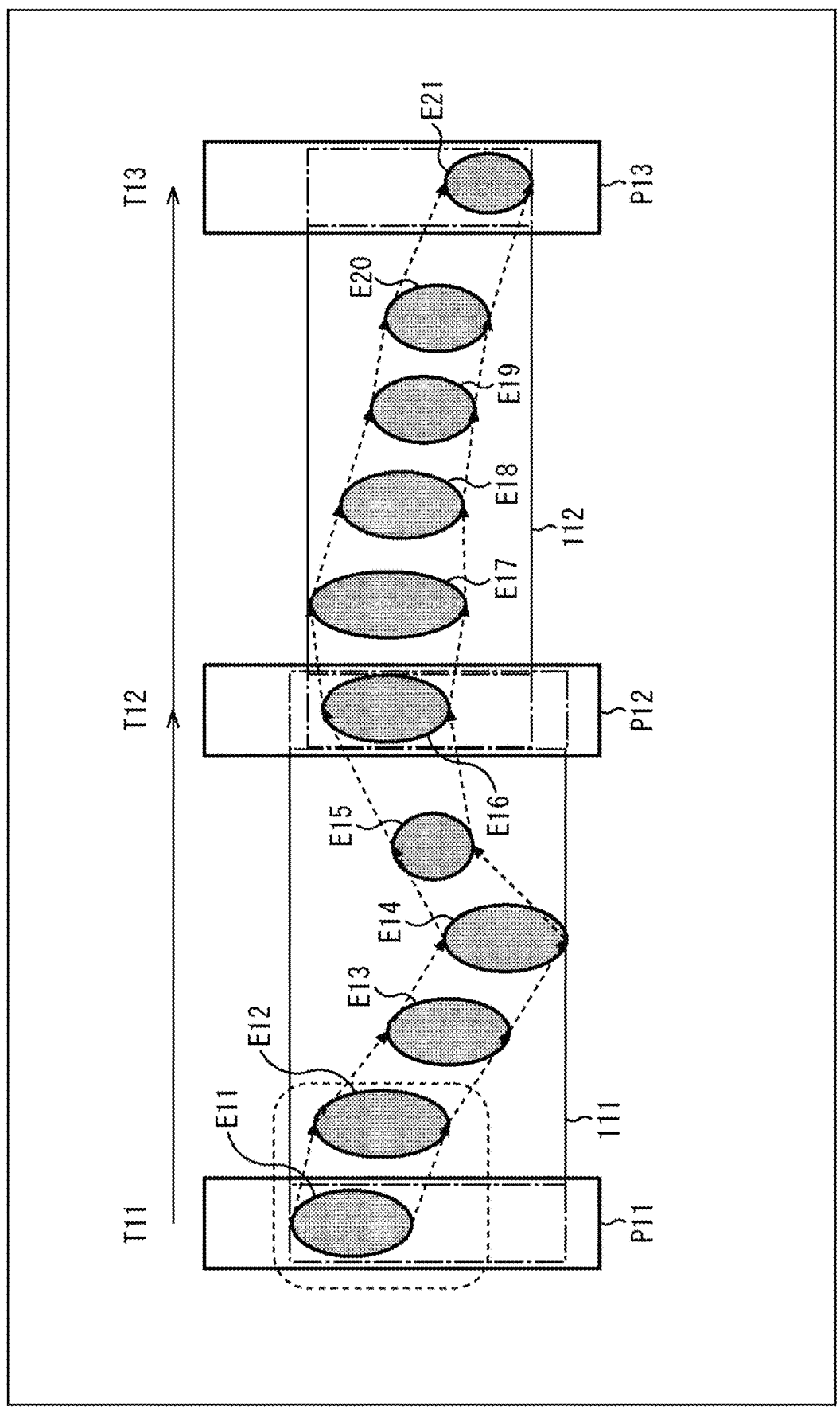
FIG. 36 is a diagram illustrating a first network transmission example of an event stream on a region of interest ROI basis.

FIG. 36 illustrates an example in which an image stream of the entire image and an event stream on a region of interest ROI basis are transmitted by a network.

Times T11, T12, and T13 represent timings at which image data of the entire image is outputted in correspondence with a long period T (=T12−T11=T13−T12). A frame image P11 is outputted at the time T11, a frame image P12 is outputted at the time T12, and a frame image P13 is outputted at the time T13, to be transmitted through the network 13.

Whereas, event images E11 to E21 indicate event images of a predetermined region of interest ROI generated between the time T11 and the time T13. A motion occurs in an object OBJ corresponding to the region of interest ROI, and positions of the event images E11 to E21 are different every time an event is detected.

In order to generate super-resolution images respectively corresponding to the event images E11 to E16 in a period from the time T11 to the time T12, image data and event data of an entire region 111 corresponding to the event images E11 to E16 are required.

The image data of the entire region 111 corresponding to the event images E11 to E16 is included in the image data to be transmitted since the image data to be transmitted is an image stream of the entire image.

Since the event stream is a stream on a region of interest ROI basis, the entire region 111 corresponding to the event images E11 to E16 cannot be confirmed until the time T12 comes. Therefore, the ROI event filter 45 detects or predicts a motion of the object OBJ in cooperation with the object ROI extraction engine 42, and transmits a past event image related to an object region after the motion together.

Figure 37:
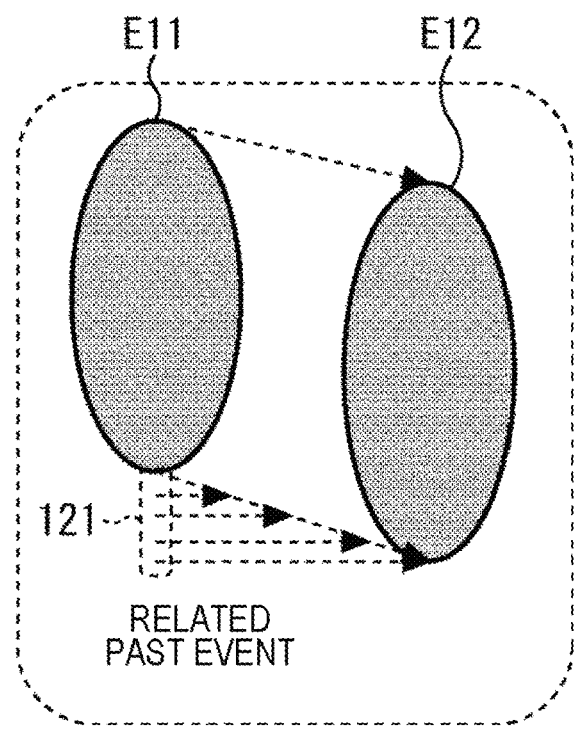
FIG. 37 is a diagram illustrating the first network transmission example of the event stream on a region of interest ROI basis.

For example, when the event images E11 and E12 surrounded by a broken line in FIG. 36 will be described, as illustrated in FIG. 37, at a time point when a region of the event image E12 is detected or predicted, the ROI event filter 45 also transmits, together with the event image E12, event data of a region 121 of a past event related to the region of the event image E12.

By executing such processing one after another, event data of the entire region 111 corresponding to the event images E11 to E16 can be transmitted, and the super-resolution processing cab be performed at the super-resolution processing node 14C.

By also detecting and predicting the motion of the object OBJ for each of the event images E16 to E21 in a period from the time T12 to the time T13, and transmitting a past event image related to the object region after the motion, event data of an entire region 112 corresponding to the event images E16 to E21 is transmitted to the super-resolution processing node 14C.

Figure 38:
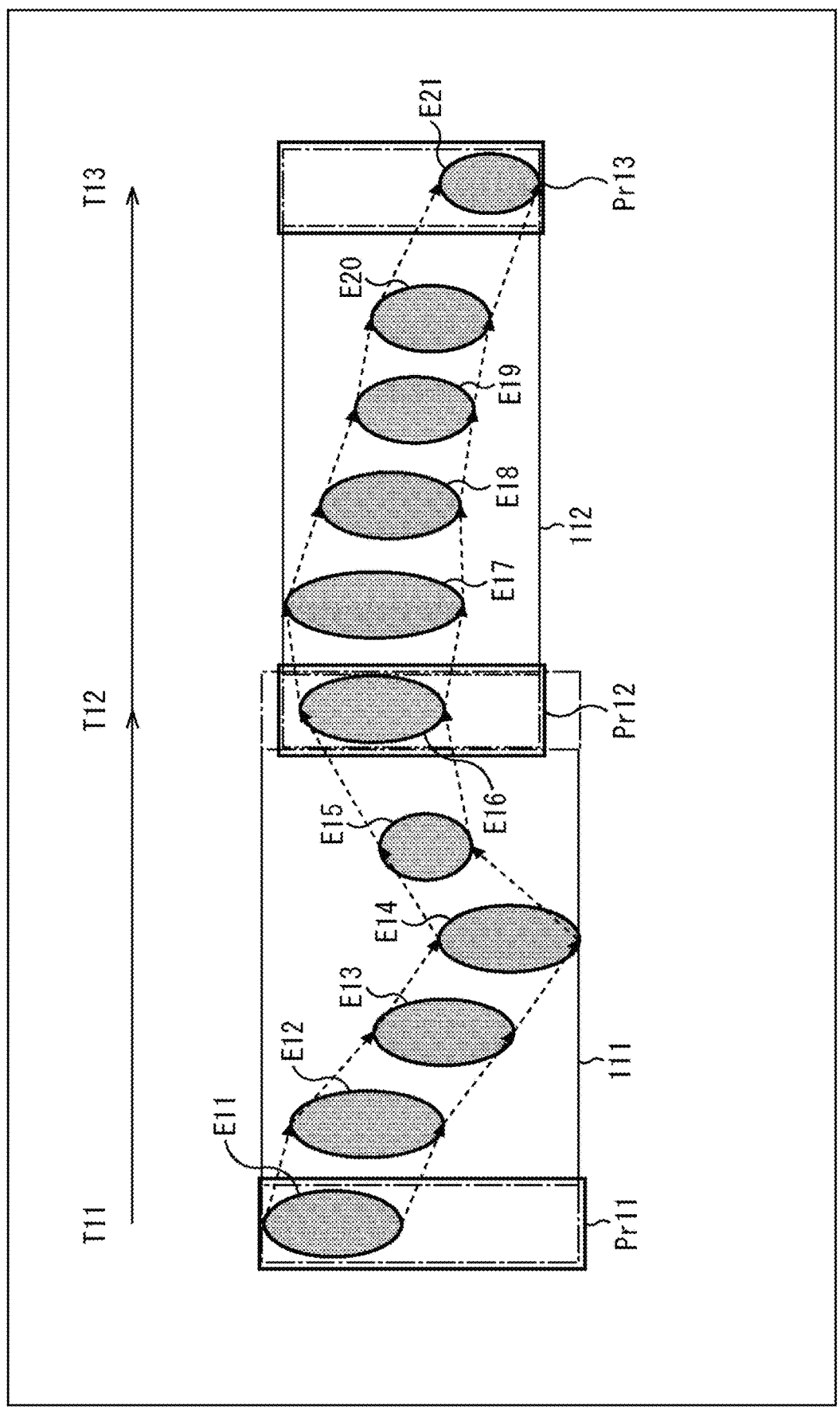
FIG. 38 is a diagram illustrating a second network transmission example of the event stream on a region of interest ROI basis.

FIG. 38 illustrates an example in which both the image stream and the event stream are transmitted by the network on a region of interest ROI basis.

In FIG. 38, event images E11 to E21 detected in a period from a time T11 to a time T13 are similar to those in FIG. 36.

In a case where the image stream is transmitted by the network on a region of interest ROI basis, similarly to the event data, the image data also requires a partial image Pr11 corresponding to an entire region 111 corresponding to the event images E11 to E16 in order to generate super-resolution images respectively corresponding to the event images E11 to E16 in the period from the time T11 to the time T12.

However, the entire region 111 corresponding to the event images E11 to E16 cannot be confirmed until the time T12 comes. Therefore, the ROI event filter 45 transmits the partial image Pr11 corresponding to the entire region 111 and the event data corresponding to the entire region 111 corresponding to the event images E11 to E16, at a time point when the time T12 comes and the entire region 111 corresponding to the event images E11 to E16 is confirmed. In this case, the image stream and the event stream on a region of interest ROI basis are transmitted with a delay of a long period T.

Also regarding each of event images E16 to E21 in a period from the time T12 to the time T13, a partial image Pr12 corresponding to an entire region 112 and event data corresponding to the entire region 112 corresponding to the event images E16 to E21 are transmitted, at a time point when the time T13 comes and the entire region 112 corresponding to the event images E16 to E21 is confirmed.

The transmission method in FIG. 38 is useful in a case where it is desired to reduce a band of an image stream even if the transfer is to be slightly delayed.

Figure 39:
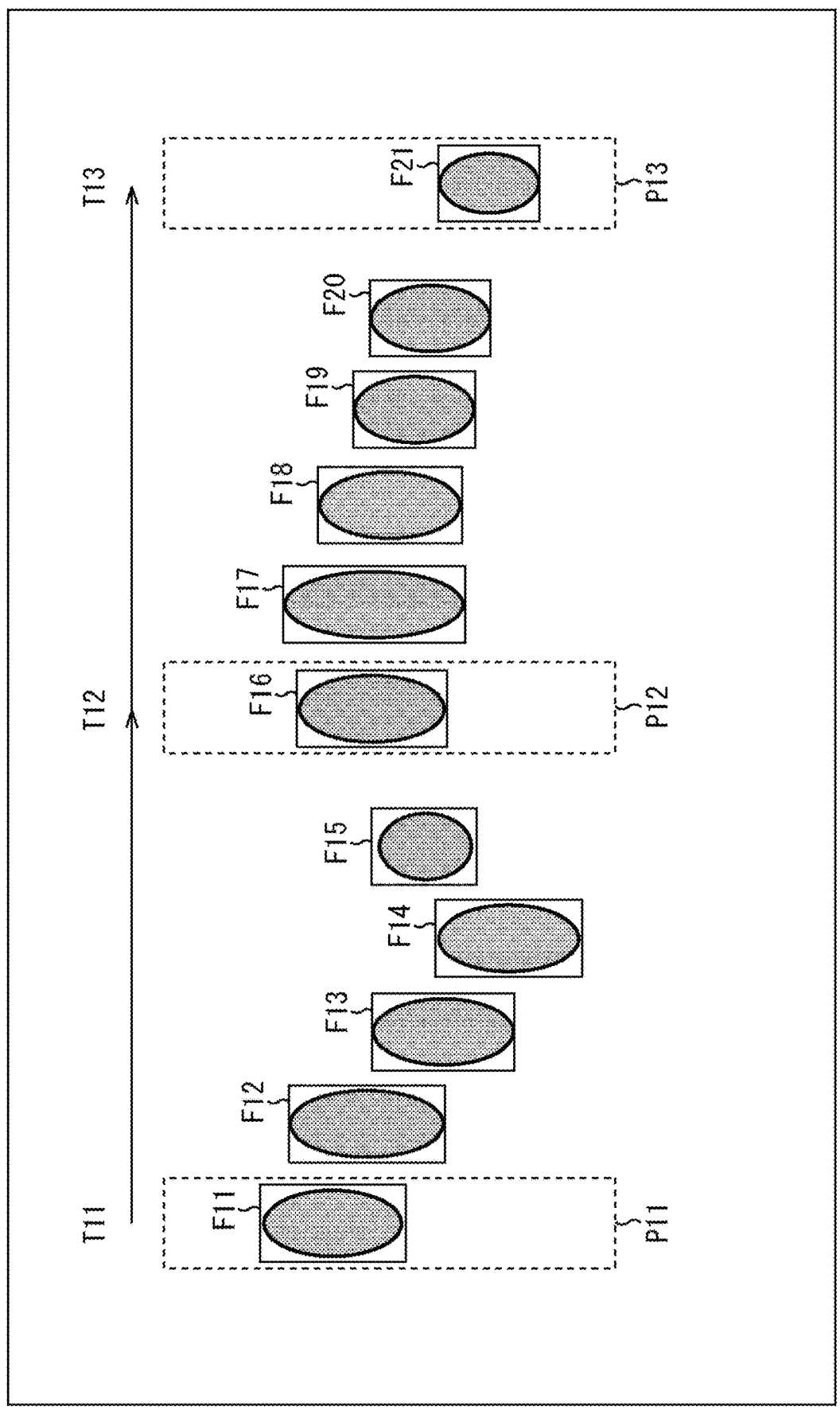
FIG. 39 is a diagram illustrating an example of a ROI super-resolution stream.

FIG. 39 illustrates an example of a ROI super-resolution stream outputted from the super-resolution processing node 14C after an image stream and an event stream are transmitted to the super-resolution processing node 14C by the transmission method in FIG. 36 or 38, and the super-resolution processing is executed in the super-resolution processing node 14C.

In FIG. 39, super-resolution images F11 to F21 are generated according to generation timings of the event images E11 to E21 in FIGS. 36 and 38, and are transmitted as ROI super-resolution streams.

<11. Thinning Synthesis Processing on ROI Event Stream>

Next, thinning synthesis of an event stream performed by the ROI event relay module 63 will be described.

The ROI event relay module 63 can perform thinning synthesis on an event stream of the region of interest ROI as necessary on the basis of a super-resolution requirement of a downstream path, and send the synthesized event stream.

Figure 40:
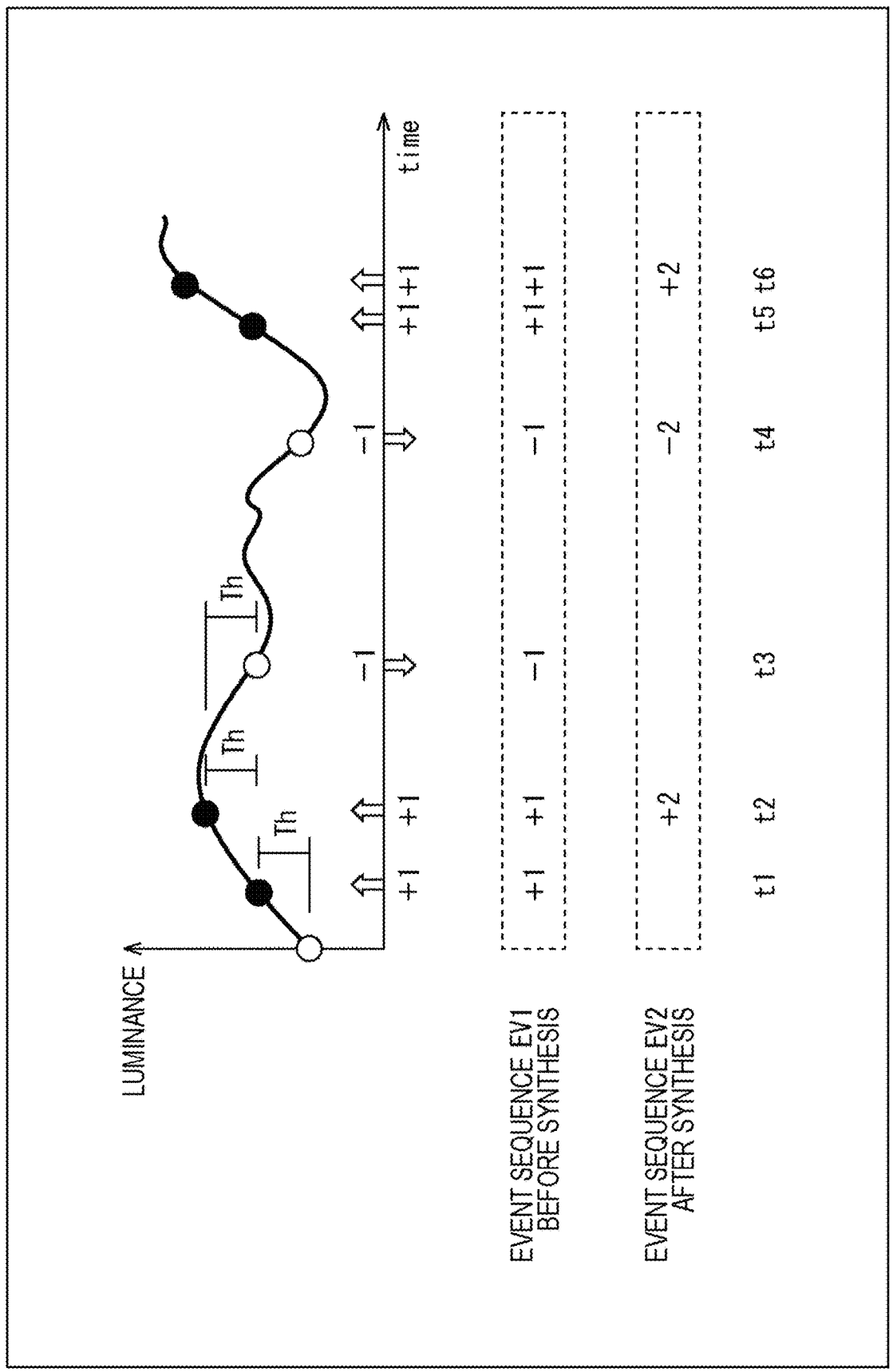
FIG. 40 is a view for explaining thinning synthesis of event data.

FIG. 40 illustrates time-series data (an event sequence) of event data of one predetermined pixel of the DVS.

In the DVS, for example, a voltage signal corresponding to a logarithmic value of an amount of received light incident on each pixel is detected as a pixel signal. Then, the DVS outputs "+1" representing a luminance change in a positive direction in a case where a luminance change represented by a pixel signal is changed to be brighter exceeding a predetermined threshold value Th, and outputs "−1" representing a luminance change in a negative direction in a case where a luminance change represented by a pixel signal is changed to be darker exceeding the predetermined threshold value Th.

In the example of FIG. 40, in an event sequence EV1 outputted by the DVS, "+1" is outputted at a time t1, "+1" is outputted at a time t2, "−1" is outputted at a time t3, "−1" is outputted at a time t4, "+1" is outputted at a time t5, and "+1" is outputted at a time t6. Intervals between the times t1, t2, t3, . . . t6 are not constant as illustrated in FIG. 40.

The event data is represented, for example, in the following form called an address-event representation (AER) form.

$$e=(x,y,ts,p) \quad (1)$$

In Equation (1), "x, y" represents coordinates of a pixel in which a luminance change has occurred, ts represents a time stamp corresponding to a time at which the luminance change has occurred, and p represents a polarity (a positive direction or a negative direction) of the luminance change.

In a case where the event sequence EV1 outputted by the DVS is subjected to thinning synthesis with an event frequency of ½, for example, an event sequence EV2 after the thinning synthesis is as illustrated in FIG. 40.

The ROI event relay module 63 integrates, for example, two pieces of event data adjacent in a time direction, to generate the event sequence EV2 after the thinning synthesis from the event sequence EV1 before the thinning synthesis.

The event data after the thinning synthesis can be represented in the following extended AER form obtained by extending the AER form of Equation (1).

$$ce=(x,y,ts,p,n) \quad (2)$$

In Equation (2), n represents a frequency, and for example, n=2 is obtained in the event data at the time t2.

In the extended AER form, when the frequency n is set to 1, the event sequence EV1 before the thinning synthesis can also be expressed.

Note that, as the method of thinning synthesis, a method other than integrating a plurality of pieces of event data adjacent in the time direction may be adopted.

Figure 41:
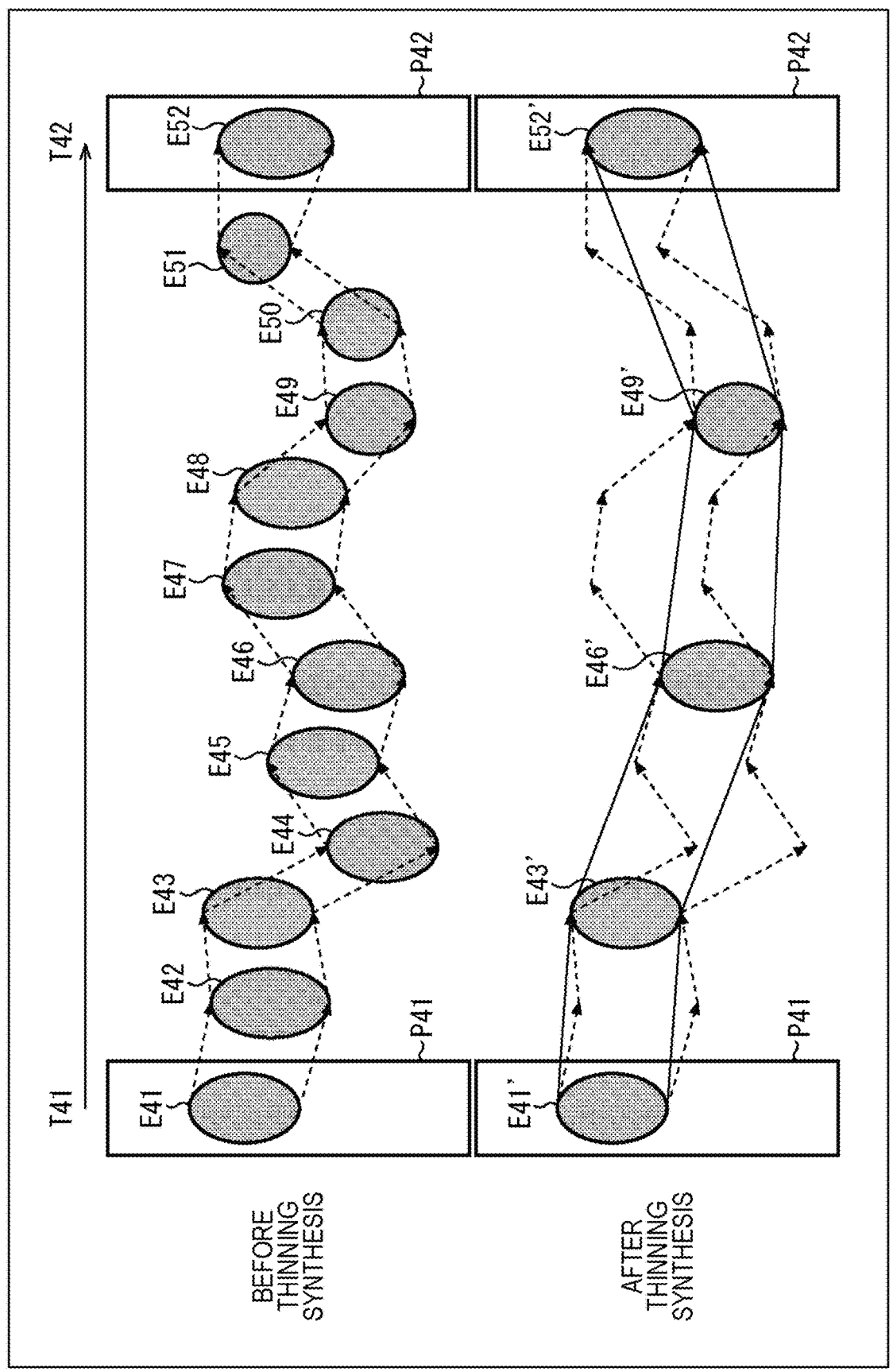
FIG. 41 is a diagram illustrating an example of an event stream of a region of interest ROI before and after the thinning synthesis.

FIG. 41 illustrates an example of an event stream in a predetermined region of interest ROI before and after thinning synthesis.

The event stream before the thinning synthesis at a time T41 to a time T42 includes, for example, event images E41 to E52.

The event stream after the thinning synthesis at the time T41 to the time T42 includes, for example, event images E41', E43', E46', E49', and E52'.

From the time T41 to the time T42, the image stream includes a frame image P41 at the time T41 and a frame image P42 at the time T42.

<12. Flow of Processing of Image Analysis Network System>

Next, with reference to a flowchart in FIG. 42, an inter-device flow of super-resolution image analysis processing by the image analysis network system 1 will be described.

Figure 42:
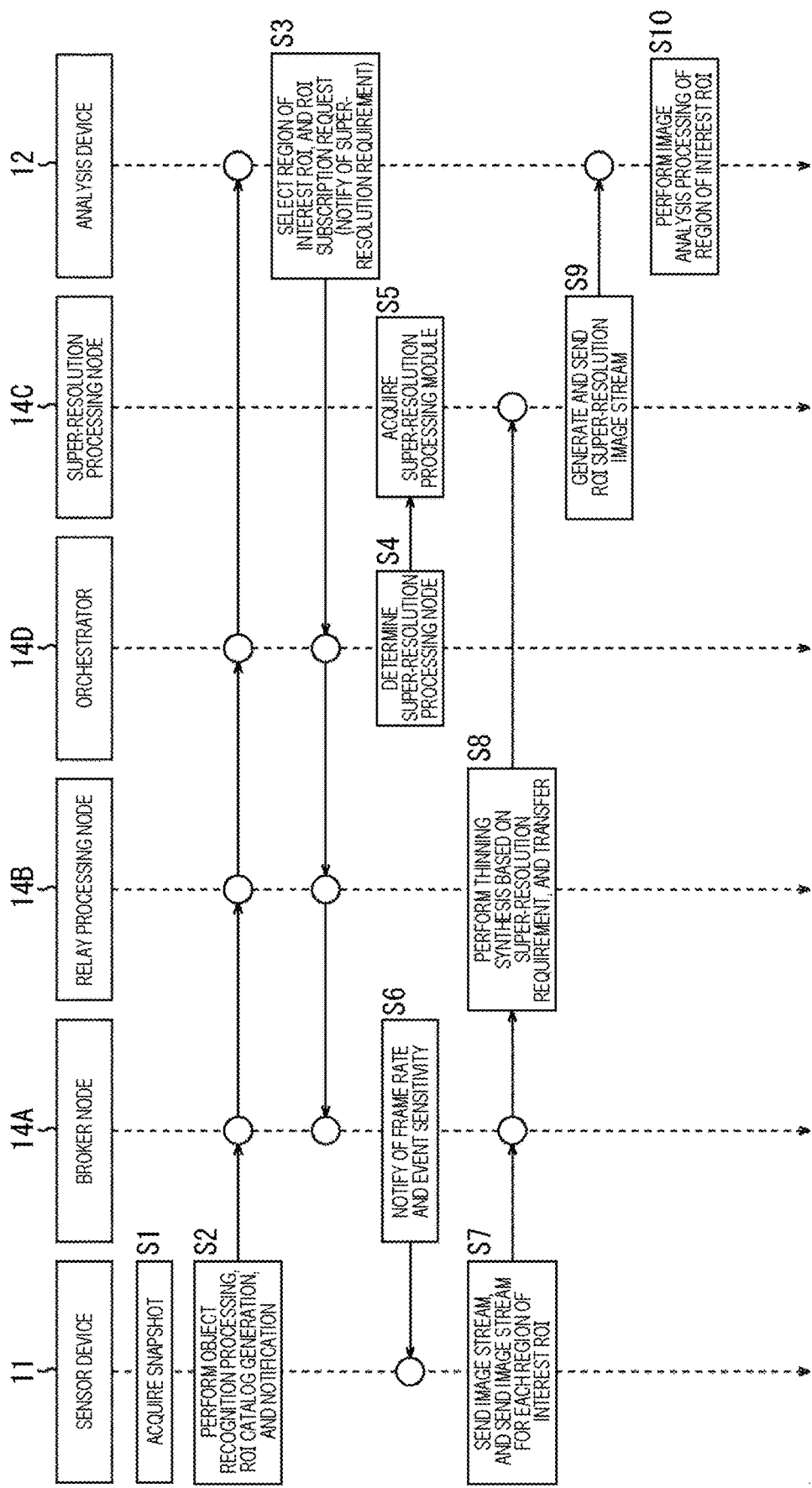
FIG. 42 is a flowchart for explaining a flow between devices in super-resolution image analysis processing.

Note that, before the super-resolution image analysis processing of FIG. 42 is started, a process is performed in which the ROI subscriber 81 of the analysis device 12 participates in multicast for the ROI catalog for acquiring the ROI catalog issued by the ROI subscription broker 51 of the broker node 14A via the ROI subscription relay module 61 of the relay processing node 14B.

First, in step S1, upon detecting an event, the sensor device 11 acquires a snapshot. Specifically, when the DVS of the sensor device 11 detects an event, the DVS activates the object ROI extraction engine 42 and causes the image sensor to perform imaging. Then, a frame image captured by the image sensor is supplied to the object ROI extraction engine 42 as a snapshot.

In step S2, the sensor device 11 executes a process of recognizing an object on the basis of the acquired snapshot, and assigns a region of interest ROI for each recognized object. Moreover, the sensor device 11 generates a ROI catalog on the basis of the snapshot and ROI specification information for specifying the region of interest ROI, and notifies the analysis device 12 of the ROI catalog. The ROI catalog is transmitted to the analysis device 12 via the broker node 14A and one or more relay processing nodes 14B.

In step S3, the analysis device 12 acquires and refers to the ROI catalog notified from the sensor device 11, and selects a region of interest ROI to be subjected to the recognition processing by the self. Then, the analysis device 12 generates a ROI subscription request of the selected region of interest ROI, and notifies the broker node 14A of the ROI subscription request via one or more relay processing nodes 14B. Here, the ROI subscription request is a request for continuously acquiring a super-resolution image stream of the region of interest ROI subjected to the recognition processing by the self. The ROI subscription request includes a global ROI-ID of the selected region of interest ROI and a super-resolution requirement.

In step S4, the orchestrator 14D acquires the ROI catalog and the ROI subscription request relayed by each relay processing node 14B. On the basis of a stream band estimated from the ROI catalog, a stream band of the ROI super-resolution image stream after the super-resolution processing is performed in each relay processing node 14B, and the like, the orchestrator 14D determines and notifies of, as the super-resolution processing node 14C, the relay processing node 14B on the downstream side as close to the analysis device 12 side as possible.

In step S5, the relay processing node 14B notified as being the super-resolution processing node 14C acquires a module necessary for the super-resolution processing node 14C, specifically, the super-resolution processing module 72, from the application repository in the network 13.

In and after the processing of steps S4 and S5, one predetermined node 14 in the network 13 between the sensor device 11 and the analysis device 12, that is, the relay processing node 14B on the downstream side as close to the analysis device 12 as possible operates as the super-resolution processing node 14C.

Whereas, in step S6, the broker node 14A determines a frame rate of the image sensor and an event sensitivity of the DVS on the basis of the super-resolution requirement for every region of interest ROI included the ROI subscription request supplied from each of the plurality of analysis devices 12, and notifies the sensor device 11.

The processing of steps S4 and S5 and step S6 can be executed in parallel.

In step S7, the sensor device 11 performs imaging at a frame rate of a long period, sends an image stream of the entire image generated as a result to the super-resolution processing node 14C, detects an event for each recognized object, and sends an event stream for each region of interest ROI to the super-resolution processing node 14C. The objects included in the frame image and the event image are tracked according to a motion.

The image stream of the entire image and the event stream for each region of interest ROI are transferred to the super-resolution processing node 14C via the broker node 14A and one or more relay processing nodes 14B.

In step S8, the predetermined relay processing node 14B of an intermediate path performs thinning synthesis on the event stream of the region of interest ROI as necessary on the basis of the super-resolution requirement of the downstream path, generates an event stream of a region of interest ROI of low resolution with a low event frequency, and transfers to the next relay processing node 14B or super-resolution processing node 14C.

In step S9, the super-resolution processing node 14C executes the super-resolution processing by using the image stream of the entire image and the event stream of the region of interest ROI, and generates a super-resolution image stream (the ROI super-resolution image stream) of the region of interest ROI. The generated ROI super-resolution image stream is sent to the analysis device 12.

In a case where the super-resolution processing node 14C is not the node 14 at an edge in the network 13 connected to the analysis device 12, but the relay processing node 14B' is interposed between the super-resolution processing node 14C and the analysis device 12, the ROI super-resolution image stream is transferred from the relay processing node 14B' to the analysis device 12.

In step S10, the analysis device 12 acquires the ROI super-resolution image stream, and performs image analysis processing of analyzing the super-resolution image of the region of interest ROI. For example, the analysis device 12 performs a process of identifying (recognizing) a person of an object OBJ included in the super-resolution image of the region of interest ROI, predicting (determining) an action (a dangerous action) of the person, and the like.

Each device of the image analysis network system 1 executes the super-resolution image analysis processing as described above. As a result, it is possible to efficiently perform network transmission of a super-resolution image stream.

Note that, although the flow after the analysis device 12 executes the image analysis processing is omitted, for example, an analysis result is sent to a predetermined data server or the like that collects the analysis result.

Next, with reference to flowcharts of FIGS. 43 to 45, a more detailed flow of the super-resolution image analysis processing for each module of the image analysis network system 1 will be described.

Figure 43:
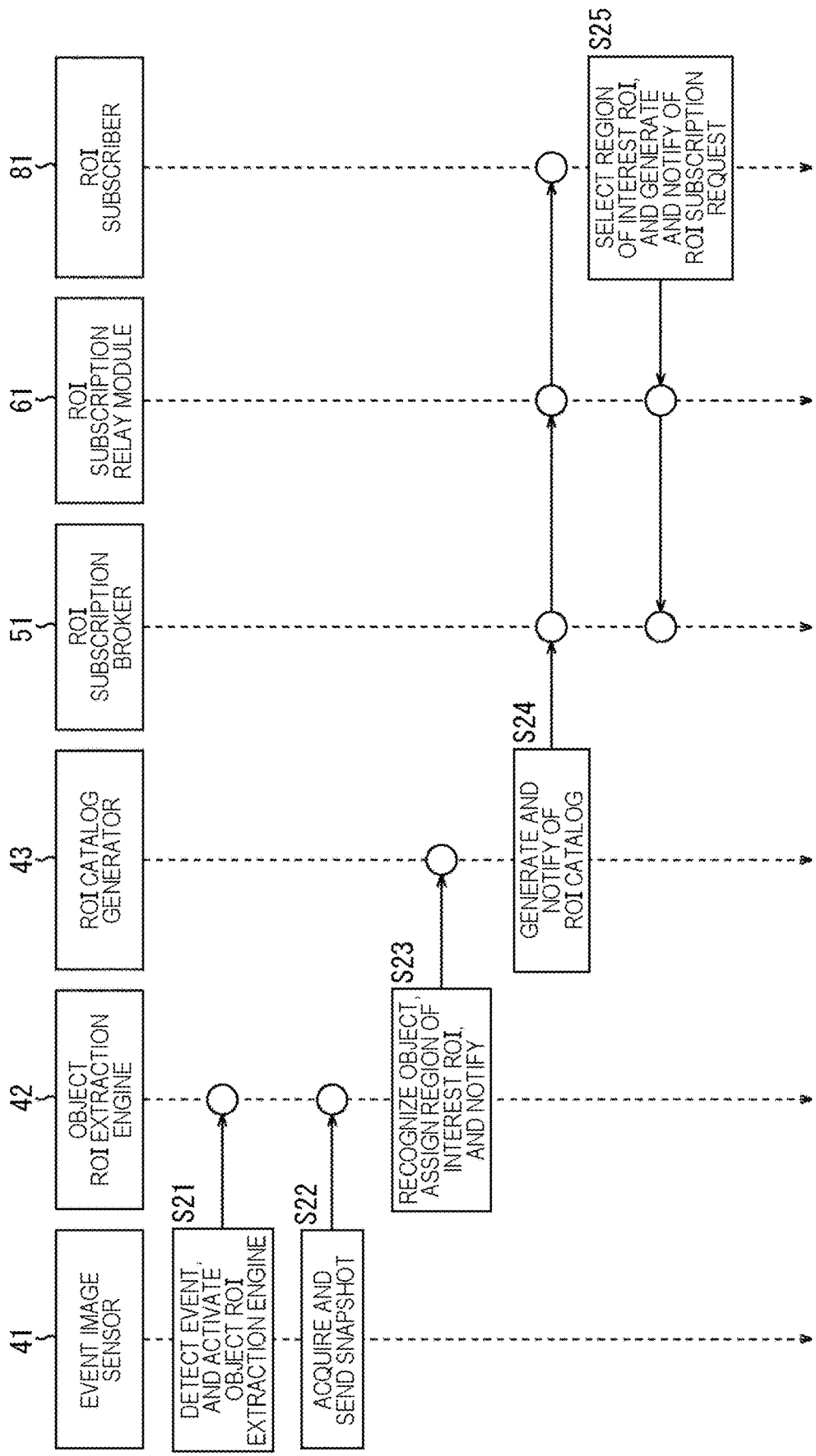
FIG. 43 is a flowchart for explaining a flow between modules in the super-resolution image analysis processing.

First, in step S21 of FIG. 43, when the event image sensor 41 of the sensor device 11 detects an event, the object ROI extraction engine 42 is activated.

Subsequently, in step S22, the event image sensor 41 performs imaging, and supplies a frame image obtained as a result to the object ROI extraction engine 42 as a snapshot.

In step S23, the object ROI extraction engine 42 executes a process of recognizing an object on the basis of the snapshot from the event image sensor 41, and assigns a region of interest ROI for each recognized object. Then, the object ROI extraction engine 42 notifies the ROI catalog generator 43 of the snapshot at the time of specifying the object, and of ROI specification information specifying the region of interest ROI assigned to each object.

In step S24, the ROI catalog generator 43 generates a ROI catalog on the basis of the snapshot and the ROI specification information supplied from the object ROI extraction engine 42, and notifies the ROI subscription broker 51 of the broker node 14A of the ROI catalog. The ROI catalog includes a snapshot and ROI specification information for every object, and the ROI specification information includes a global ROI-ID and object attribute information. The ROI catalog notified to the ROI subscription broker 51 is supplied to the ROI subscriber 81 of each analysis device 12 via the ROI subscription relay module 61 of one or more relay processing nodes 14B.

In step S25, the ROI subscriber 81 of each analysis device 12 selects a region of interest ROI to be subjected to the recognition processing by the self from among one or more regions of interest ROI, on the basis of the ROI catalog supplied from the ROI catalog generator 43 of the sensor device 11. Then, the ROI subscriber 81 generates a ROI subscription request including a global ROI-ID of the selected region of interest ROI and a super-resolution requirement. The generated ROI subscription request is notified to the ROI subscription broker 51 of the broker node 14A via the ROI subscription relay module 61 of one or more relay processing nodes 14B.

Figure 44:
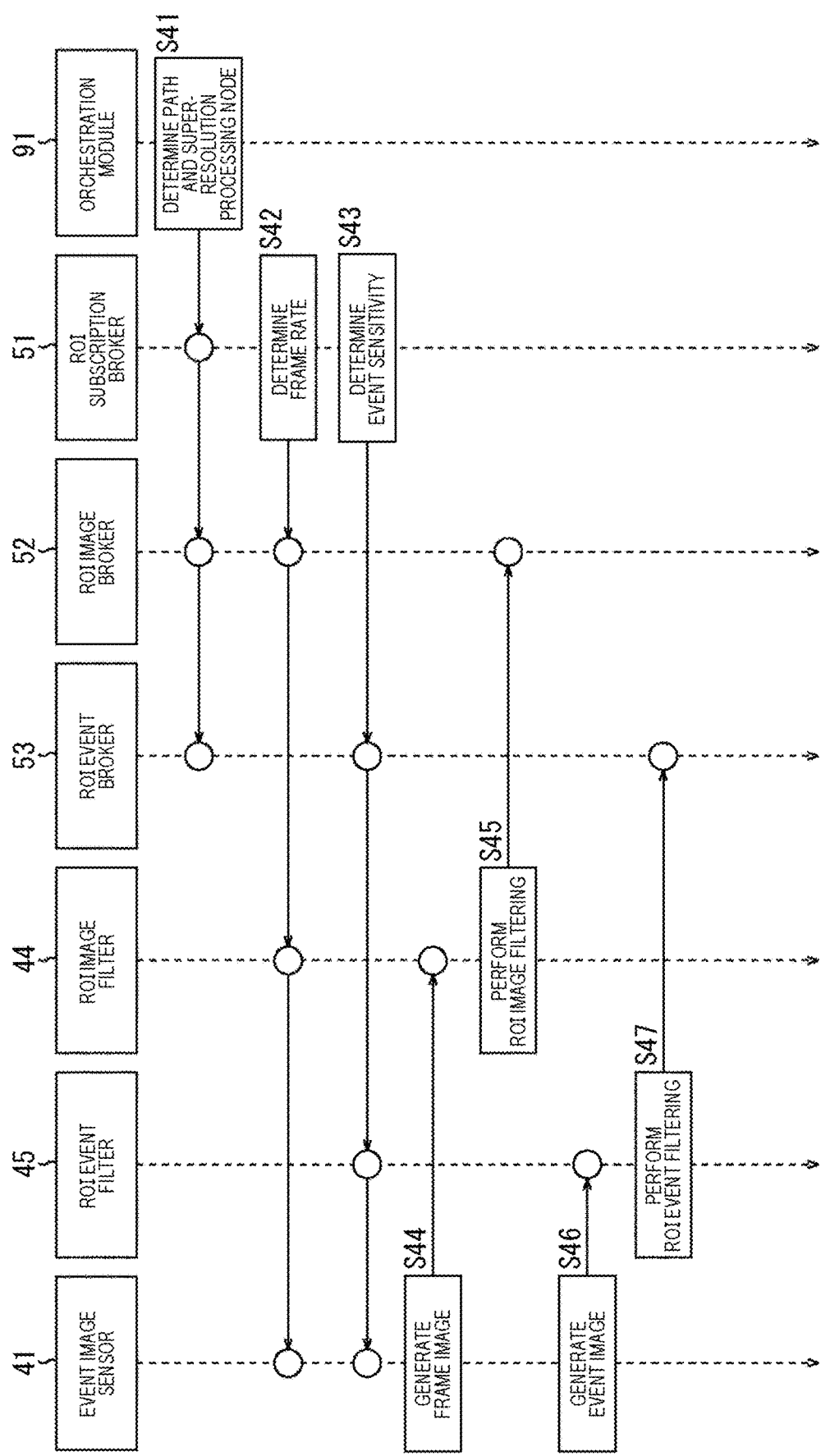
FIG. 44 is a flowchart for explaining a flow between modules in the super-resolution image analysis processing.

In step S41 of FIG. 44, the orchestration module 91 of the orchestrator 14D obtains the ROI catalog and the ROI subscription request transmitted by the ROI subscription relay module 61 of each relay processing node 14B. Then, the orchestration module 91 determines a path from the sensor device 11 to each analysis device 12 for each region of interest ROI and the super-resolution processing node 14C for execution of the super-resolution processing, on the basis of the region of interest ROI for which each analysis device 12 executes the analysis processing. The relay processing node 14B determined as the super-resolution processing node 14C that is present on the path from the sensor device 11 to each analysis device 12 acquires the super-resolution processing module 72 from an application repository in the network 13. The determined path is notified to the ROI subscription relay module 61 of the relay processing node 14B and to the ROI subscription broker 51 of the broker node 14A. The determined path is also notified from the ROI subscription relay module 61 to the ROI image relay module 62 and the ROI event relay module 63 by the relay processing node 14B, and is also notified from the ROI subscription broker 51 to the ROI image broker 52 and the ROI event broker 53 by the broker node 14A.

Subsequently, in step S42, the ROI subscription broker 51 determines a frame rate of the image sensor on the basis of the super-resolution requirement for every region of interest ROI included in the ROI subscription request notified from the ROI subscriber 81 of each of the plurality of analysis devices 12, and notifies the ROI image filter 44 and the event image sensor 41 of the sensor device 11 of the frame rate via the ROI image broker 52.

Subsequently, in step S43, the ROI subscription broker 51 determines an event sensitivity of the DVS on the basis of the super-resolution requirement for every region of interest ROI included in the ROI subscription request, and notifies the ROI event filter 45 and the event image sensor 41 of the sensor device 11 of the event sensitivity via the ROI event broker 53.

In step S44, the event image sensor 41 of the sensor device 11 performs imaging with a long period to generate a frame image, and supplies the frame image of the entire image to the ROI image filter 44.

In step S45, the ROI image filter 44 filters the frame image of the entire image supplied from the event image sensor 41 as necessary, and supplies the frame image to the ROI image broker 52 of the broker node 14A.

That is, there are a case where the image stream is sent as the entire image and a case where the image stream is sent on a region of interest ROI basis. In the case where the ROI image is sent on a region of interest ROI basis, the ROI image filter 44 filters the frame image of the entire image on a region of interest ROI basis on the basis of the snapshot and the ROI specification information for each object which are supplied from the object ROI extraction engine 42, and supplies a region-of-interest image after the filtering processing to the ROI image broker 52 of the broker node 14A. In the case of sending as the entire image, the frame image of the entire image that is not filtered is supplied to the ROI image broker 52 of the broker node 14A.

In step S46, the event image sensor 41 detects an event, generates an event image, and supplies to the ROI event filter 45.

In step S47, the ROI event filter 45 filters an event image supplied from the event image sensor 41 on the basis of the snapshot and the ROI specification information for each object, which are supplied from the object ROI extraction engine 42, and supplies the event image after the filtering processing to the ROI event broker 53 of the broker node 14A.

The processing of steps S44 and S45 for the frame image and the processing of steps S46 and S47 for the event image can be executed in parallel.

Frame images are sequentially generated at a fixed period (long period) and supplied to the ROI image broker 52 as an image stream. Event images are sequentially generated every time an event is detected, and are supplied to the ROI event broker 53 as an event stream.

Figure 45:
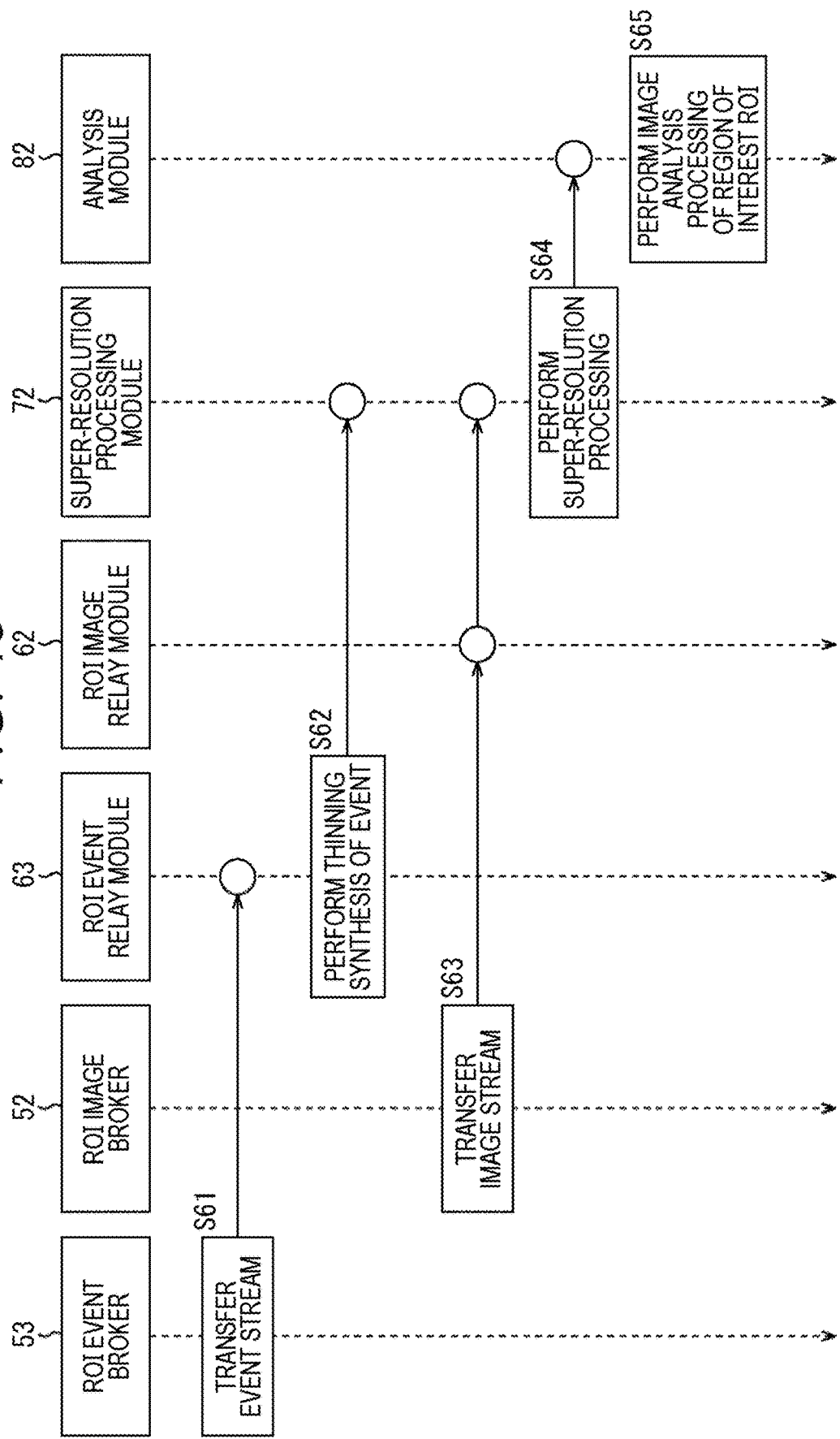
FIG. 45 is a flowchart for explaining a flow between modules in the super-resolution image analysis processing.

Next, in step S61 of FIG. 45, the ROI event broker 53 transfers the event stream supplied from the ROI image filter 44 to the ROI event relay module 63 of the relay processing node 14B, on the basis of a path for every region of interest ROI.

In step S62, the ROI event relay module 63 relays the event stream of the region of interest ROI. Furthermore, the ROI event relay module 63 performs thinning synthesis on the event stream of the region of interest ROI as necessary on the basis of the super-resolution requirement of the downstream path, generates an event stream of a region of interest ROI of low resolution with a low event frequency, and supplies to the super-resolution processing module 72.

In step S63, the ROI image broker 52 supplies the image stream supplied from the ROI image filter 44 to the ROI image relay module 62 of the relay processing node 14B, on the basis of a path for every region of interest ROI. The ROI image relay module 62 further relays the sent entire image or image stream of the region of interest ROI, and transfers to the super-resolution processing module 72.

In step S64, the super-resolution processing module 72 executes the super-resolution processing, by using the entire image or the image stream of the region of interest ROI supplied from the ROI image relay module 62 of the relay processing node 14B and the event stream of the region of interest ROI supplied from the ROI event relay module 63. Then, the super-resolution processing module 72 supplies the super-resolution image stream (the ROI super-resolution image stream) of the region of interest ROI obtained by the super-resolution processing, to the analysis module 82 of the analysis device 12.

In step S65, the analysis module 82 acquires the ROI super-resolution image stream from the super-resolution processing module 72, and performs image analysis processing of analyzing the super-resolution image of the region of interest ROI. For example, the analysis module 82 performs a process of identifying (recognizing) a person of an object OBJ included in a super-resolution image of the region of interest ROI, predicting (determining) an action (a dangerous action) of the person, and the like.

Each module of the image analysis network system 1 executes the super-resolution image analysis processing as described above. As a result, it is possible to efficiently perform network transmission of a super-resolution image stream.

<13. Example of Stream Transmission Format>

Next, with reference to FIG. 46, transmission formats of an image stream and an event stream distributed by multicast will be described.

The image stream and the event stream distributed by multicast on a region of interest ROI basis include two transport channels of an image stream channel and an event stream channel.

Figure 46:
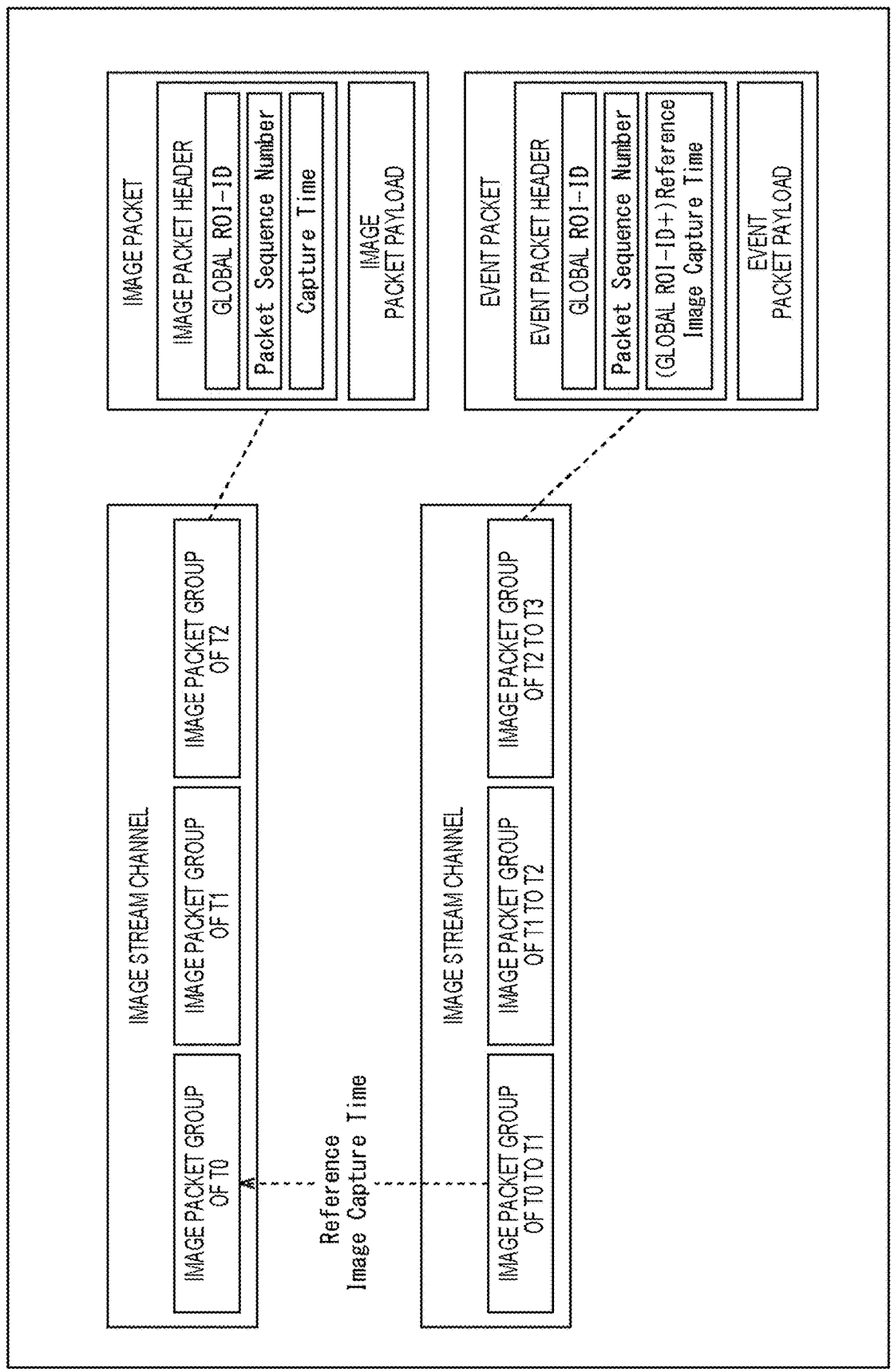
FIG. 46 is a diagram illustrating an example of a stream transmission format.

FIG. 46 is a diagram illustrating formats of the image stream channel and the event stream channel.

The image stream channel is a plurality of channels corresponding to the number of regions of interest ROI in a case where image data for every region of interest ROI is transmitted, but is one channel in a case where image data of the entire image is transmitted.

The image stream channel includes a plurality of image packet groups corresponding to individual times, and each image packet group includes one or more image packets. The event stream channel includes a plurality of event packet groups corresponding to individual times, and each event packet group includes one or more event packets.

The image packet includes an image packet header and an image packet payload. The image packet header includes a global ROI-ID, Packet Sequence Number, and Capture Time. In the image packet payload, image data of the entire image or the region of interest ROI is divided and stored in a predetermined image format. The Packet Sequence Number is a number that is assigned on a packet payload basis and is unique in a channel, and is periodically reset to zero with a sufficient length.

The event packet includes an event packet header and an event packet payload. The event packet header includes a global ROI-ID, Packet Sequence Number, and Reference Capture Time. Reference Capture Time represents Capture Time of an image packet to be referred to.

Here, in a case where image data of the entire image is stored in the image stream channel, the image stream referred to by each of the plurality of event stream channels is shared. Therefore, a global ROI-ID indicating the entire image stream of a sharing destination is added to Reference Image Capture Time of an event packet to be transferred with the different event stream channels.

Figure 47:
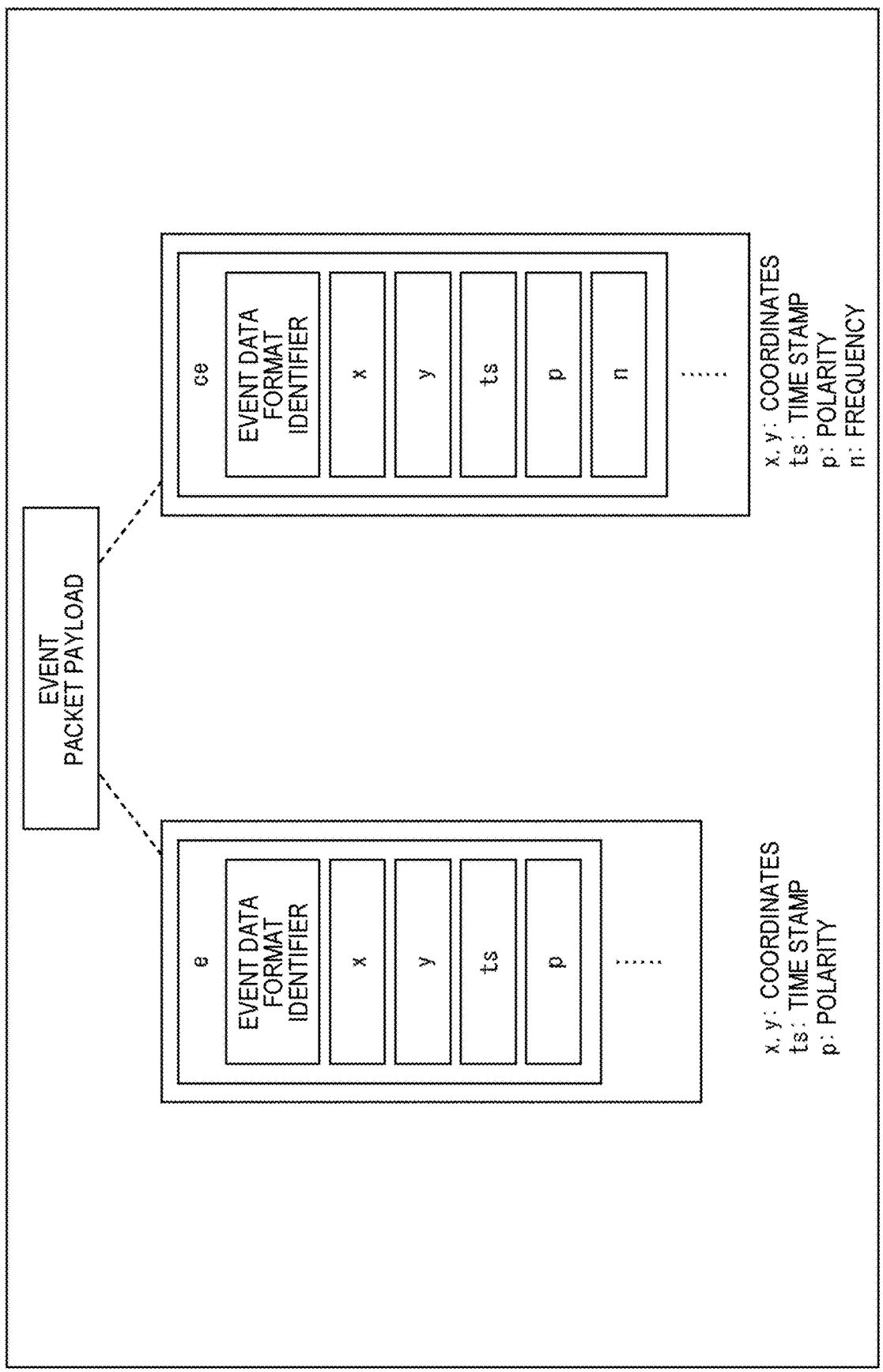
FIG. 47 is a diagram illustrating a format example of an event packet payload.

FIG. 47 is a diagram illustrating a format of the event packet payload.

In the event packet payload, for example, a plurality of pieces of event data is stored in the AER form represented by "e" in Equation (1) described above or the extended AER form represented by "ce" in Equation (2).

Note that the form of the event data stored in the event packet payload is not limited to the AER form or the extended AER form, and may be other forms. For example, the event data may be stored in a form called an event frame, Time Surface, or the like. Along with an event data format identifier (a unique URL) for identifying the form of the event data, event data encoded in a form represented by the event data format identifier may be stored in the event packet payload. Furthermore, the event data format identifier may also be stored in the event packet header.

Furthermore, in a case where a session (a virtual path) of the event stream channel or the image stream channel corresponding to the global ROI-ID is established in a lower layer, the global ROI-ID for every packet can be omitted. For example, the global ROI-ID may be made correspond to an IP multicast address, or the global ROI-ID may be made correspond to a lower layer label (a label of multi protocol label switching (MPLS), A (wavelength) in generalized MPLS (GMPLS), and the like).

When establishing paths of the image stream channel and the event stream channel, the ROI subscription broker 51 reserves resources on the network 13 in a required QoS class according to a transfer requirement. For example, a required band is secured in accordance with a band requirement of each link of a multicast tree between the relay processing nodes 14B formed in accordance with the super-resolution requirement.

The ROI subscription broker 51 performs control such that related packet groups of the image stream channel and the event stream channel are transferred in synchronization to match timings at which the super-resolution processing is performed. In a case where there is a limitation on a total amount of channel resources of the network 13 to be multicast, the ROI subscription broker 51 allocates priority to a region of interest ROI in accordance with a size of a subscription request for each region of interest ROI, and assigns such that a QoS class has higher quality (a lower delay, a lower error rate, a wider band, and the like) in descending order of priority.

Furthermore, in a case of best effort transfer, the ROI subscription broker 51 enables the relay processing node 14B on the path to adjust a transfer time between packets such that mutually related packet groups arrive at the super-resolution processing node 14C in relative synchronization. For example, the relay processing node 14B on the path is enabled to adjust the transfer time such that an image packet group having Capture-Time=T(n) arrives by the first time T(k), all the event packet groups having Reference-Image-Capture-Time=T(n) arrive by the next time T(k+1), an image packet group having Capture-Time=T(n+1) arrives by the next time T(k+2), and all the event packet groups having Reference-Image-Capture-Time=T(n+1) arrive by a time T(k+3), that is, such that the order of arrival times is to be "last image packet with Capture-Time=T(n)"<"last event packet with Reference-Image-Capture-Time=T(n)"<"last image packet with Capture-Time=T(n+1)"<"last event packet with Reference-Image-Capture-Time=T(n+1)".

The ROI super-resolution image stream transmitted between the super-resolution processing module 72 of the super-resolution processing node 14C and the analysis module 82 of the analysis device 12 is transmitted by the image stream channel in FIG. 46, and image data of a super-resolution image of the ROI in a region of interest ROI subjected to a ROI super-resolution processing is divided and stored in the image packet payload of the image packet and transferred.

<14. Computer Configuration Example>

The series of processes described above can be executed by hardware or also executed by software. In a case where the series of processes are executed by software, a program that configures the software is installed in a computer. Here, examples of the computer include, for example, a microcomputer that is built in dedicated hardware, a general-purpose personal computer that can execute various functions by being installed with various programs, and the like.

Figure 48:
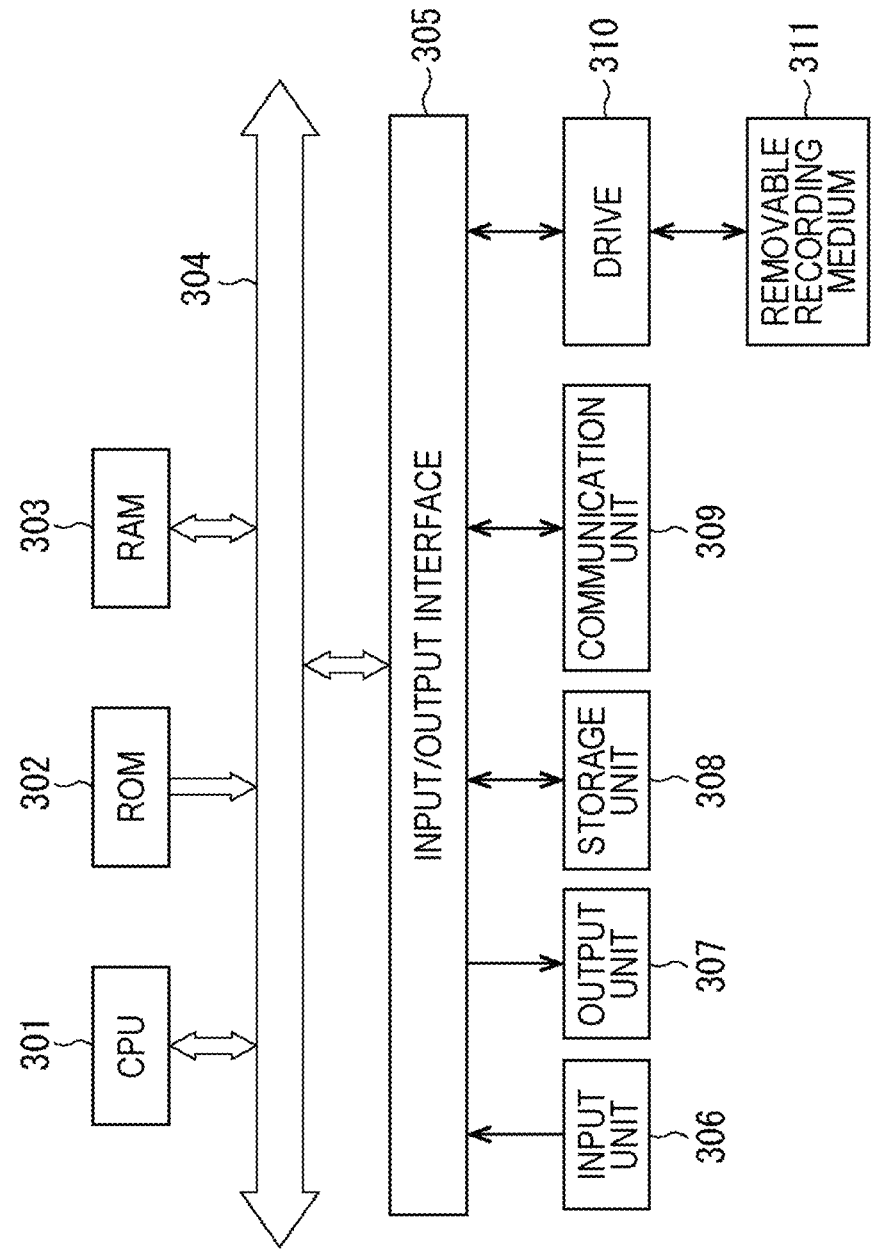
FIG. 48 is a block diagram illustrating a configuration example of an embodiment of a computer to which the present technology is applied.

FIG. 48 is a block diagram illustrating a configuration example of hardware of a computer that executes the series of processes described above in accordance with a program.

In a computer, a central processing unit (CPU) 301, a read only memory (ROM) 302, and a random access memory (RAM) 303 are mutually connected by a bus 304.

The bus 304 is further connected with an input/output interface 305. To the input/output interface 305, an input unit 306, an output unit 307, a storage unit 308, a communication unit 309, and a drive 310 are connected.

The input unit 306 includes a keyboard, a mouse, a microphone, a touch panel, an input terminal, and the like. The output unit 307 includes a display, a speaker, an output terminal, and the like. The storage unit 308 includes a hard disk, a RAM disk, a nonvolatile memory, and the like. The communication unit 309 includes a network interface or the like. The drive 310 drives a removable recording medium 311 such as a magnetic disk, an optical disk, a magneto-optical disk, or a semiconductor memory.

In the computer configured as described above, the series of processes described above are executed, for example, by the CPU 301 loading a program recorded in the storage unit 308 into the RAM 303 via the input/output interface 305 and the bus 304, and executing. The RAM 303 also appropriately stores data necessary for the CPU 301 to execute various processes, for example.

The program executed by the computer (the CPU 301) can be provided by being recorded on, for example, the removable recording medium 311 as a package medium or the like. Furthermore, the program can be provided via a wired or wireless transmission medium such as a local area network, the Internet, or digital satellite broadcasting.

In the computer, by attaching the removable recording medium 311 to the drive 310, the program can be installed in the storage unit 308 via the input/output interface 305. Furthermore, the program can be received by the communication unit 309 via a wired or wireless transmission medium, and installed in the storage unit 308. Besides, the program can be installed in advance in the ROM 302 and the storage unit 308.

Note that the program executed by the computer may be a program that executes processing in time series according to an order described in this specification, or may be a program that performs processing in parallel or at necessary timing such as when a call is made.

Note that, in this specification, the steps described in the flowcharts can be performed in time series according to the described order as a matter of course, but are not necessarily performed in time series, and may be executed in parallel or at necessary timing such as when a call is made.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

The embodiments of the present technology are not limited to the above-described embodiments, and various modifications can be made without departing from the scope of the present technology.

For example, a mode in which all or some of embodiments described above are combined can be adopted.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Note that the effects described in this specification are merely examples and are not limited, and effects other than those described in this specification may be present.

Note that the present technology can have the following configurations.

<1>
A network control method including:
by a network connection device,
determining a super-resolution processing node that generates a super-resolution image of a region of interest by performing super-resolution processing on an image on the region of interest basis included in the image generated by a sensor device, from among devices on a path in a network from the sensor device to a plurality of image processing devices.

<2>
The network control method according to <1> above, in which
the super-resolution processing node generates a super-resolution image of the region of interest, from a frame image of a fixed period and an event image generated randomly, the frame image being generated by the sensor device.

<3>
The network control method according to <2> above, in which
stream data of the frame image and stream data of the event image are transmitted from the sensor device to the super-resolution processing node, and
stream data of a super-resolution image of the region of interest is transmitted from the super-resolution processing node to each of the image processing devices.

<4>
The network control method according to <3> above, in which
each device on a path in the network filters the event image on the basis of a requirement of a downstream path, and provides stream data of the event image after filtering.

<5>
The network control method according to any one of <1> to <4> above, in which
each device on a path in the network caches data to be relayed.

<6>
The network control method according to any one of <1> to <5> above, in which
the network connection device determines the super-resolution processing node on the basis of a super-resolution image of the region of interest requested by each of the plurality of image processing devices.

<7>
The network control method according to any one of <1> to <6> above, in which
the network connection device determines the super-resolution processing node on the basis of: a stream band estimated from region-of-interest specification information for specifying the region of interest included in the image; a stream band of a relay processing node based on information about the region of interest requested by each of the plurality of image processing devices; and a stream band of the super-resolution image after the super-resolution processing is performed.

<8>
The network control method according to any one of <1> to <7> above, in which
the network connection device determines the super-resolution processing node on the basis of a number of the image processing devices and a number of the regions of interest included in the image.

<9>
The network control method according to any one of <1> to <8> above, in which
the network connection device determines, as the super-resolution processing node, a device closer to each of the image processing devices than at least the sensor device.

<10>
The network control method according to any one of <1> to <9> above, in which
the super-resolution processing node is a device that is in the network and is connected first with each of the image processing devices.

<11>
The network control method according to any one of <1> to <10> above, in which
each of the image processing devices requests the sensor device for the region of interest as a processing target and a super-resolution requirement necessary and sufficient for processing by each of the image processing devices.

<12>
The network control method according to any one of <1> to <11> above, in which
the super-resolution requirement includes a frame rate of a frame image generated by the sensor device and an event sensitivity of an event image generated by the sensor device.

<13>
The network control method according to any one of <1> to <12> above, in which
the device determined as the super-resolution processing node acquires a module that performs the super-resolution processing, from a repository in the network.

<14>
The network control method according to any one of <1> to <13> above, in which
the sensor device includes an image sensor and an event sensor.

<15>
An image processing system including:
a module that determines a super-resolution processing node that generates a super-resolution image of a region of interest by performing super-resolution processing on an image on the region of interest basis included in the image generated by a sensor device, from among devices on a path in a network from the sensor device to a plurality of image processing devices.

Note that the present disclosure can have the following configurations.

<1>
A network control method including:
by a network connection device,
determining, on the basis of a manifest, an optimal location for execution of an application that processes sensor data generated by a sensor device, from among the sensor device and a device on a path in a network connected to the sensor device.

<2>
The network control method according to <1> above, in which
the network connection device performs determination on the basis of an evaluation axis at a time of deploying the application and on the basis of a priority order of application deployment in a case of the evaluation axis, the evaluation axis and the priority order being described in the manifest.

<3>
The network control method according to <2> above, in which
the manifest includes a processing delay due to a network transfer delay, as the evaluation axis.

<4>
The network control method according to <2> or <3> above, in which
the manifest includes traffic of the network, as the evaluation axis.

<5>
The network control method according to any one of <2> to <4> above, in which
the manifest includes a processing speed of the application, as the evaluation axis.

<6>
The network control method according to any one of <2> to <5> above, in which
the manifest includes an execution cost of the application, as the evaluation axis.

<7>
The network control method according to any one of <2> to <6> above, in which
the manifest includes a storage cost as the evaluation axis.

<8>
The network control method according to any one of <2> to <7> above, in which
the manifest includes reusability of the sensor data, as the evaluation axis.

<9>
The network control method according to any one of <2> to <8> above, in which
the manifest includes, as the evaluation axis, whether to execute pre-processing before executing main processing corresponding to a requested service.

<10>
The network control method according to any one of <1> to <9> above, in which
the network connection device determines an optimal location of, as the application, an application that executes main processing corresponding to a requested service and an application that executes pre-processing of the main processing.

<11>
The network control method according to <10> above, in which
the pre-processing is processing of compressing the sensor data that is not compressed.

<12>
The network control method according to <10> above, in which
the pre-processing is processing individualized in accordance with contents of the main processing.

<13>
The network control method according to any one of <10> to <12> above, in which
the network connection device deploys a plurality of applications that executes the pre-processing, at a preceding stage of an application that executes the main processing.

<14>
The network control method according to any one of <2> to <13> above, in which
the priority order of the application deployment is a priority order of the sensor device, an edge cloud, and a center cloud as application deployment locations.

<15>
The network control method according to any one of <1> to <14> above, in which
the network connection device determines an optimal location for execution of an application that generates a super-resolution image of a region of interest by performing super-resolution processing on an image on the region of interest basis included in the image generated by the sensor device, from among devices on a path in a network from the sensor device to a plurality of image processing devices.

<16>
A data processing system including:
an orchestrator configured to determine, on the basis of a manifest, an optimal location for execution of an application that processes sensor data generated by a sensor device, from among the sensor device and a device on a path in a network connected to the sensor device.

REFERENCE SIGNS LIST

1 Image analysis network system
11 Sensor device
12 Analysis device
13 Network
14A Broker node
14B Relay processing node
14C Super-resolution processing node
14D Orchestrator
14 Node
41 Event image sensor
42 Object ROI extraction engine
43 ROI catalog generator
44 ROI image filter
45 ROI event filter
51 ROI subscription broker 52 ROI image broker
53 ROI event broker
61 ROI subscription relay module
62 ROI image relay module
63 ROI event relay module
71 ROI subscription relay module
72 Super-resolution processing module
81 ROI subscriber
82 Analysis module
91 Orchestration module
101 ROI super-resolution stream relay module
301 CPU
302 ROM
303 RAM
306 Input unit
307 Output unit
308 Storage unit
309 Communication unit
310 Drive
500 Data processing system
511 Sensor
512 Edge device
513 Sensor/edge
521 Cloud
522 Edge cloud
523 Center cloud
531, 532 Application platform
533 Network monitor
534 Application platform
535 Network monitor
536 Orchestrator
537 Application repository
538, 539 Network
800 Network system
805 Computer
810 Network
815 Remote computer
820 Web server
825 Cloud storage server
830 Computer server
835 Processor
840 Memory
845 Non-volatile storage
848 Program
860 External device

The invention claimed is:

1. A network control method comprising:
generating sensor data including image data and event data, by a sensor;
performing image analysis processing using a super-resolution image generated from the image data and the event data, by one or more analyzers connected to the sensor via a network: and
determining, on a basis of a manifest that includes traffic of the network as an evaluation axis, an optimal location as a first node, for execution of an application that processes the sensor data generated by the sensor, the first node being one of one or more nodes being located on a path from the sensor to the one or more analyzers in the network, and the first node being located closer to the one or more analyzers on the path from the sensor to the one or more analyzers in the network,
wherein the image data and the event data generated by the sensor is transmitted from the sensor to the first node without image analysis processing, and
wherein Region of Interest (ROI) super-resolution stream is generated from the image data and the event data, by the first node.

2. The network control method according to claim 1, performing determination on a basis of an evaluation axis at a time of deploying the application and on a basis of a priority order of application deployment in a case of the evaluation axis, the evaluation axis and the priority order being described in the manifest.

3. The network control method according to claim 2, wherein
the manifest includes a processing delay due to a network transfer delay, as the evaluation axis.

4. The network control method according to claim 2, wherein
the manifest includes a processing speed of the application, as the evaluation axis.

5. The network control method according to claim 2, wherein
the manifest includes an execution cost of the application, as the evaluation axis.

6. The network control method according to claim 2, wherein
the manifest includes a storage cost as the evaluation axis.

7. The network control method according to claim 2, wherein
the manifest includes reusability of the sensor data, as the evaluation axis.

8. The network control method according to claim 2, wherein
the manifest includes, as the evaluation axis, whether to execute pre-processing before executing main processing corresponding to a requested service.

9. The network control method according to claim 2, wherein
the network includes an edge cloud and a center cloud, and
the priority order of the application deployment location is the sensor, the edge cloud, and the center cloud in order.

10. The network control method according to claim 1, further comprising:
determining an optimal location of an application that executes main processing corresponding to a requested service and an optimal location of an application that executes pre-processing of the main processing.

11. The network control method according to claim 10, wherein
the pre-processing is processing of compressing the sensor data that is not compressed.

12. The network control method according to claim 10, wherein
the pre-processing is processing individualized in accordance with contents of the main processing.

13. The network control method according to claim 10, further comprising:
deploying a plurality of applications that executes the pre-processing, at a preceding stage of an application that executes the main processing.

14. The network control method according to claim 1, further comprising:
relaying the image data and the event data to the first node, by a second node, the second node being one of the one or more nodes and being located between the sensor and the first node on the path in the network.

15. The network control method according to claim 14, further comprising:
   thinning out the event data in accordance with a capability of temporal resolution of the one or more analyzers, by the second node.

16. The network control method according to claim 1, wherein
   the image data is synchronously generated by an image sensor included in the sensor, and the event data is asynchronously generated by a dynamic vision sensor included in the sensor, and
   wherein the image analysis processing is performed based on an Artificial Intelligence (AI) engine included in the one or more analyzers.

17. A data processing system comprising:
   a sensor generating image data and event data;
   one or more analyzers connected to the sensor via a network, performing image analysis processing using a super-resolution image generated from the image data and the event data; and
   one or more nodes that include an orchestrator configured to determine, on a basis of a manifest that includes traffic of the network as an evaluation axis, an optimal location as a first node, for execution of an application that processes the sensor data generated by the sensor, the one or more nodes being located on a path from the sensor to the one or more analyzers in the network and the first node being located closer to the one or more analyzers on the path in the network,
   wherein the image data and the event data generated by the sensor is transmitted from the sensor to the first node without image analysis processing, and
   wherein the first node generates Region of Interest (ROI) super-resolution stream from the image data and the event data.

18. The data processing system according to claim 17, wherein the one or more nodes include a second node that is located between the sensor and the first node on the path in the network, and
   wherein the second node relays the image data and the event data to the first node.

19. The data processing system according to claim 18, wherein the second node thins out the event data in accordance with a capability of temporal resolution of the one or more analyzers.

20. The data processing system according to claim 17, wherein the sensor includes an image sensor generating the image data synchronously and a dynamic vision sensor generating the event data asynchronously, and
   wherein the one or more analyzers include an Artificial Intelligence (AI) engine using machine learning to perform the image analysis processing based on the AI engine.

* * * * *